US011810060B2

(12) United States Patent
Kentris et al.

(10) Patent No.: US 11,810,060 B2
(45) Date of Patent: **\*Nov. 7, 2023**

(54) SYSTEMS AND METHODS FOR FACILITATING E-COMMERCE PRODUCT RETURNS USING ORDERS FOR RETURNED ITEMS

(71) Applicant: SHOPIFY INC., Ottawa (CA)

(72) Inventors: Anthony Nicholas Kentris, Toronto (CA); Raphael Paquin, Montreal (CA); Clara Petit, Toronto (CA)

(73) Assignee: SHOPIFY INC., Ottawa (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/700,574

(22) Filed: Mar. 22, 2022

(65) Prior Publication Data
US 2022/0215338 A1    Jul. 7, 2022

Related U.S. Application Data

(63) Continuation of application No. 16/686,722, filed on Nov. 18, 2019, now Pat. No. 11,315,069.

(51) Int. Cl.
*G06Q 10/08* (2023.01)
*G06Q 30/06* (2023.01)
(Continued)

(52) U.S. Cl.
CPC ....... *G06Q 10/0837* (2013.01); *G06Q 10/087* (2013.01); *G06Q 10/08345* (2013.01);
(Continued)

(58) Field of Classification Search
None
See application file for complete search history.

(56) References Cited

U.S. PATENT DOCUMENTS 7,212,991 B2 * 5/2007 Chowdhary ....... G06Q 30/0619
705/26.1
7,299,198 B2 11/2007 Foth et al.
(Continued)

FOREIGN PATENT DOCUMENTS

CA    2781191 A1    12/2012
CA    2337760 C    1/2018
(Continued)

OTHER PUBLICATIONS

Extended European Search Report and Search Opinion issued on European Patent Application No. 20180380.6 dated Sep. 1, 2020, 8 pages.
(Continued)

*Primary Examiner* — Nicholas D Rosen

(57) ABSTRACT

A merchant can use an e-commerce platform to sell products to customers, and customers can use the e-commerce platform to return items that they are unsatisfied with back to the merchant. These product returns have an associated cost. Embodiments of the present disclosure relate to computer-implemented systems and methods to enable customer-to-customer product returns in an e-commerce platform. In a customer-to-customer return, a first customer that wants to return an item of a particular product is connected with a second customer that wants to purchase that product. The e-commerce platform then facilitates a shipment of the item from the first customer directly to the second customer. Embodiments of the present disclosure include online store implementations of customer-to-customer returns, online marketplace implementations of customer-to-customer returns, and customer-to-customer returns implemented using orders for returned items.

20 Claims, 37 Drawing Sheets

(51) Int. Cl.
*G06Q 10/0837* (2023.01)
*G06Q 30/0601* (2023.01)
*G06Q 30/016* (2023.01)
*G06Q 10/0834* (2023.01)
*G06Q 10/087* (2023.01)
*G06F 3/0482* (2013.01)

(52) U.S. Cl.
CPC ....... *G06Q 30/016* (2013.01); *G06Q 30/0641* (2013.01); *G06F 3/0482* (2013.01); *G06Q 30/0601* (2013.01)

(56) References Cited

U.S. PATENT DOCUMENTS

| | | | |
|---|---|---|---|
| 7,617,133 B1 | 11/2009 | Antony et al. | |
| 8,533,054 B1 | 9/2013 | Haney et al. | |
| 11,157,992 B2 | 10/2021 | Kentris et al. | |
| 11,315,069 B2* | 4/2022 | Kentris | G06Q 10/08345 |
| 11,657,444 B2* | 5/2023 | Kentris | G06Q 10/0838 |
| | | | 705/26.81 |
| 2002/0013739 A1 | 1/2002 | O'Donnell et al. | |
| 2002/0138356 A1 | 9/2002 | Dutta et al. | |
| 2004/0044582 A1* | 3/2004 | Chowdhary | G06Q 30/0605 |
| | | | 705/26.1 |
| 2004/0088225 A1 | 5/2004 | Foth et al. | |
| 2009/0218405 A1* | 9/2009 | Joseph | G06K 7/10732 |
| | | | 235/462.42 |
| 2011/0087606 A1 | 4/2011 | Hammond et al. | |
| 2014/0052587 A1 | 2/2014 | Bereck et al. | |
| 2014/0100903 A1 | 4/2014 | Yuan | |
| 2015/0142500 A1 | 5/2015 | Aqlan et al. | |
| 2015/0206128 A1* | 7/2015 | Torossian | G06Q 20/327 |
| | | | 705/39 |
| 2016/0189097 A1 | 6/2016 | Padmaraagam et al. | |
| 2017/0364860 A1 | 12/2017 | Wilkinson et al. | |
| 2020/0402001 A1 | 12/2020 | Kentris | |
| 2020/0402002 A1 | 12/2020 | Kentris | |
| 2021/0012280 A1 | 1/2021 | Paquin et al. | |
| 2021/0012281 A1 | 1/2021 | Paquin et al. | |
| 2021/0150616 A1 | 5/2021 | Kentris et al. | |

FOREIGN PATENT DOCUMENTS

| | | |
|---|---|---|
| CN | 108985874 A | 12/2018 |
| CN | 111984837 A | 11/2020 |
| JP | 2004171184 A | 6/2004 |
| JP | 2004302497 A | 10/2004 |
| WO | 0167344 A1 | 9/2001 |

OTHER PUBLICATIONS

"Returns Online and Smartship Partner to Provide Customized Shipping Options." Business Wire. Published online Nov. 16, 2000.
Asdecker, Björn. "Returning mail-order goods: analyzing the relationship between the rate of returns and the associated costs". Logist. Res. (2015) 8:3. Published online Jul. 31, 2015. 12 pages.
Shen, Bin, and Li, Qingying. "Impacts of Returning Unsold Products in Retail Outsourcing Fashion Supply Chain: A Sustainability Analysis". Sustainability 2015, 7. Published online Jan. 23, 2015. Pages 1172-1185.

* cited by examiner

E-Commerce Platform

Search

John's Apparel
Jonny B. Good

- Home
- Orders
- Products
- Costumers
- Reports
- Discounts
- Apps

SALES CHANNELS
- Online Store
- Mobile App

View all channels

Settings

Good afternoon, Jonny B..

Here's what's happening with your store today.

Today's total sales    Today's visits
$98.00                  1

• Update your Platform Payments tax details
  We require additional information to verify your identity.
  Update tax details

• Advanced Cash on Delivery has been deactivated for your store
  See why

All channels ∨         Today ∨

TOTAL SALES
$98.00

$125
$75
$25
        12am    8pm    4pm   11pm
                              Jun 1
                              2 orders TOTAL SALES BY CHANNEL      View dashboard
Online Store                       Jun 1
$0.00                           0 orders Mobile app
$0.00                           0 orders Shopify POS (126 York St.)
$0.00                           0 orders

← Return item

Select your return method

1102 — Customer-to-customer return

Send this item to a customer near you that wants to buy it, reducing environmental impact by saving a shipping trip and get a free refund.  FREE 1104 — Regular return

Send this item to us and receive a refund to your original payment method.  $5

FIG. 11

1300
  Return item
Review return request
Returning with a customer-to-customer return
1302 → 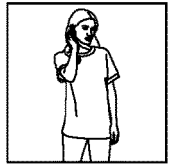  3-STRIPES TEE
Size – Too small
New with tags
1 photo
1304  Confirm
FIG. 13

E-Commerce Platform

🔍 Search

JG John's Apparel
Jonny B. Good

🏠 Home
📋 Orders  46
🏷 Products
👤 Costumers
📊 Reports
🏷 Discounts
⊞ Apps

SALES CHANNELS ⚙
🛒 Online Store
📱 Mobile App

⚙ Settings

Customer-to-customer Returns

Orders   Analytics

ⓘ 1 new return request pending for approval  ⋯  ✕
   Review the new orders to approve your customer's return request.

← 1504

ALL   Needs approval   Shipped orders   Matched orders   Completed orders

| Filter ∨ | 🔍 Search order number |
|---|---|

☐ Showing 50 orders

Sort by Newest update ⬥

← 1502

| | Order | Customer | Status | Last updated |
|---|---|---|---|---|
| ☐ ▸ | | | | |
| ☐ 👕 | #7155 | Maria C. | [Needs approval] | Apr 5, 3:11pm |
| ☐ 👕 | #4232 | Sam P. | [Shipped] | Apr 1, 4:21pm |
| ☐ 👤 | #7156 | Randy R. | [Matched] | Mar 28, 4:01pm |
| ☐ 👕 | #7149 | Polina W. | [Completed] | Mar 22, 4:21pm |

← What kind of product are you looking for?

Select the type of product

⌄ —2802

Provide a description of the product (optional)

SYSTEMS AND METHODS FOR FACILITATING E-COMMERCE PRODUCT RETURNS USING ORDERS FOR RETURNED ITEMS

CROSS-REFERENCE TO RELATED APPLICATIONS

This application is a continuation of U.S. patent application Ser. No. 16/686,722, entitled "Systems and Methods for Facilitating e-Commerce Product Returns Using Orders for Returned Items", which was filed on Nov. 18, 2019, the contents of which are incorporated herein by reference in their entirety.

FIELD

The present disclosure relates to computer-implemented e-commerce platforms.

BACKGROUND

A merchant may use an e-commerce platform to sell products to customers. These products are often shipped to the customer by the merchant. In the event that the customer is unsatisfied with the product, the customer may be permitted to return the product to the merchant. For example, the customer could ship the product back to the merchant for a refund and/or for an exchange of the product.

Product returns have an associated cost. For example, there is a cost associated with shipping a product from a customer back to a merchant. Some merchants offer free returns, and therefore the cost to ship the item back to the merchant may be paid for by the merchant. In the case that the returned product is then resold by the merchant, the merchant may also pay for the product to be shipped to the next customer. Furthermore, the merchant may cover the cost associated with repackaging the returned products.

Product returns also have an environmental impact. For example, return shipments typically require additional transportation and/or packaging, both of which can be sources of pollution.

Product returns on an e-commerce platform may be particularly costly because of the reliance on a computer network to sell a product. The computer network may allow for a customer to purchase an item sold by a merchant that is physically located far away from the customer, which may increase the cost of shipping the product back to the merchant.

SUMMARY

It is desired to have a computer-implemented system that assists in reducing the cost associated with returning a product on an e-commerce platform.

In some embodiments of the present disclosure, a computer-implemented system is used to connect a first customer that wants to return an item of a particular product with a second customer that wants to purchase that product. The computer-implemented system could execute one or more software applications that provide: (1) a user interface that allows the first customer to indicate their intent to return an item; (2) a user interface that presents, to the second customer, the option to purchase the first customer's item, rather than to purchase a new item of that product from the merchant; and (3) optionally, a user interface that allows for the merchant to verify the condition of the first customer's item, and to approve the first customer's item to be made available for offer to another customer.

In some embodiments, the computer-implemented system receives an indication that the second customer agrees to buy the first customer's item, and enables the first customer to ship their item directly to the second customer. This can avoid the packaging and shipping of a new item of that product from the merchant to the second customer, and may save shipping costs compared to the alternative two-step approach of (i) the first customer shipping his/her item back to the merchant, and (ii) the merchant shipping a new item of that product to the second customer.

In some embodiments, a computer-implemented system determines if shipping the item directly from the first customer to the second customer is feasible and/or economical. For example, the computer-implemented system may determine if shipping the item directly from the first customer to the second customer is in the best interest of the merchant.

In some embodiments, a first customer can place an order for an item of a product, and request that the item be a returned item. A discount might incentivize the first customer to request the returned item. A computer-implemented system can store the first customer's order until a second customer indicates that they wish to return an item of the product. If shipping the second customer's item directly to the first customer is economical for the merchant, then the computer-implemented system can facilitate this shipment and fulfill the first customer's order.

In some embodiments, a first customer may be a (registered) charitable organization accepting in-kind donation of returned or second hand products to fulfill their charitable goals. A charitable tax receipt for the fair market value of the product might be offered to the second customer, i.e. the customer returning the item of the product. A computer-implemented system can store the first customer's order until the second customer indicates that they wish to return an item of the product. If shipping the second customer's item directly to the first customer is viable for the merchant, then the computer-implemented system can facilitate this shipment and fulfill the first customer's order.

According to one aspect of the present disclosure, there is provided a computer-implemented method. The computer-implemented method includes receiving, from a first customer device that is associated with a first customer, an indication that the first customer intends to return a purchased item. The computer-implemented method further includes storing, in memory, information related to the purchased item, the information including an indication that: (i) the purchased item belongs to the first customer, and (ii) the purchased item is an item of a product that is associated with a particular merchant on an e-commerce platform. The computer-implemented method further includes detecting, from a second customer device that is associated with a second customer, an association between the second customer and the product. The computer-implemented method further includes determining a first cost associated with shipping the purchased item from the first customer to the second customer. The computer-implemented method further includes determining a second cost associated with at least one of: (i) shipping the purchased item from the first customer to the particular merchant, and (ii) shipping a new item of the product from the particular merchant to the second customer. The computer-implemented method further includes determining, based on a comparison between the first cost and the second cost, to enable shipping the purchased item from the first customer to the second customer. The computer-implemented method further includes transmitting content for display on the second customer device, the content comprising an offer for a sale of the purchased item to the second customer. A system configured to perform the method may also be provided. For example, the system could include a memory to store the information related to the purchased item, and a processor to perform some or all of the steps above.

According to another aspect of the present disclosure, there is provided another computer-implemented method. The computer implemented method includes storing, in memory, information related to a plurality of purchased items for resale on an online marketplace, the information indicating, for each purchased item of the plurality of purchased items: (i) a respective customer to which the purchased item belongs, and (ii) a respective merchant that sold the purchased item to the respective customer. The computer-implemented method further includes receiving an indication that a customer device associated with a particular customer has navigated to the online marketplace. For each purchased item of at least some of the plurality of purchased items, the computer-implemented method further includes determining a first cost associated with shipping the purchased item from the respective customer to which the purchased item belongs to the particular customer; determining a second cost associated with at least one of: (i) shipping the purchased item from the respective customer to which the purchased item belongs to the respective merchant that sold the purchased item, and (ii) shipping a new item from the respective merchant that sold the purchased item to the particular customer; and based on a comparison between the first cost and the second cost, determining whether to include the purchased item in a set of items to present to the particular customer, the set of items comprising at least one of the plurality of purchased items and fewer than all of the plurality of purchased items. The computer-implemented method further includes transmitting content for display on the customer device, the content comprising, for each purchased item of the set of items, a respective offer for a sale of the purchased item to the particular customer. A system configured to perform the method may also be provided. For example, the system could include a memory to store the information related to the plurality of purchased items for resale on the online marketplace, and a processor to perform some or all of the steps above.

According to a further aspect of the present disclosure, there is provided a further computer-implemented method. The computer-implemented method includes receiving an order from a first customer device that is associated with a first customer, the order indicating that: (i) the first customer intends to purchase or receive a desired product, and (ii) the first customer will accept a returned item of the desired product. The computer-implemented method also includes storing, in memory, first information related to the order, the first information indicating: (i) the first customer, and (ii) the desired product. The computer-implemented method further includes receiving, from a second customer device that is associated with a second customer, an indication that the second customer intends to return a purchased item; and determining that the purchased item corresponds to the desired product. The computer-implemented method further includes determining a cost associated with shipping the purchased item from the second customer to the first customer; and determining, based on the cost, to enable shipping the purchased item from the second customer to the first customer. The computer implemented method further includes transmitting, to the second customer device, second information for shipping the purchased item from the second customer to the first customer. A system configured to perform the method may also be provided. For example, the system could include: a memory to store the first information related to an order; and a processor to perform some or all of the steps above.

BRIEF DESCRIPTION OF THE DRAWINGS

Embodiments will be described, by way of example only, with reference to the accompanying figures wherein:

FIG. 2 is an example of a home page of an administrator, according to one embodiment;

FIG. 11 is an example screen page for choosing between a regular or customer-to-customer return process;

FIG. 13 is an example screen page for reviewing a return request;

FIG. 15 is an example screen page for viewing customer-to-customer return orders;

FIG. 28 is an example screen page for providing a description of a desired product;

DETAILED DESCRIPTION

For illustrative purposes, specific example embodiments will now be explained in greater detail below in conjunction with the figures.

Example e-Commerce Platform

In some embodiments, the methods disclosed herein may be performed on or in association with an e-commerce platform. Therefore, an example of an e-commerce platform will be described.

Figure 1:
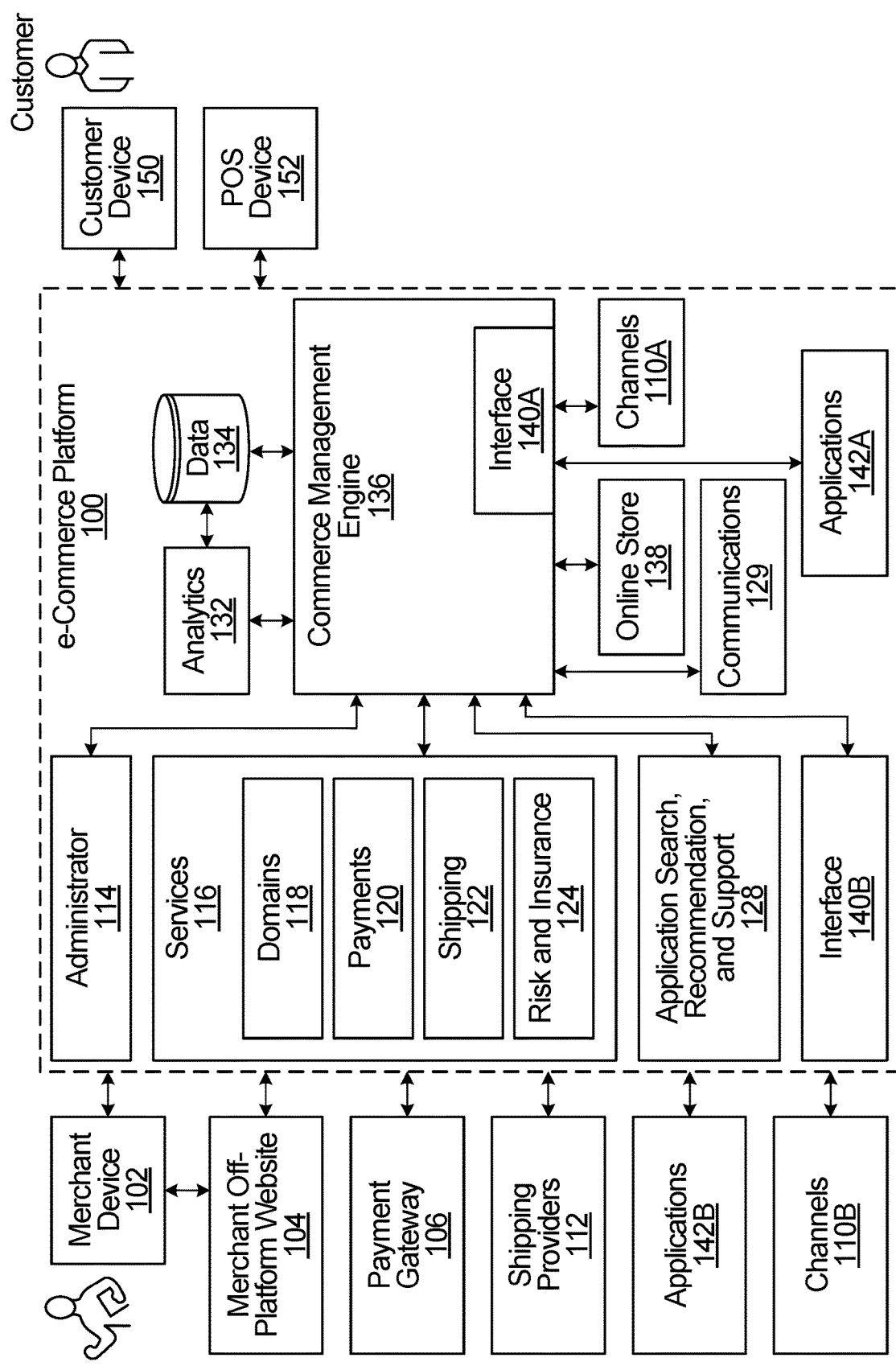
FIG. 1 is a block diagram of an e-commerce platform, according to one embodiment.

FIG. 1 illustrates an e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including physical products, digital content, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like.

The e-commerce platform 100 may provide a centralized system for providing merchants with online resources and facilities for managing their business. The facilities described herein may be deployed in part or in whole through a machine that executes computer software, modules, program codes, and/or instructions on one or more processors which may be part of or external to the platform 100. Merchants may utilize the e-commerce platform 100 for managing commerce with customers, such as by implementing an e-commerce experience with customers through an online store 138, through channels 110A-B, through POS devices 152 in physical locations (e.g., a physical storefront or other location such as through a kiosk, terminal, reader, printer, 3D printer, and the like), by managing their business through the e-commerce platform 100, and by interacting with customers through a communications facility 129 of the e-commerce platform 100, or any combination thereof. A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform), and the like. However, even these 'other' merchant commerce facilities may be incorporated into the e-commerce platform, such as where POS devices 152 in a physical store of a merchant are linked into the e-commerce platform 100, where a merchant off-platform website 104 is tied into the e-commerce platform 100, such as through 'buy buttons' that link content from the merchant off platform website 104 to the online store 138, and the like.

The online store 138 may represent a multitenant facility comprising a plurality of virtual storefronts. In embodiments, merchants may manage one or more storefronts in the online store 138, such as through a merchant device 102 (e.g., computer, laptop computer, mobile computing device, and the like), and offer products to customers through a number of different channels 110A-B (e.g., an online store 138; a physical storefront through a POS device 152; electronic marketplace, through an electronic buy button integrated into a website or social media channel such as on a social network, social media page, social media messaging system; and the like). A merchant may sell across channels 110A-B and then manage their sales through the e-commerce platform 100, where channels 110A may be provided internal to the e-commerce platform 100 or from outside the e-commerce channel 110B. A merchant may sell in their physical retail store, at pop ups, through wholesale, over the phone, and the like, and then manage their sales through the e-commerce platform 100. A merchant may employ all or any combination of these, such as maintaining a business through a physical storefront utilizing POS devices 152, maintaining a virtual storefront through the online store 138, and utilizing a communication facility 129 to leverage customer interactions and analytics 132 to improve the probability of sales. Throughout this disclosure the terms online store 138 and storefront may be used synonymously to refer to a merchant's online e-commerce offering presence through the e-commerce platform 100, where an online store 138 may refer to the multitenant collection of storefronts supported by the e-commerce platform 100 (e.g., for a plurality of merchants) or to an individual merchant's storefront (e.g., a merchant's online store).

In some embodiments, a customer may interact through a customer device 150 (e.g., computer, laptop computer, mobile computing device, and the like), a POS device 152 (e.g., retail device, a kiosk, an automated checkout system, and the like), or any other commerce interface device known in the art. The e-commerce platform 100 may enable merchants to reach customers through the online store 138, through POS devices 152 in physical locations (e.g., a merchant's storefront or elsewhere), to promote commerce with customers through dialog via electronic communication facility 129, and the like, providing a system for reaching customers and facilitating merchant services for the real or virtual pathways available for reaching and interacting with customers.

In some embodiments, and as described further herein, the e-commerce platform 100 may be implemented through a processing facility including a processor and a memory, the processing facility storing a set of instructions that, when executed, cause the e-commerce platform 100 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 100, merchant devices 102, payment gateways 106, application developers, channels 110A-B, shipping providers 112, customer devices 150, point of sale devices 152, and the like. The e-commerce platform 100 may be implemented as a cloud computing service, a software as a service (SaaS), infrastructure as a service (IaaS), platform as a service (PaaS), desktop as a Service (DaaS), managed software as a service (MSaaS), mobile backend as a service (MBaaS), information technology management as a service (ITMaaS), and the like, such as in a software and delivery model in which software is licensed on a subscription basis and centrally hosted (e.g., accessed by users using a client (for example, a thin client) via a web browser or other application, accessed through by POS devices, and the like). In some embodiments, elements of the e-commerce platform 100 may be implemented to operate on various platforms and operating systems, such as iOS, Android, on the web, and the like (e.g., the administrator 114 being implemented in multiple instances for a given online store for iOS, Android, and for the web, each with similar functionality).

In some embodiments, the online store 138 may be served to a customer device 150 through a webpage provided by a server of the e-commerce platform 100. The server may receive a request for the webpage from a browser or other application installed on the customer device 150, where the browser (or other application) connects to the server through an IP Address, the IP address obtained by translating a domain name. In return, the server sends back the requested webpage. Webpages may be written in or include Hypertext Markup Language (HTML), template language, JavaScript, and the like, or any combination thereof. For instance, HTML is a computer language that describes static information for the webpage, such as the layout, format, and content of the webpage. Website designers and developers may use the template language to build webpages that combine static content, which is the same on multiple pages, and dynamic content, which changes from one page to the next. A template language may make it possible to re-use the static elements that define the layout of a webpage, while dynamically populating the page with data from an online store. The static elements may be written in HTML, and the dynamic elements written in the template language. The template language elements in a file may act as placeholders, such that the code in the file is compiled and sent to the customer device 150 and then the template language is replaced by data from the online store 138, such as when a theme is installed. The template and themes may consider tags, objects, and filters. The client device web browser (or other application) then renders the page accordingly.

In some embodiments, online stores 138 may be served by the e-commerce platform 100 to customers, where customers can browse and purchase the various products available (e.g., add them to a cart, purchase immediately through a buy-button, and the like). Online stores 138 may be served to customers in a transparent fashion without customers necessarily being aware that it is being provided through the e-commerce platform 100 (rather than directly from the merchant). Merchants may use a merchant configurable domain name, a customizable HTML theme, and the like, to customize their online store 138. Merchants may customize the look and feel of their website through a theme system, such as where merchants can select and change the look and feel of their online store 138 by changing their theme while having the same underlying product and business data shown within the online store's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store may implement a content management system for website content. Merchants may author blog posts or static pages and publish them to their online store 138, such as through blogs, articles, and the like, as well as configure navigation menus. Merchants may upload images (e.g., for products), video, content, data, and the like to the e-commerce platform 100, such as for storage by the system (e.g. as data 134). In some embodiments, the e-commerce platform 100 may provide functions for resizing images, associating an image with a product, adding and associating text with an image, adding an image for a new product variant, protecting images, and the like.

As described herein, the e-commerce platform 100 may provide merchants with transactional facilities for products through a number of different channels 110A-B, including the online store 138, over the telephone, as well as through physical POS devices 152 as described herein. The e-commerce platform 100 may include business support services 116, an administrator 114, and the like associated with running an on-line business, such as providing a domain service 118 associated with their online store, payment services 120 for facilitating transactions with a customer, shipping services 122 for providing customer shipping options for purchased products, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may provide for integrated shipping services 122 (e.g., through an e-commerce platform shipping facility or through a third-party shipping carrier), such as providing merchants with real-time updates, tracking, automatic rate calculation, bulk order preparation, label printing, and the like.

FIG. 2 depicts a non-limiting embodiment for a home page of an administrator 114, which may show information about daily tasks, a store's recent activity, and the next steps a merchant can take to build their business. In some embodiments, a merchant may log in to administrator 114 via a merchant device 102 such as from a desktop computer or mobile device, and manage aspects of their online store 138, such as viewing the online store's 138 recent activity, updating the online store's 138 catalog, managing orders, recent visits activity, total orders activity, and the like. In some embodiments, the merchant may be able to access the different sections of administrator 114 by using the sidebar, such as shown on FIG. 2. Sections of the administrator 114 may include various interfaces for accessing and managing core aspects of a merchant's business, including orders, products, customers, available reports and discounts. The administrator 114 may also include interfaces for managing sales channels for a store including the online store, mobile application(s) made available to customers for accessing the store (Mobile App), POS devices, and/or a buy button. The administrator 114 may also include interfaces for managing applications (Apps) installed on the merchant's account; settings applied to a merchant's online store 138 and account. A merchant may use a search bar to find products, pages, or other information. Depending on the device 102 or software application the merchant is using, they may be enabled for different functionality through the administrator 114. For instance, if a merchant logs in to the administrator 114 from a browser, they may be able to manage all aspects of their online store 138. If the merchant logs in from their mobile device (e.g. via a mobile application), they may be able to view all or a subset of the aspects of their online store 138, such as viewing the online store's 138 recent activity, updating the online store's 138 catalog, managing orders, and the like.

More detailed information about commerce and visitors to a merchant's online store 138 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 110A-B from different periods of time (e.g., days, weeks, months, and the like), such as by using drop-down menus. An overview dashboard may be provided for a merchant that wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, and the like. Notifications may be provided to assist a merchant with navigating through a process, such as capturing a payment, marking an order as fulfilled, archiving an order that is complete, and the like.

The e-commerce platform 100 may provide for a communications facility 129 and associated merchant interface for providing electronic communications and marketing, such as utilizing an electronic messaging aggregation facility for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between an e-commerce platform 100 financial institution account and a merchant's back account (e.g., when using capital), and the like. These systems may have Sarbanes-Oxley Act (SOX) compliance and a high level of diligence required in their development and operation. The financial facility 120 may also provide merchants with financial support, such as through the lending of capital (e.g., lending funds, cash advances, and the like) and provision of insurance. In addition, the e-commerce platform 100 may provide for a set of marketing and partner services and control the relationship between the e-commerce platform 100 and partners. They also may connect and onboard new merchants with the e-commerce platform 100. These services may enable merchant growth by making it easier for merchants to work across the e-commerce platform 100. Through these services, merchants may be provided help facilities via the e-commerce platform 100.

In some embodiments, online store 138 may support a great number of independently administered storefronts and process a large volume of transactional data on a daily basis for a variety of products. Transactional data may include customer contact information, billing information, shipping information, information on products purchased, information on services rendered, and any other information associated with business through the e-commerce platform 100. In some embodiments, the e-commerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 100 may store information about business and merchant transactions, and the data facility 134 may have many ways of enhancing, contributing, refining, and extracting data, where over time the collected data may enable improvements to aspects of the e-commerce platform 100.

Referring again to FIG. 1, in some embodiments the e-commerce platform 100 may be configured with a commerce management engine 136 for content management, task automation and data management to enable support and services to the plurality of online stores 138 (e.g., related to products, inventory, customers, orders, collaboration, suppliers, reports, financials, risk and fraud, and the like), but be extensible through applications 142A-B that enable greater flexibility and custom processes required for accommodating an ever-growing variety of merchant online stores, POS devices, products, and services, where applications 142A may be provided internal to the e-commerce platform 100 or applications 142B from outside the e-commerce platform 100. In some embodiments, an application 142A may be provided by the same party providing the platform 100 or by a different party. In some embodiments, an application 142B may be provided by the same party providing the platform 100 or by a different party. The commerce management engine 136 may be configured for flexibility and scalability through portioning (e.g., sharding) of functions and data, such as by customer identifier, order identifier, online store identifier, and the like. The commerce management engine 136 may accommodate store-specific business logic and in some embodiments, may incorporate the administrator 114 and/or the online store 138.

The commerce management engine 136 includes base or "core" functions of the e-commerce platform 100, and as such, as described herein, not all functions supporting online stores 138 may be appropriate for inclusion. For instance, functions for inclusion into the commerce management engine 136 may need to exceed a core functionality threshold through which it may be determined that the function is core to a commerce experience (e.g., common to a majority of online store activity, such as across channels, administrator interfaces, merchant locations, industries, product types, and the like), is re-usable across online stores 138 (e.g., functions that can be re-used/modified across core functions), limited to the context of a single online store 138 at a time (e.g., implementing an online store 'isolation principle', where code should not be able to interact with multiple online stores 138 at a time, ensuring that online stores 138 cannot access each other's data), provide a transactional workload, and the like. Maintaining control of what functions are implemented may enable the commerce management engine 136 to remain responsive, as many required features are either served directly by the commerce management engine 136 or enabled through an interface 140A-B, such as by its extension through an application programming interface (API) connection to applications 142A-B and channels 110A-B, where interfaces 140A may be provided to applications 142A and/or channels 110A inside the e-commerce platform 100 or through interfaces 140B provided to applications 142B and/or channels 110B outside the e-commerce platform 100. Generally, the platform 100 may include interfaces 140A-B (which may be extensions, connectors, APIs, and the like) which facilitate connections to and communications with other platforms, systems, software, data sources, code and the like. Such interfaces 140A-B may be an interface 140A of the commerce management engine 136 or an interface 140B of the platform 100 more generally. If care is not given to restricting functionality in the commerce management engine 136, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the commerce management engine 136 may be configured to maintain responsiveness, such as through configuration that utilizes timeouts, queues, back-pressure to prevent degradation, and the like.

Although isolating online store data is important to maintaining data privacy between online stores 138 and merchants, there may be reasons for collecting and using cross-store data, such as for example, with an order risk assessment system or a platform payment facility, both of which require information from multiple online stores 138 to perform well. In some embodiments, rather than violating the isolation principle, it may be preferred to move these components out of the commerce management engine 136 and into their own infrastructure within the e-commerce platform 100.

In some embodiments, the e-commerce platform 100 may provide for a platform payment facility 120, which is another example of a component that utilizes data from the commerce management engine 136 but may be located outside so as to not violate the isolation principle. The platform payment facility 120 may allow customers interacting with online stores 138 to have their payment information stored safely by the commerce management engine 136 such that they only have to enter it once. When a customer visits a different online store 138, even if they've never been there before, the platform payment facility 120 may recall their information to enable a more rapid and correct check out. This may provide a cross-platform network effect, where the e-commerce platform 100 becomes more useful to its merchants as more merchants join, such as because there are more customers who checkout more often because of the ease of use with respect to customer purchases. To maximize the effect of this network, payment information for a given customer may be retrievable from an online store's checkout, allowing information to be made available globally across online stores 138. It would be difficult and error prone for each online store 138 to be able to connect to any other online store 138 to retrieve the payment information stored there. As a result, the platform payment facility may be implemented external to the commerce management engine 136.

For those functions that are not included within the commerce management engine 136, applications 142A-B provide a way to add features to the e-commerce platform 100. Applications 142A-B may be able to access and modify data on a merchant's online store 138, perform tasks through the administrator 114, create new flows for a merchant through a user interface (e.g., that is surfaced through extensions/API), and the like. Merchants may be enabled to discover and install applications 142A-B through application search, recommendations, and support 128. In some embodiments, core products, core extension points, applications, and the administrator 114 may be developed to work together. For instance, application extension points may be built inside the administrator 114 so that core features may be extended by way of applications, which may deliver functionality to a merchant through the extension.

In some embodiments, applications 142A-B may deliver functionality to a merchant through the interface 140A-B, such as where an application 142A-B is able to surface transaction data to a merchant (e.g., App: "Engine, surface my app data in mobile and web admin using the embedded app SDK"), and/or where the commerce management engine 136 is able to ask the application to perform work on demand (Engine: "App, give me a local tax calculation for this checkout").

Applications 142A-B may support online stores 138 and channels 110A-B, provide for merchant support, integrate with other services, and the like. Where the commerce management engine 136 may provide the foundation of services to the online store 138, the applications 142A-B may provide a way for merchants to satisfy specific and sometimes unique needs. Different merchants will have different needs, and so may benefit from different applications 142A-B. Applications 142A-B may be better discovered through the e-commerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 142A-B may be connected to the commerce management engine 136 through an interface 140A-B, such as utilizing APIs to expose the functionality and data available through and within the commerce management engine 136 to the functionality of applications (e.g., through REST, GraphQL, and the like). For instance, the e-commerce platform 100 may provide API interfaces 140A-B to merchant and partner-facing products and services, such as including application extensions, process flow services, developer-facing resources, and the like. With customers more frequently using mobile devices for shopping, applications 142A-B related to mobile use may benefit from more extensive use of APIs to support the related growing commerce traffic. The flexibility offered through use of applications and APIs (e.g., as offered for application development) enable the e-commerce platform 100 to better accommodate new and unique needs of merchants (and internal developers through internal APIs) without requiring constant change to the commerce management engine 136, thus providing merchants what they need when they need it. For instance, shipping services 122 may be integrated with the commerce management engine 136 through a shipping or carrier service API, thus enabling the e-commerce platform 100 to provide shipping service functionality without directly impacting code running in the commerce management engine 136.

Many merchant problems may be solved by letting partners improve and extend merchant workflows through application development, such as problems associated with back-office operations (merchant-facing applications 142A-B) and in the online store 138 (customer-facing applications 142A-B). As a part of doing business, many merchants will use mobile and web related applications on a daily basis for back-office tasks (e.g., merchandising, inventory, discounts, fulfillment, and the like) and online store tasks (e.g., applications related to their online shop, for flash-sales, new product offerings, and the like), where applications 142A-B, through extension/API 140A-B, help make products easy to view and purchase in a fast growing marketplace. In some embodiments, partners, application developers, internal applications facilities, and the like, may be provided with a software development kit (SDK), such as through creating a frame within the administrator 114 that sandboxes an application interface. In some embodiments, the administrator 114 may not have control over nor be aware of what happens within the frame. The SDK may be used in conjunction with a user interface kit to produce interfaces that mimic the look and feel of the e-commerce platform 100, such as acting as an extension of the commerce management engine 136.

Applications 142A-B that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the commerce management engine 136, such as for synchronizing a local database, notifying an external integration partner, and the like. Update events may enable this functionality without having to poll the commerce management engine 136 all the time to check for updates, such as through an update event subscription. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time.

In some embodiments, the e-commerce platform 100 may provide application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, a description of core application capabilities within the commerce management engine 136, and the like. These support facilities may be utilized by application development performed by any entity, including the merchant developing their own application 142A-B, a third-party developer developing an application 142A-B (e.g., contracted by a merchant, developed on their own to offer to the public, contracted for use in association with the e-commerce platform 100, and the like), or an application 142A or 142B being developed by internal personal resources associated with the e-commerce platform 100. In some embodiments, applications 142A-B may be assigned an application identifier (ID), such as for linking to an application (e.g., through an API), searching for an application, making application recommendations, and the like.

The commerce management engine 136 may include base functions of the e-commerce platform 100 and expose these functions through APIs 140A-B to applications 142A-B. The APIs 140A-B may enable different types of applications built through application development. Applications 142A-B may be capable of satisfying a great variety of needs for merchants but may be grouped roughly into three categories: customer-facing applications, merchant-facing applications, integration applications, and the like. Customer-facing applications 142A-B may include online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways.

In some embodiments, an application developer may use an application proxy to fetch data from an outside location and display it on the page of an online store 138. Content on these proxy pages may be dynamic, capable of being updated, and the like. Application proxies may be useful for displaying image galleries, statistics, custom forms, and other kinds of dynamic content. The core-application structure of the e-commerce platform 100 may allow for an increasing number of merchant experiences to be built in applications 142A-B so that the commerce management engine 136 can remain focused on the more commonly utilized business logic of commerce.

The e-commerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products on a channel 110A-B. A channel 110A-B is a place where customers can view and buy products. In some embodiments, channels 110A-B may be modeled as applications 142A-B (a possible exception being the online store 138, which is integrated within the commerce management engine 136). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g., a "default variant" is created for a product without any options). To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Products may be viewed as 2D images, 3D images, rotating view images, through a virtual or augmented reality interface, and the like.

In some embodiments, the customer may add what they intend to buy to their cart (in an alternate embodiment, a product may be purchased directly, such as through a buy button as described herein). Customers may add product variants to their shopping cart. The shopping cart model may be channel specific. The online store 138 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may implement a web checkout as a customer-facing order creation process. A checkout API may be provided as a computer-facing order creation process used by some channel applications to create orders on behalf of customers (e.g., for point of sale). Checkouts may be created from a cart and record a customer's information such as email address, billing, and shipping details. On checkout, the merchant commits to pricing. If the customer inputs their contact information but does not proceed to payment, the e-commerce platform 100 may provide an opportunity to re-engage the customer (e.g., in an abandoned checkout feature). For those reasons, checkouts can have much longer lifespans than carts (hours or even days) and are therefore persisted. Checkouts may calculate taxes and shipping costs based on the customer's shipping address. Checkout may delegate the calculation of taxes to a tax component and the calculation of shipping costs to a delivery component. A pricing component may enable merchants to create discount codes (e.g., 'secret' strings that when entered on the checkout apply new prices to the items in the checkout). Discounts may be used by merchants to attract customers and assess the performance of marketing campaigns. Discounts and other custom price systems may be implemented on top of the same platform piece, such as through price rules (e.g., a set of prerequisites that when met imply a set of entitlements). For instance, prerequisites may be items such as "the order subtotal is greater than $100" or "the shipping cost is under $10", and entitlements may be items such as "a 20% discount on the whole order" or "$10 off products X, Y, and Z".

Customers then pay for the content of their cart resulting in the creation of an order for the merchant. Channels 110A-B may use the commerce management engine 136 to move money, currency or a store of value (such as dollars or a cryptocurrency) to and from customers and merchants. Communication with the various payment providers (e.g., online payment systems, mobile payment systems, digital wallet, credit card gateways, and the like) may be implemented within a payment processing component. The actual interactions with the payment gateways 106 may be provided through a card server environment. In some embodiments, the payment gateway 106 may accept international payment, such as integrating with leading international credit card processors. The card server environment may include a card server application, card sink, hosted fields, and the like. This environment may act as the secure gatekeeper of the sensitive credit card information. In some embodiments, most of the process may be orchestrated by a payment processing job. The commerce management engine 136 may support many other payment methods, such as through an offsite payment gateway 106 (e.g., where the customer is redirected to another website), manually (e.g., cash), online payment methods (e.g., online payment systems, mobile payment systems, digital wallet, credit card gateways, and the like), gift cards, and the like. At the end of the checkout process, an order is created. This order is a contract of sale between the merchant and the customer where the merchant agrees to provide the goods and services listed on the orders (e.g., order line items, shipping line items, and the like) and the customer agrees to provide payment (including taxes). This process may be modeled in a sales component. Channels 110A-B that do not rely on commerce management engine 136 checkouts may use an order API to create orders. Once an order is created, an order confirmation notification may be sent to the customer and an order placed notification sent to the merchant via a notification component. Inventory may be reserved when a payment processing job starts to avoid over-selling (e.g., merchants may control this behavior from the inventory policy of each variant). Inventory reservation may have a short time span (minutes) and may need to be very fast and scalable to support flash sales (e.g., a discount or promotion offered for a short time, such as targeting impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer facing concept representing the template of a product listing) from inventory items (a merchant facing concept that represent an item whose quantity and location is managed). An inventory level component may keep track of quantities that are available for sale, committed to an order or incoming from an inventory transfer component (e.g., from a vendor).

The merchant may then review and fulfill (or cancel) the order. A review component may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) and mark the order as paid. The merchant may now prepare the products for delivery. In some embodiments, this business process may be implemented by a fulfillment component. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. A custom fulfillment service may send an email (e.g., a location that doesn't provide an API connection). An API fulfillment service may trigger a third party, where the third-party application creates a fulfillment record. A legacy fulfillment service may trigger a custom API call from the commerce management engine 136 to a third party (e.g., fulfillment by Amazon). A gift card fulfillment service may provision (e.g., generating a number) and activate a gift card. Merchants may use an order printer application to print packing slips. The fulfillment process may be executed when the items are packed in the box and ready for shipping, shipped, tracked, delivered, verified as received by the customer, and the like.

If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees, or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Implementation of Product Returns Using an e-Commerce Platform

Figure 3:
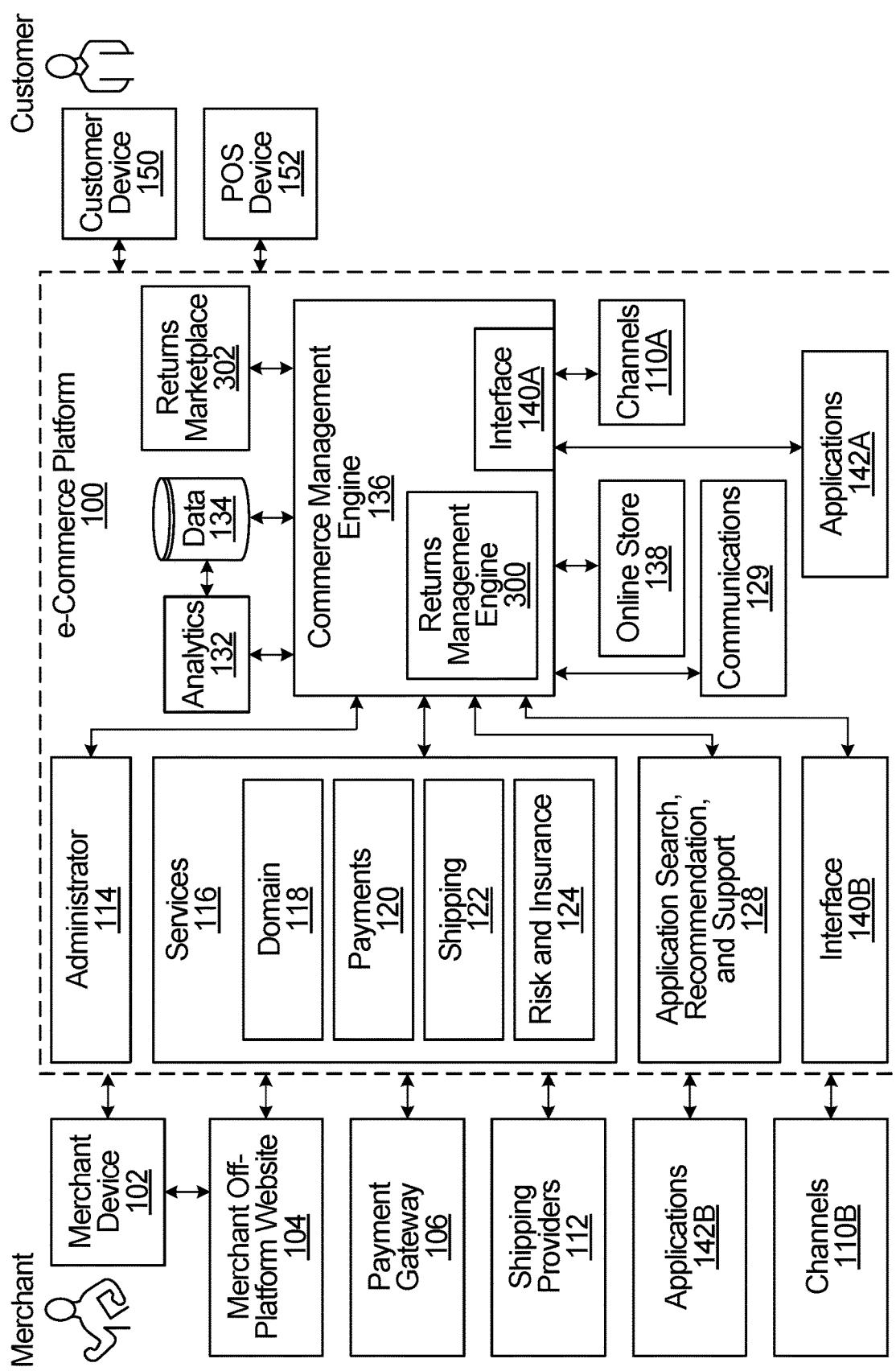
FIG. 3 illustrates the e-commerce platform of FIG. 1, but including a returns management engine and a returns marketplace.

The e-commerce platform 100 may permit customers to return one or more product(s) that they are unsatisfied with. FIG. 3 illustrates the e-commerce platform 100 of FIG. 1, but including a returns management engine 300 and a returns marketplace 302. The returns management engine 300 is an example of a return component that can implement any or all of the processes associated with product returns. The returns marketplace 302 is an online marketplace that offers returned products for sale to customers on the e-commerce platform 100. These returned products could include products that have been returned to a merchant and/or products that customers have indicated they intend to return, but have not yet been shipped to the merchant. A returns marketplace differs from an online store in that the returns marketplace is directed towards the resale of return items, and does not necessarily sell new items. A returns marketplace could be associated with a single merchant or multiple merchants.

As discussed in further detail below, the returns management engine 300 and the returns marketplace 302 could implement at least some of the functionality described herein. Although the embodiments described below may be implemented in association with e-commerce platform 100, the embodiments described below are not limited to the specific e-commerce platform 100 of FIGS. 1 to 3. Therefore, the embodiments below will be presented more generally in relation to any e-commerce platform.

Customer-to-Customer Returns

In some embodiments, an e-commerce platform can detect a customer's intent to return an item of a product and facilitate the return of that item back to the merchant. As used herein, the term "item" refers to an individual article or unit of a product that is sold by a merchant. For example, the product may be "red balloons", and when a customer purchases a package of red balloons the customer is purchasing one item of that product.

There may be a cost to the merchant that is associated with the return of an item. For example, the merchant may pay for the item to be shipped from the customer back to the merchant. If the item is resold by the merchant, which might not always be the case, the merchant may also pay for inspection, repackaging and shipping of the item to the next customer.

An e-commerce platform can reduce the cost associated with product returns by implementing a process referred to herein as a "customer-to-customer return". When implementing a customer-to-customer return, the e-commerce platform matches a first customer that intends to return an item of a particular product with a second customer that intends to purchase that product. The e-commerce platform can then facilitate shipment of the item from the first customer to the second customer, and potentially reduce shipping and repackaging costs for the merchant.

Figure 4:
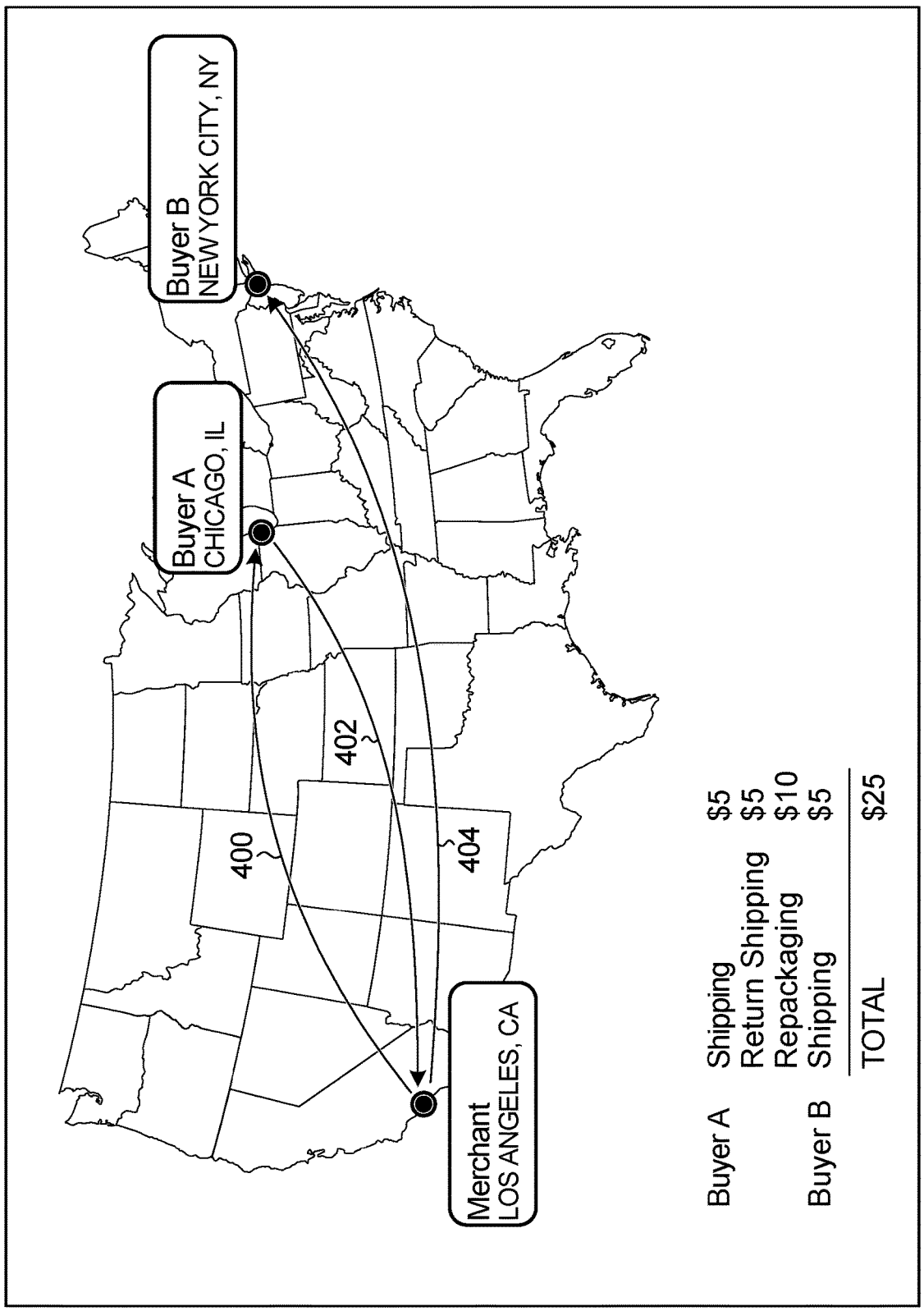
FIG. 4 is a diagram illustrating a conventional return process according to an embodiment.
Figure 5:
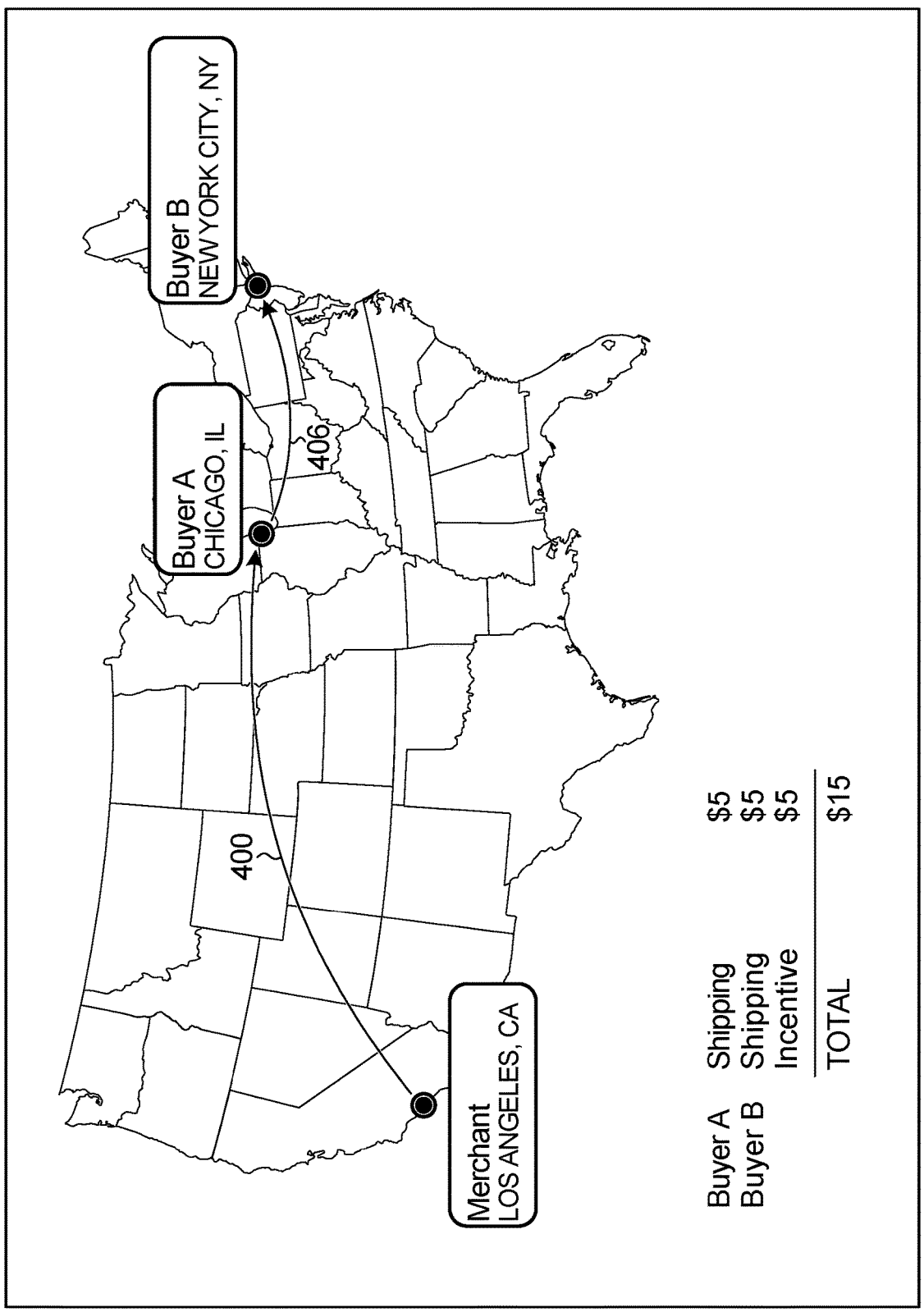
FIG. 5 is a diagram illustrating a customer-to-customer return process according to an embodiment.

A comparison between a conventional return process and a customer-to-customer return process is illustrated in FIGS. 4 and 5. FIG. 4 is a diagram illustrating a conventional return process according to an embodiment. FIG. 4 illustrates a merchant located in Los Angeles, a customer ("Buyer A") located in Chicago, and another customer ("Buyer B") located in New York City.

The locations of the merchant, Buyer A and Buyer B may be determined based on their respective shipping locations (for example, an address where items are shipped and/or received), and do not necessarily correspond to the physical locations of the merchant, Buyer A and Buyer B. For example, the merchant could be based in San Jose, but have a fulfillment center or packing warehouse in Los Angeles. The fulfillment center is the location from which the merchant's products are shipped and received. Therefore, from a shipping perspective, the location of the merchant is considered to be Los Angeles. The location of a merchant could also or instead include the location(s) of a supplier that the merchant uses for shipping and receiving items (for example, when the merchant uses a drop shipping method). The supplier location(s) could include a warehouse and/or a physical retail store that ship and/or receive items on behalf of the merchant. Similar comments apply to Buyers A and B. Buyer A might be an individual that resides in a town outside of Chicago, but works in an office in the city of Chicago. Buyer A prefers to ship and receive packages at their office, and therefore the location of Buyer A is considered to be Chicago.

Initially, Buyer A places an order with the merchant for an item of a product. The order could be placed, for example, using the online store 138 of FIG. 3. The merchant receives the order on the merchant device 102 of FIG. 3, for example, and sends the item to Buyer A using a shipment 400, which costs $5. Shipment 400 could be arranged using the shipping services 122 and performed by one of the shipping providers 112 of FIG. 3. In the example illustrated in FIG. 4, the merchant provides free shipping, and therefore the cost of shipment 400 is paid for by the merchant.

Upon receipt of the item, Buyer A is unsatisfied and wishes the return the item. For example, the item could be an article of clothing that is the wrong size. Buyer A could use the customer device 150 of FIG. 3 to indicate his/her intent to return the item, which could be received and processed by the returns management engine 300.

Buyer A ships the item back to the merchant using a shipment 402, which costs $5. As noted above, shipping the item back to the merchant encompasses the possibility of shipping the item back to a fulfillment center that is used by the merchant. The returns management engine 300 could facilitate shipment 402 by providing Buyer A with an appropriate shipping label and/or packaging for the shipment. Shipment 402 could be arranged using the shipping services 122 and performed by one of the shipping providers 112 of FIG. 3. The merchant provides free returns, and therefore the cost of shipment 402 is paid for by the merchant.

Although FIG. 4 illustrates an example in which the merchant ships and receives the item at the same location, this might not always be the case. For example, the merchant could have a fulfillment center in one location for shipping the product, and a fulfillment center in a different location for receiving returned products.

When the merchant receives the item from Buyer A, the merchant may perform an inspection to determine if the item is suitable for resale. Determining if an item is suitable for resale could include, but is not limited to, considering any damage to the item, considering the cleanliness of the item, checking for the presence of the items original packaging, and checking for the presence of the original tags on the item. In the case that the merchant determines the item is not suitable for resale, the item could be disposed of. In the case that the merchant determines the item is suitable for resale, the item could be offered for sale in a store (for example, the online store 138 of FIG. 3) and/or in a dedicated marketplace for returned products (for example, the returns marketplace 302 of FIG. 3). The item is then repackaged and made available for shipping to the next customer. The inspection and repackaging performed by the merchant has an associated cost. For example, the merchant might operate a fulfillment center and employ workers to perform inspections and repackaging.

In FIG. 4, the merchant determines that the item returned by Buyer A is suitable for resale. The cost to inspect and repackage the item is $10. Buyer B in New York City places an order with the merchant for the same product that was returned by Buyer A. The merchant then ships the returned item to Buyer B in a shipment 404, which costs $5. Again, the merchant covers this cost.

The cost of the conventional return process illustrated in FIG. 4 is $25. This only covers the costs associated with shipping, inspection and repackaging, and does not include, for example, the cost of manufacturing or procuring the item sold.

FIG. 5 is a diagram illustrating a customer-to-customer return process according to an embodiment. Similar to FIG. 4, FIG. 5 illustrates the merchant located in Los Angeles, Buyer A located in Chicago, and Buyer B located in New York City. FIG. 5 also illustrates the initial shipment 400 of the item to Buyer A.

In FIG. 5, when Buyer A initiates a return of the item, the return is implemented using a customer-to-customer return process. The customer-to-customer return process aims to match Buyer A with another customer that intends to purchase the product. In FIG. 5, Buyer A is matched with Buyer B, and Buyer A then sends the item directly to Buyer B in a shipment 406. The match between Buyer A and Buyer B could be determined using the returns management engine 300 of FIG. 3, for example. The returns management engine 300 could also provide Buyer A with a shipping label and/or packaging for shipment 406. Shipment 406 could be arranged using the shipping services 122 and performed by one of the shipping providers 112 of FIG. 3.

Shipment 406 costs a total of $5, which is paid for by the merchant. The merchant does not pay for repackaging of the item before shipment 406, as the merchant has no physical interaction with the item before the shipment. Repackaging could instead be performed, at least in part, by Buyer A.

For purchasing the item using a customer-to-customer return, the merchant issues Buyer B a $5 discount on the item. This discount is a form of incentive to encourage buyers to purchase items using the customer-to-customer return process, rather than purchasing new items directly from the merchant.

In FIG. 5, the cost of the customer-to-customer return process is $15. Compared to the conventional return process illustrated in FIG. 4, the merchant stands to save $10 using the customer-to-customer return process of FIG. 5. Thus, a potential benefit of a customer-to-customer return process is reduced cost for the merchant. Another potential benefit of a customer-to-customer return process is reduced environmental impact, as fewer (and possibly shorter) shipments are used to deliver the item to Buyer B. Fewer shipments might also result in less packaging being produced and wasted.

Implementation of Customer-to-Customer Returns

Figure 6:
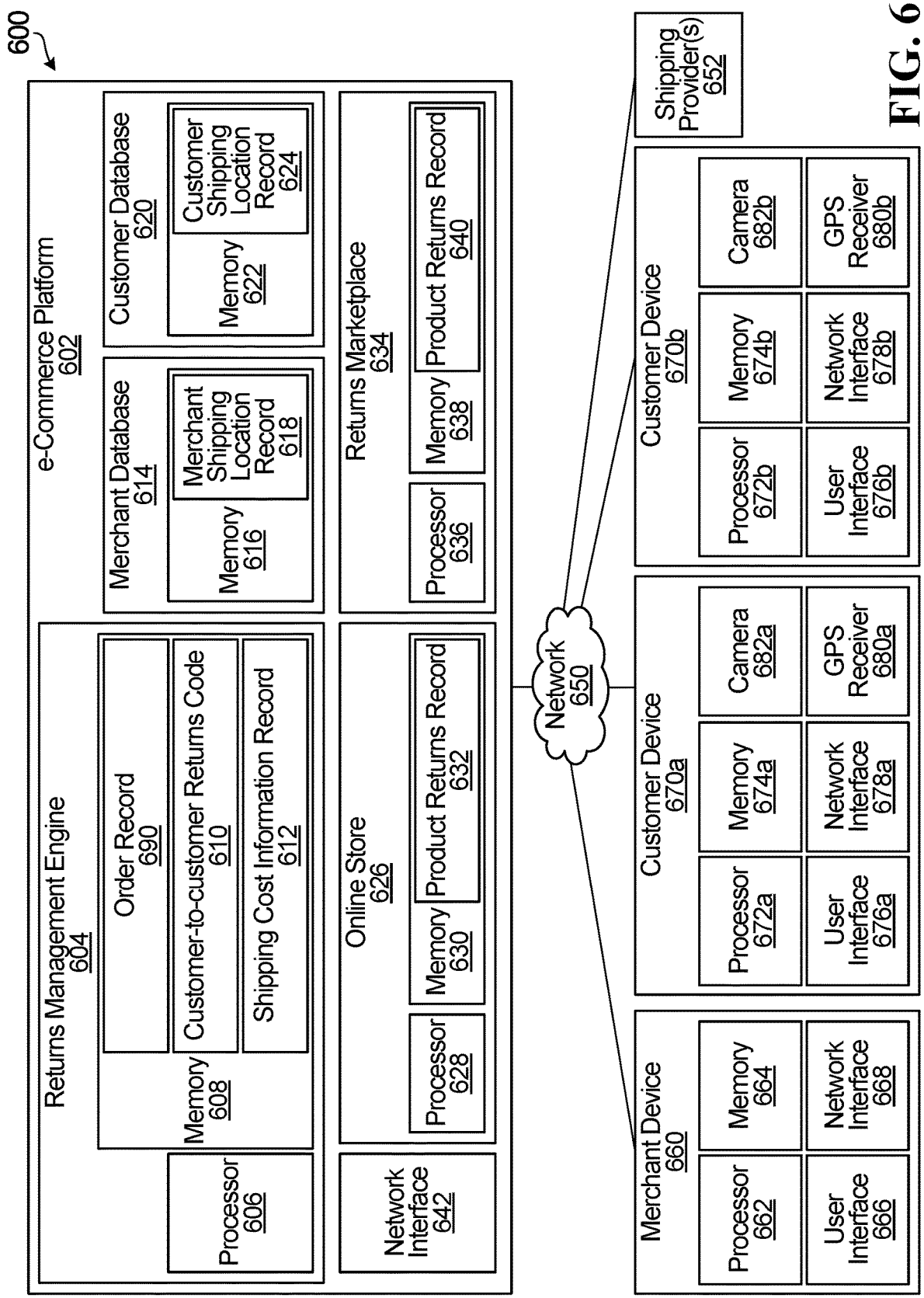
FIG. 6 is a block diagram illustrating an example system for implementing product returns.

FIG. 6 is a block diagram illustrating an example system 600 for implementing product returns. The system 600 includes an e-commerce platform 602, a merchant device 660, multiple customer devices 670a, 670b, one or more shipping provider(s) 652, and a network 650.

The e-commerce platform 602 includes a returns management engine 604 having a processor 606 and a memory 608. The processor 606 may be implemented by one or more processors that execute instructions stored in the memory 608. Alternatively, some or all of the processor 606 may be implemented using dedicated circuitry, such as an application specific integrated circuit (ASIC), a graphics processing unit (GPU), or a programmed field programmable gate array (FPGA). Customer-to-customer returns code 610 is an example of instructions stored in the memory 608 that could be executed by the processor 606. The processor 606 may execute the code 610 when a request for a customer-to-customer return process is received by the e-commerce platform 602, for example. The code 610 includes the logic and actions performed by the returns management engine 604 to determine if a customer-to-customer return should be offered in a particular situation (i.e., if a customer-to-customer return is in the best interest of the merchant and/or the customers). The code 610 also includes instructions to implement the customer-to-customer return.

The memory 608 also stores a shipping cost information record 612. The shipping cost information record 612 could be used by the code 610 for evaluating or implementing a customer-to-customer return process, as discussed elsewhere herein. The shipping cost information record 612 could include predicted and/or historical data associated with the cost of shipments between different locations. This data could be stored in the form of a table or other data structure with multiple entries, where each entry contains information corresponding to a respective shipment. The following is a non-limiting list of information that each entry in the shipping cost information record 612 could include:

shipment origin;
shipment destination;
shipment distance (e.g., distance in kilometers);
shipment duration (e.g., time in hours or days);
size and/or weight of the item(s) being shipped;
size and/or type of packaging used; and
shipping provider used.

The e-commerce platform 602 can receive an order or a request for a returned item of a product. In some cases, a customer may place such an order before the returned item is available on the e-commerce platform 602. Therefore, before the order can be fulfilled, the customer may have to wait for another customer to request a return of an item of that product. During this time, information related to the order can be saved in an order record 690 stored on the memory 608. The information could be held in the order record 690 until the order is fulfilled when another customer requests a return of a product that matches the product indicated in the order, or until a predefined time limit for the order expires.

As used herein, the term "order" encompasses any form of customer request for a product. Orders can be used to help manage or control the purchasing of items on an e-commerce platform. An order will often indicate that a customer intends to purchase one or more desired products. As noted above, orders can be placed for returned items. For example, an order could include an indication that a customer requests, prefers or will at least accept a returned item.

In some embodiments, an order represents an offer, issued by a customer, to purchase one or more items. The offer could include payment or prepayment for some or all of the items. In some embodiments, an order includes an in search of (ISO) list or a watch list. The ISO list identifies one or more items that a customer is interested in purchasing. An order could be directed towards a particular merchant or group of merchants, or the offer could be open to any merchant on an e-commerce platform.

A desired product that is included in an order could be a specific product or a product type. To indicate a specific product, the order might include an identifier of the product such as a product name and/or model number, and the merchant that sells the product. If more than one merchant sells the product, then multiple merchants could be indicated in the order. A product type is a more general description of a product that might encompass multiple different products. For example, a customer could submit an order for a 40" TV, and any model of TV that matches that product type could be potentially sold to the customer through a customer-to-customer return. When the e-commerce platform 602 receives an order for a product type, the e-commerce platform could determine multiple products sold on the e-commerce platform that correspond to the product type.

In some embodiments, one or more constraints are placed on a desired product included in an order. Non-limiting examples of such constraints include:

a maximum price that the customer is willing to pay for the desired product;
an minimum discount (measured in a currency or in a percentage of the original price, for example) applied to the price of the product;
a time limit for receiving the desired product, measured in days, weeks, or months, for example; and
a condition of the desired product (for example, if the order indicates that returned items will be accepted).

The order record 690 could include information relating to any or all unfulfilled orders for returned items that have been received by the e-commerce platform 602. In some implementations, the order record 690 is specific to orders for returned items, but this might not always be the case. The order record 690 could also include orders for new items. When an order for a returned item of a product is received by the e-commerce platform 602 and cannot be immediately fulfilled, then information related to the order can be added to the order record 690. The code 610 could use the order record 690 to help match a customer that wishes to purchase a returned item of a product with another customer that wishes return to return an item of the product. When the returns management engine receives an indication that a customer intends to return an item of a product, the code 610 could search the order record 690 to determine if that product matches a product requested in an order. After an order in the order record 690 is fulfilled, the order can be removed from the order record.

Orders for returned items could be stored in the order record 690 in the form of a table or other data structure with multiple entries, where each entry contains information corresponding to a respective order. The following is a non-limiting list of information that each entry in the order record 690 could include:

an identifier of the order;
time and date the order was received;
customer name and/or other identifiers indicating the customer that placed the order;
a shipping location of the customer;
an indication of each desired product included in the order, such as product names, model numbers, product types, product descriptions, and merchant information, for example;
for each product type included in the order, an indication of one or more products that correspond to that product type;
any constraints placed on each desired product;

type of compensation offered or expected (for example, monetary compensation and/or a tax receipt could be offered for the product);

quantity of items for each desired product;

an indication that some or all of the desired product(s) have been prepaid; and an indication that the customer will accept returned items for one or more of the desired product(s) (if the order record 690 is specific to orders for returned items, then this indication might instead be implied by the order being recorded in the order record 690).

Although the order record 690 is illustrated as being implemented in the returns management engine 604, this is only an example. The order record 690 could also or instead be implemented elsewhere in an e-commerce platform. For example, the order record could be stored in association with an online store or a returns marketplace.

The e-commerce platform 602 also includes a merchant database 614 and a customer database 620, which each include a respective memory 616, 622. The memory 616 stores a merchant shipping location record 618, and the memory 622 stores a customer shipping location record 624.

The merchant shipping location record 618 is an example of a data structure that identifies any or all of the merchants associated with the e-commerce platform 602. For each merchant, one or more of their known shipping locations are stored in the merchant shipping location record 618. An example of a shipping location is the address of a fulfillment center that is used by a merchant. The shipping locations could be provided when the merchants create an account on the e-commerce platform 602, for example. Merchants may also continuously update their shipping locations on the e-commerce platform 602. Some merchants might have multiple different shipping locations, all of which could be stored in the merchant shipping location record 618. Different shipping locations could be used by a merchant for shipping different products and/or for performing different processes. For example, some shipping locations could be used for facilitating product returns, while others might not. The merchant shipping location record 618 could associate each shipping location with the products that are shipped from that location, the stock of each product at that location, and the processes performed at that location.

The customer shipping location record 624 is an example of a data structure that identifies any or all of the customers associated with the e-commerce platform 602. These could be customers that have an account on the e-commerce platform 602 and/or customers that have previously used the e-commerce platform to purchase a product. For each customer, one or more of their known shipping locations are stored in the customer shipping location record 624. In some cases, the shipping locations could be provided by the customers themselves. For example, a customer may provide a shipping location when they register for an account on the e-commerce platform 602. A shipping location could also be provided when a customer places an order with any merchant on the e-commerce platform 602. In some cases, customer shipping locations could be determined by the e-commerce platform 602 without any direct input from the customers. For example, global positioning system (GPS) data and/or internet protocol (IP) addresses that are associated with a customer could be used to determine a predicted shipping location for that customer. A customer may be associated with multiple different shipping locations, and the customer shipping location record 624 could store all of these different shipping locations for that customer. The multiple different shipping locations could be organized from most used or most accurate, to least used or least accurate. A shipping location provided by a customer would be considered more accurate than one determined based on GPS data, for example.

A shipping location for a customer or merchant might not be an exact or complete address. For example, a shipping location could include a country, region, state, province, city and/or street name, but not include an exact house or building number. This could be the case when limited information is available, or a degree of privacy for the merchant or customer is desired.

The e-commerce platform 602 further includes an online store 626 implemented using a processor 628 and a memory 630. The processor 628 may be implemented by one or more processors that execute instructions stored in the memory 630. Alternatively, some or all of the processor 628 may be implemented using dedicated circuitry, such as an ASIC, GPU, or FPGA. The memory 630 stores a product returns record 632, which is an example of a data structure that identifies any or all of the pending product returns being implemented by the e-commerce platform 602. These pending product returns could be at any stage in a return process, ranging from when a customer initially requests the return of an item to when the returned item is delivered to another customer, for example. The following is a non-limiting list of information that could be stored in the product returns record 632:

product type, including specific details such as the size and color of the product, for example;

number of items being returned;

location of the customer that requested the return;

condition of the item(s), which could be determined by the merchant and/or the customer that requested the return;

images of the item(s);

type of return requested (for example, a conventional or customer-to-customer return);

level of discount and/or pricing acceptable to the merchant;

date when the return was requested; and status of the product return (for example, return requested, item shipped to merchant, item received by merchant, item under inspection by merchant, item disposed of, item made available for resale, or item sold).

In addition to the online store 626, the e-commerce platform 602 includes a returns marketplace 634 implemented using a processor 636 and a memory 638. The processor 636 may be implemented by one or more processors that execute instructions stored in the memory 638. Alternatively, some or all of the processor 636 may be implemented using dedicated circuitry, such as an ASIC, GPU, or FPGA. The memory 638 stores a product return record 640, which is an example of a data structure that identifies any or all of the pending product returns being implemented by the e-commerce platform 602. The product return record 640 could be similar to the product return record 632, however there could also be differences in the specific information being stored and the formatting of the information, for example. In some embodiments, the product return records 632, 640 are actually the same record that is accessed by both the online store 626 and the returns marketplace 634.

In some embodiments, the returns marketplace 634 and online store 626 are integrated. For example, the returns marketplace 634 and the online store 626 could be presented to users through a single website or mobile application. The returns marketplace 634 could also or instead be a separate website or application that is accessible through the online store 626. In some embodiments, the returns marketplace 634 and the online store 626 are implemented using a shared processor and memory. More generally, any or all of the processors 606, 628, 636 could be implemented using a single processor, and any or all of the memories 608, 616, 622, 630, 638 could be implemented using a single memory.

The e-commerce platform 602 also includes a network interface 642 for communication over the network 650. The structure of the network interface 642 is implementation specific. For example, in some implementations the network interface 642 may include a network interface card (NIC), a computer port (e.g., a physical outlet to which a plug or cable connects), and/or a network socket.

The merchant device 660 may be a mobile phone, tablet, laptop, or computer owned and/or used by a merchant. The merchant device 660 includes a processor 662, memory 664, user interface 666 and network interface 668. An example of a user interface is a display screen (which may be a touch screen), a keyboard, and/or a mouse. The network interface 668 is provided for communicating over the network 650. The structure of the network interface 668 will depend on how the merchant device 660 interfaces with the network 650. For example, if the merchant device 660 is a mobile phone or tablet, the network interface 668 may include a transmitter/receiver with an antenna to send and receive wireless transmissions to/from the network 650. If the merchant device is a personal computer connected to the network with a network cable, the network interface 668 may include, for example, a NIC, a computer port, and/or a network socket. The processor 662 directly performs or instructs all of the operations performed by the merchant device 660. Examples of these operations include processing user inputs received from the user interface 666, preparing information for transmission over the network 650, processing data received over the network 650, and instructing a display screen to display information. The processor 662 may be implemented by one or more processors that execute instructions stored in the memory 664. Alternatively, some or all of the processor 662 may be implemented using dedicated circuitry, such as an ASIC, a GPU, or a programmed FPGA.

The customer devices 670a, 670b may be mobile phones, tablets, laptops, or personal computers owned and/or used by respective customers. However, more generally, some customers may have more than one customer device. Each customer device 670a, 670 includes a respective processor 672a, 672b, memory 674a, 674b, user interface 676a, 676b, and network interface 678a, 678b. In some implementations, either or both of the customer devices 670a, 670b is/are similar to the merchant device 660. For example, the processors 672a, 672b, memories 674a, 674b, user interfaces 676a, 676b and network interfaces 678a, 678b could be similar to the processor 662, memory 664, user interface 666 and network interface 668 of the merchant device 660. The customer devices 670a, 670b further include respective GPS receivers 680a, 680b and cameras 682a, 682b. The GPS receivers 680a, 680b are provided to receive information from GPS satellites and calculate the location of the customer devices 670a, 670b based on this information. The memories 674a, 674b could include software executed by the processors 672a, 672b to process the information from the GPS receivers 680a, 680b. The cameras 682a, 682b are provided to take photographs, which can be stored in the memories 674a, 674b.

The number of merchant and customer devices in the system 600 is shown by way of example. Other systems including more or fewer merchant and/or customer devices are also contemplated.

The system 600 could be used to implement a customer-to-customer return process. An example of such a customer-to-customer return process is described below with reference to FIG. 7, which is a flow diagram illustrating a customer-to-customer return process 700 according to an embodiment. The process 700 includes multiple steps 702, 704, 706, 708, 710, 712, 714, 716.

It should be noted that the system 600 is just one example of a system capable of implementing the process 700. In general, the process 700 could also be implemented using other systems.

Figure 7:
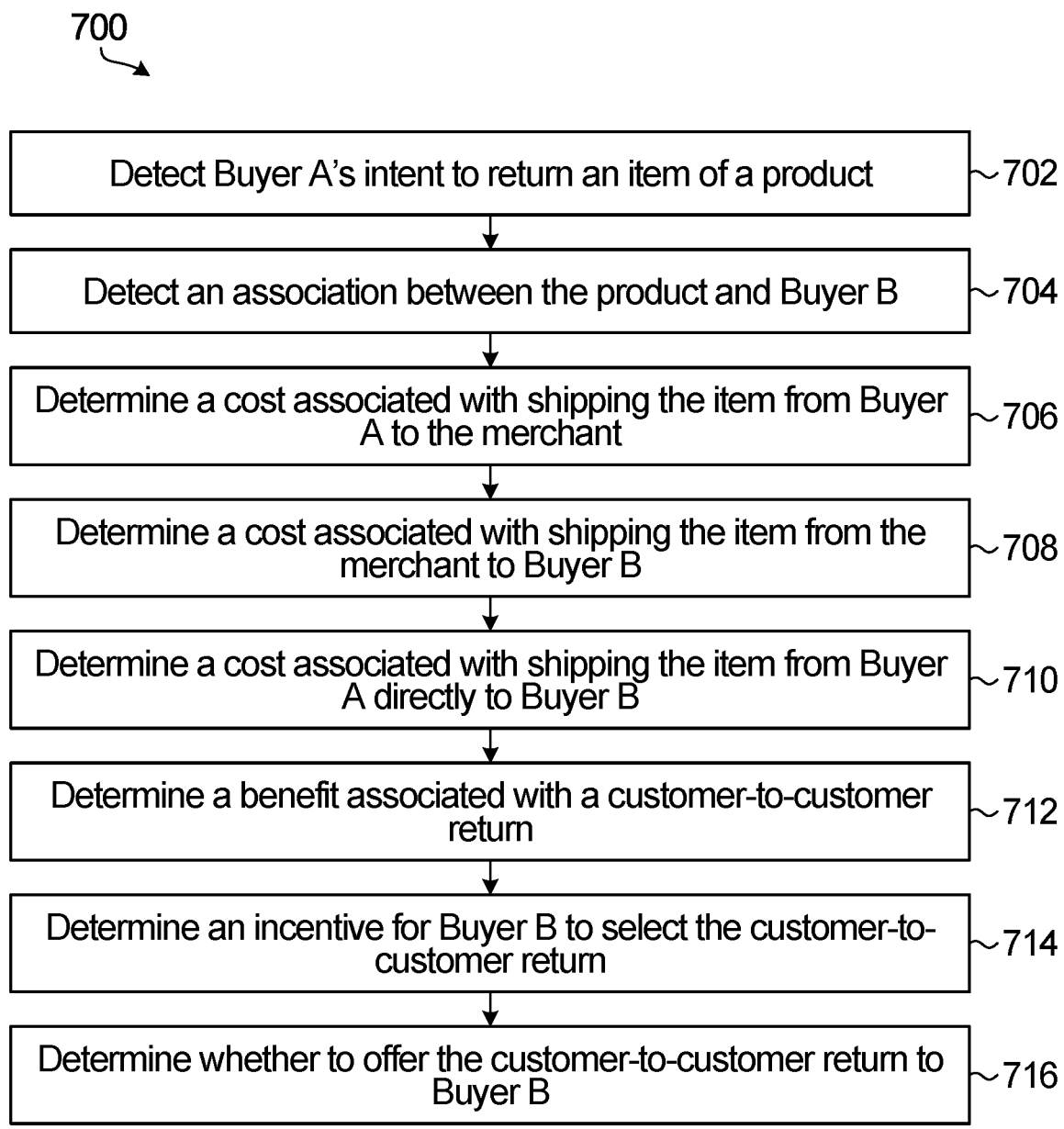
FIG. 7 is a flow diagram illustrating a customer-to-customer return process according to an embodiment.

Step 702 of FIG. 7 includes detecting Buyer A's intent to return an item of a product that was previously purchased from a merchant. Buyer A is a customer that uses the customer device 670a to transmit a message indicating their intent to return the item to the e-commerce platform 602. For example, Buyer A could log into and access the e-commerce platform 602 using the customer device 670a to view their previous orders. A user interface is presented on the customer device 670a that allows Buyer A to select an item and then select "return my item". If "return my item" is selected, then a message is sent to the e-commerce platform 602 indicating that the identified item is to be returned.

In step 702, the message sent from the customer device 670a indicates both: (i) that Buyer A wants to return the item, and (ii) that Buyer A is willing to ship the item to another buyer. Buyer A may also be offered the option of instead shipping the item back to the merchant, and if that option were to be selected by Buyer A then an alternative message is instead received by the system indicating both: (i) that Buyer A wants to return the item, and (ii) that Buyer A wants to ship the item directly back to the merchant and is not willing to ship his/her item to another buyer.

Upon receipt of the message from Buyer A indicating their intent to return the item, the e-commerce platform 602 could add the details of Buyer A's item to the product returns records 632, 640. However, the item might not be viewable to a customer searching the online store 626 and/or the returns marketplace 634 until that customer has been matched with Buyer A, as discussed in further detail below.

A possible challenge associated with implementing product returns in an e-commerce platform is enabling a merchant to verify the condition of an item before the return. When product returns occur in a physical store, the merchant can physically inspect the item in person and verify its condition. In contrast, for product returns implemented in an e-commerce platform, a customer and a merchant might be separated by a large distance, and therefore the merchant might not be able to physically inspect the item. Therefore, in some embodiments, Buyer A may be required to upload a digital photograph of the item being returned. The photograph could be taken by the camera 682a in the customer device 670a. Buyer A may also (or instead) be required to indicate the condition of his/her item. This information is received and stored in the e-commerce system 602 (for example, in the product returns records 632, 640), and may be subsequently reviewed by the merchant. The merchant could receive the details of the product return using the merchant device 660. For example, the merchant could login to their account on the e-commerce platform 602 to review Buyer A's return request. The merchant may optionally review the photograph and/or reported condition of the item. The merchant might need to provide approval of the return request before the e-commerce system 602 offers the item for sale. If the merchant reviews the details of the product return and determines that the product is not suitable for resale, the item could be removed from the product returns records 632, 640, and process 700 ends.

Step 704 includes the e-commerce platform 602 detecting an association between the product and Buyer B. Buyer B is a customer that uses the customer device 670b. The customer device 670b could be logged-in to Buyer B's account on the e-commerce platform 602, or Buyer B could be using the e-commerce platform anonymously. The e-commerce platform 602 could detect the association between the product and Buyer B based on actions performed by the customer device 670b. For example, an association between the product and Buyer B could include an indication that Buyer B may be interested in purchasing an item of the product. Non-limiting examples of such an indication include:

Buyer B having previously placed an order (stored in the order record 690, for example) indicating that Buyer B is interested in purchasing the product, and that Buyer B will accept a returned item of the product;

Buyer B searching the merchant's online store using one or more keyword(s) that match the description of the product;

Buyer B visiting the merchant's webpage for the product;

Buyer B adding an item of that product to their cart;

Buyer B being in the process of checking out while an item of that product is in Buyer B's cart; and the merchant manually indicating to the e-commerce platform 602 that Buyer B is interested in the product (for example, if Buyer B and the merchant have exchanged email and/or text messages about the product).

An association between the product and Buyer B may also or instead include Buyer B having already purchased an item of the product, but the item has not yet been fulfilled/shipped to Buyer B. Such a situation could occur if Buyer A's intent to return the item is detected after Buyer B has already purchased an item of the product, but before the item has been shipped to Buyer B.

Although the e-commerce platform 602 has detected an association between Buyer B and the product that Buyer A wants to return, this does not necessarily mean that a customer-to-customer return between Buyer A and Buyer B is in the best interest of the merchant, Buyer A and/or Buyer B. For example, the e-commerce platform 602 may not want to present Buyer B with the option to purchase Buyer A's item if the returns management engine 604 determines that the cost to ship the item directly from Buyer A to Buyer B exceeds the cost of the two-step approach of (i) Buyer A shipping the item back to the merchant, and (ii) the merchant shipping a new item of that product to Buyer B. In that scenario, steps 706, 708, 710, 712, 714, 716 are performed, in part, by the customer-to-customer returns code 610 to determine if a customer-to-customer return between Buyer A and Buyer B is in the best interest of the merchant.

Step 706 includes determining a cost associated with shipping the item from Buyer A to the merchant. To determine this cost, the returns management engine 604 queries the merchant shipping location record 618 and the customer shipping location record 624 to determine the shipping locations of the merchant and Buyer A, respectively. The shipping location of Buyer A could have been provided when Buyer A originally purchased the item. In some embodiments, even if a shipping location for Buyer A is stored in the customer shipping location record 624, the e-commerce platform 602 could send a message to the customer device 670a that requests Buyer A to confirm the item will be returned from this shipping location.

The shipping location of the merchant may have been previously provided by merchant. If the merchant has multiple shipping locations stored in the merchant shipping location record 618, then the code 610 could select the shipping location that is closest to Buyer A and available to accept the item. Alternatively, the code 610 could select the shipping location that the merchant used to originally send the item to Buyer A.

In addition to determining the shipping locations of the merchant and Buyer A, the returns management engine 604 may determine other details that might affect the cost of the return shipment. Non-limiting examples of such details include the size and weight of the item, the fragility of the item, and the desired shipping time for the item.

Using the details of the return shipment from Buyer A to the merchant, the code 610 determines or calculates the cost of this return shipment in step 706.

In some embodiments, step 706 could include determining a monetary cost associated with shipping the item from Buyer A to the merchant (i.e., a cost in dollars or any other currency). The e-commerce platform 602 could communicate with one or more of the shipping provider(s) 652 to obtain this monetary cost. For example, the e-commerce platform 602 could make an API call to one or more of the shipping provider(s) 652, and the shipping provider(s) 652 could then provide a quote for the shipment.

Historical and/or predicted shipping prices stored in the shipping cost information record 612 could also or instead be used by the code 610 to determine the monetary cost of a shipment from Buyer A to the merchant. If the shipping cost information record 612 stores information regarding a previous shipment that is similar to the return shipment from Buyer A to the merchant, then the code 610 could determine that the cost of the return shipment from Buyer A would approximately equal the cost of this previous shipment. In one example, if the shipping location of the merchant is Vancouver, the shipping location of Buyer A is Toronto, and the shipping cost information record 612 is storing information regarding a previous shipment from Toronto to Vancouver that cost $5, then the code 610 could determine that the cost of shipping the item from Buyer A to the merchant is $5. However, if the item that was shipped in this previous shipment weighed 1 kg and the item that Buyer A intends to return weighs 2 kg, then the code 610 could scale the cost of the previous shipment by a factor of 1.5, for example, and determine that the cost of shipping the item from Buyer A to the merchant is $7.50. The code 610 could also interpolate between the costs of two or more previous shipments that are stored in the shipping cost information record 612. For example, the shipping cost information record 612 might store information regarding another previous shipment from Toronto to Vancouver that cost $11, where the shipped item weighed 3 kg. The code 610 could then interpolate between these two previous shipments and determine that the cost of shipping the item from Buyer A to the merchant is [($11−$5)/(3 kg−1 kg)]×(2 kg−1 kg)+$5=$8. In addition to item weight, interpolation could also be performed for other shipping details such as shipping distance and item size, for example.

In some embodiments, step 706 could include determining a computer-measurable metric that is indicative of the monetary cost associated with shipping the item from Buyer A to the merchant. An example of such a computer-measurable metric is the distance from Buyer A to the merchant. The code 610 could determine a distance between the shipping locations of the merchant and Buyer A, and assume that the cost of the return shipment is proportional to this distance. The distance could be a straight line distance, or the distance of a predicted shipping route using roads, for example. The e-commerce platform 602 could make an API call to a third party application (for example, Google's™ Distance Matrix API) to determine the distance. By way of example, if the shipping location of the merchant is Vancouver, the shipping location of Buyer A is Toronto, and the distance between these shipping locations is 4,000 km, then the cost determined at step 706 could be 4,000 km.

In some embodiments, the cost determined at step 706 is or includes an environmental cost associated with shipping the item from Buyer A to the merchant. For example, the impact of shipping the item from Buyer A to the merchant could be quantified in terms of the amount of $CO_2$ that is produced by the shipment.

Referring now to step 708 of FIG. 7, this step includes determining a cost associated with shipping an item of the product from the merchant to Buyer B. The item could be a new item, a previously returned item, or even Buyer A's item after it is returned to the merchant. To determine the cost at step 708, the returns management engine 604 queries the customer shipping location record 624 to determine the shipping location of Buyer B. The location of Buyer B may be stored in the record 624 if: (i) Buyer B is a customer that has an account with the e-commerce system, and (ii) that account has a shipping location associated with Buyer B. However, the system would need to recognize that the customer device 670b is associated with Buyer B, for example, by Buyer B logging on to the e-commerce platform 602 using his/her account, or based on a cookie. It should be noted that Buyer B could have an account on the e-commerce platform 602 if they have shopped with any merchant on the platform, not only the merchant that Buyer A purchased the item from. In some embodiments, the customer device 670b may be recognized as associated with Buyer B if the customer device 670b is associated with a particular pay account on the e-commerce platform. If the pay account has been used to make a previous purchase with a previous merchant on the e-commerce platform, then Buyer B's shipping location may be recorded.

If the record 624 does not include a shipping location for Buyer B, then the e-commerce platform 602 could perform additional actions to determine a shipping location. In some embodiments, the e-commerce platform 602 sends a message to the customer device 670b requesting that Buyer B provide their shipping location. Also or alternatively, the e-commerce platform could query the customer device 670b to provide an IP address and/or GPS coordinates with which the location of the customer device can be estimated. The IP address of customer device 670b may also be extracted from the website requests made by customer device 670b. The estimated location of the customer device 670b could be determined using the IP address and/or the GPS coordinates, and this estimated location could be assumed to approximate the shipping location of Buyer B. In some embodiments, even if the shipping location of Buyer B is stored in the record 624, the e-commerce platform 602 could still perform one or more of the additional actions described above to confirm this shipping location. In some embodiments, other browser location methods may be used to estimate the location of customer device 670b.

The shipping location of the merchant may already be known from step 706. However, if the merchant has multiple shipping locations that are stored in the merchant shipping location record 618, one shipping location could be used to receive the item from Buyer A, and a different shipping location could be used to ship a new item of the product to Buyer B. In step 708, the code 610 could use the closest merchant shipping location to Buyer B that has the product in stock.

Using the details of the shipment from the merchant to Buyer B, the code 610 could determine or calculate the cost of this shipment. In some embodiments, the method performed by the code 610 in step 708 is similar to the method performed in step 706, but using the shipping locations of the merchant and Buyer B determined in step 708.

Determining the cost associated with shipping the item from the merchant to Buyer B in step 708 could also include determining the cost associated with inspecting and repackaging the returned item. As discussed above with reference to FIG. 4, when a returned item is received at a fulfillment center, for example, the merchant may arrange for the item to be inspected to determine if it is suitable for resale, and if so, arrange for the item to be repackaged. These activities might require space in the fulfillment center and the employment of personnel, both of which have an associated cost that could be included in the cost determined in step 708. However, the cost associated with inspection and repackaging the item might not always be included in the cost determined at step 708.

In some embodiments, the inspection and repackaging costs are fixed for each merchant (i.e., the costs are independent of the item being inspected and repackaged). In other embodiments, the inspection and repackaging costs could vary based on the size of the item, the weight of the item, and/or the fulfillment center at which inspection and repackaging occurs, for example. The cost of inspection and repackaging (fixed and/or variable) could be set by each merchant and stored in the shipping cost information record 612.

In some cases, the cost determined in step 708 might be a combination of two different metrics. For example, the cost of shipping from the merchant to Buyer B could be in terms of kilometers, while the cost of inspection and repackaging could be terms of dollars. In these cases, the code 610 would convert one of these costs such that the total cost determined in step 708 is represented by a single metric (for example, a single number in dollars or kilometers).

The sum of the costs determined in steps 706, 708 represents the approximate cost of implementing a conventional return process. Step 710 includes determining a cost associated with shipping the item from Buyer A directly to Buyer B, which represents the approximate cost of implementing a customer-to-customer return process. In some embodiments, the method performed by the code 610 to determine the cost of shipping the item from Buyer A to Buyer B is similar to the method performed in step 706 and/or step 708, but using the shipping locations of Buyer A and Buyer B. The shipping locations of Buyer A and Buyer B are already known from steps 706, 708.

In some embodiments, Buyer B's location is not the location of a particular customer, but instead is a particular area (for example, a city) that is known to have a high demand for the product being returned by Buyer A. The code 610 could determine that shipping the item to this area would likely result in the item being resold, and could determine that the merchant has a physical store, fulfillment center, supplier and/or third party service provider (for example, a shipping provider) in this area to facilitate receiving, storing and shipping the item. The physical store, fulfillment center, supplier and/or third party service provider could act as an intermediate shipping location to hold the item in abeyance for further delivery once Buyer B has been identified in the particular area. In other words, before Buyer B is found, the code 610 could decide to implement a customer-to-customer return in a particular area based on the demand for the product in the particular area. This can potentially increase the number of matches between Buyer A and other customers, and avoid Buyer A having to store the item for extended periods of time before Buyer B is found. In these embodiments, the code 610 could use the location of the physical store, fulfillment center, supplier and/or third party service provider in the particular area as the location of Buyer B when determining the costs in steps 708, 710.

The costs determined in steps 706, 708, 710 should all be represented in terms of the same metric (for example, kilometers or dollars) so that the costs can be compared to each other. Furthermore, for consistency, it might be desirable to use the same method for determining shipping costs in all of steps 706, 708, 710.

In step 712, the code 610 determines a benefit associated with implementing a customer-to-customer return process compared to a conventional return process. This benefit represents the potential cost savings to the merchant. To determine the benefit, the code 610 compares the estimated cost of the conventional return process (for example, the sum of the costs determined at steps 706, 708) to that of the customer-to-customer return process (for example, the cost determined at step 710). As discussed above, the costs determined at steps 706, 708, 710 can be expressed in terms of a currency (for example, dollars) or distance, and therefore the benefit can also be expressed in terms of a currency or distance.

In some embodiments, the determination of the benefit is a binary process. In other words, if the cost of the conventional return process is greater than the cost of the customer-to-customer return process, the code 610 determines that there is a benefit, but no value is specifically assigned to the benefit. If the cost of the conventional return process is less than the cost of the customer-to-customer return process, the code 610 determines that there is no benefit.

In other embodiments, the determination of the benefit includes quantifying the benefit. This benefit could be calculated by subtracting the cost of the customer-to-customer return process from the cost of the conventional return process. In one example, the cost determined at step 706 is $5, the cost determined at step 708 is $10, the cost determined at step 710 is $5, and the benefit is determined to be $5+$10−$5=$10.

In another example, the distance between Buyer A and the merchant is 4,000 km, the distance between Buyer B and the merchant is 6,000 km, and the distance between Buyer A and Buyer B is 5,000 km. The benefit of the customer-to-customer return could be calculated as 4,000 km+6,000 km−5000 km=5,000 km. In other words, using the customer-to-customer return, the merchant could avoid paying to ship the item a distance of 5,000 km.

Step 714 includes determining an incentive for Buyer B to select a customer-to-customer return. One example of such an incentive is a discount that could be applied to the cost of the item. In some embodiments, the value of the discount is fixed by the merchant or by the e-commerce platform 602. In other embodiments, the value of the discount is dynamically determined based on the benefit of the customer-to-customer return determined at step 712. The larger the benefit, the larger the discount offered to Buyer B.

In some embodiments, the discount is a proportion of the benefit. For example, the discount could be 50% of the benefit. Therefore, if the benefit is $10, then the discount for Buyer B would be $5.

In some embodiments, different ranges of benefits could be associated with different discounts. For example, a benefit of 0 km-1,000 km is assigned a benefit of $0, a benefit of 1,001 km-2,000 km is assigned a discount of $1, a benefit of 2,001 km-3,000 km is assigned a benefit of $2, and so on.

In addition to the benefit of the customer-to-customer return, the incentive for Buyer B could also or instead be calculated based on other factors, which include but are not limited to:

the availability of the product (for example, if demand for the product exceeds supply, a lower (or no) incentive could be offered);

the number of customers that intend to return the same product (for example, if the e-commerce platform 602 has detected several customers that intend to return the same product, a larger incentive could be offered); and a reduction in environmental impact (for example, a larger incentive could be offered in order to promote reducing pollution and/or waste).

In some embodiments, the incentive is stipulated by Buyer B. For example, in the case that Buyer B has placed an order for a returned item of the product, the order might indicate a price that Buyer B is willing to pay for the returned item. A discount or other incentive might then be calculated based on that price.

Another example of an incentive for Buyer B is earning points that are associated with Buyer B's account on the e-commerce platform 602. The points could be applied to future services and/or discounts on the e-commerce platform 602. Buyer A could also earn points when he/she selects the customer-to-customer return option, in order to encourage customers to return their items using customer-to-customer returns.

Buyers A and/or B might also be incentivized by the environmental benefits of a customer-to-customer return process (for example, reduced pollution). Therefore, Buyer B may be interested in a customer-to-customer return process without being offered a monetary incentive.

Step 716 includes determining whether to offer the customer-to-customer return to Buyer B. The customer-to-customer return might only be offered to Buyer B if there is a positive benefit for the merchant.

In some embodiments, a discount determined at step 714 is compared with a price that Buyer B is willing to pay. This price could be indicated in an order placed by Buyer B, for example. If the price of the item after applying the discount is equal to or less than the price Buyer B is willing to pay, then the customer-to-customer return might be offered to Buyer B.

In some embodiments, determining whether to offer the customer-to-customer return to Buyer B is based on the condition of Buyer A's item. For example, Buyer B could have placed an order for a returned item and indicated a desired or required condition of the returned item. If condition of Buyer A's item does not meet or exceed the condition desired by Buyer B, then the customer-to-customer return might not be offered to Buyer B.

In some embodiments, the code 610 determines whether to offer the customer-to-customer return to Buyer B by comparing the benefit determined at step 712 against a predetermined threshold. The predetermined threshold can be positive, negative, or zero. If the benefit exceeds this threshold, then a customer-to-customer return could be offered. The predetermined threshold is set based on factors that are not included in the calculation of the benefit. Non-limiting examples of such factors include:
- the incentive(s) determined at step 714 (for example, the threshold could be increased by an amount equal to the incentive);
- the price that Buyer B intends to pay for the item (as indicated in an order placed by Buyer B, for example);
- the cost associated with inspecting and repackaging the item, if these costs are not included in the calculation of the benefit (for example, the threshold could be decreased by the cost of inspecting and repackaging the item); and
- shipping the item across international borders (for example, if an item has been shipped from Canada to the U.S.A. and has cleared U.S. customs, it may be desirable to avoid shipping the item back to Canada, and therefore the threshold could be decreased).

If Buyer B is associated with a benefit that is greater than a predetermined threshold, then Buyer A and Buyer B could be matched. A match is an example of a logical connection formed between Buyer A and Buyer B by the returns management engine 604. The match indicates that a customer-to-customer return between Buyer A and Buyer B is advantageous. As a result of the match, the option of purchasing Buyer A's item is made available to Buyer B. Different options for offering Buyer A's item to Buyer B are contemplated.

In one example, Buyer B is viewing the product on the merchant's online store 626 and the code 610 determines a match between Buyer A and Buyer B. The online store 626 then presents Buyer A's item (and any associated discount) to Buyer B using the details of the item stored in the product returns record 632.

In another example, Buyer B has added the product to their cart on the merchant's online store 626, and is in the checkout process to buy the item. At this point, Buyer B has confirmed his/her shipping address, and the code 610 determines a match between Buyer A and Buyer B. Before the checkout process is complete, the online store 626 presents Buyer A's item (and any associated discount) to Buyer B using the details of the item stored in the product returns record 632.

In yet another example, Buyer B places an order for an item that corresponds to Buyer A's product, and indicates that he/she is willing to accept a returned item. In the order, Buyer B provides or confirms their shipping location. The order is not immediately fulfilled, and therefore the order is stored in the orders record 690. Reasons that the order is not immediately fulfilled could include Buyer B requesting a discounted item, and no discounted item being available on the e-commerce platform 602 at the time the order is received. In this example, the e-commerce platform 602 could detect an association between Buyer B and the product before detecting Buyer A's intent to return the item (i.e., the order of steps 702, 704 is reversed). After detecting Buyer A's intent to return the item in step 702 and determining a match between Buyer A and Buyer B, the e-commerce platform could transmit a message to Buyer B via the customer device 670b to provide Buyer B with an option to review and purchase the item. Alternatively, Buyer B could be automatically sold the item after a match between Buyer A and Buyer B is determined.

In a further example, Buyer B has purchased a new item on the merchant's online store 626, but the merchant has yet to ship the item to Buyer B. The code 610 determines a match between Buyer A and Buyer B, and interrupts the fulfillment process to offer Buyer A's item (and any associated discount) to Buyer B. Buyer B may receive the offer via a text or email message received by the customer device 670b, for example. This is another example in which the e-commerce platform 602 could detect an association between Buyer B and the product before detecting Buyer A's intent to return the item (i.e., the order of steps 702, 704 is reversed). In some embodiments, Buyer B could order a new item of a product but indicate that he/she is interested in a customer-to-customer return if one becomes available. Buyer B's order could then be delayed by a day, for example, to provide an opportunity for a suitable customer-to-customer return to become available.

In another example, Buyer B has searched for products similar to Buyer A's item on the returns marketplace 634, and the code 610 determines a match between Buyer A and Buyer B. The returns marketplace 634 then presents Buyer A's item (and any associated discount) to Buyer B using the details of the item stored in the product returns record 640.

The online store 626 and returns marketplace 634 do not present the item to customers that have not been matched with Buyer A (for example, when the benefit of a customer-to-customer return for these customers is negative).

More than one customer might be interested in purchasing the product that Buyer A intends to return. In such cases, the returns management engine 604 could perform additional actions to potentially reduce cost for the merchant. In some embodiments, the e-commerce platform 602 could detect an association between the product and Buyer B, as well as an association between the product and another customer (referred to as "Buyer C"). Steps 706, 708, 710, 712, 714 are then performed to determine respective benefits and incentives for Buyers B and C. Assuming the benefits associated with Buyers B and C are both positive and above a predetermined threshold, step 716 might match Buyer A with both Buyer B and Buyer C, and the item is offered to Buyer B and Buyer C.

Alternatively, step 716 could include determining that Buyer C is associated with a larger benefit than Buyer B, and only match Buyer A with Buyer C. For example, the shipping location of the merchant could be in Vancouver, the shipping location of Buyer A could be in Toronto, the shipping location of Buyer B could be in Calgary, and the shipping location of Buyer C could be in Montreal. The cost of shipping from Toronto to Calgary or Toronto to Montreal is less than the cost of shipping from Toronto to Vancouver, therefore there is a positive benefit associated with Buyer B and Buyer C. However, the cost of shipping from Toronto to Montreal is less than the cost of shipping from Toronto to Calgary. Therefore, the code 610 would determine that Buyer C is associated with a larger benefit that Buyer B, and might only match Buyer A with Buyer C. This could potentially reduce costs for the merchant.

The order of the steps 702, 704, 706, 708, 710, 712, 714, 716 illustrated in FIG. 7 is provided by way of example. In general, the embodiments provided herein are not limited to any particular order of the steps 702, 704, 706, 708, 710, 712, 714, 716. For example, determining costs at steps 706, 708, 710 could be performed in any order, or even simultaneously. In another example, step 704 could be performed before step 702. Buyer B might place an order for the product and choose a customer-to-customer return. If the returns management engine 604 has not detected a customer that intends to return an item that product, the e-commerce platform 602 could then hold Buyer B's order in the order record 690 until Buyer A's intent to return the item is detected. In a further example, step 714 could be performed before step 712. The benefit determined at step 714 could then account for the incentive for Buyer B.

Online Store Implementation of Customer-to-Customer Returns

Some aspects of the present disclosure relate to the implementation of customer-to-customer returns using online stores. Online stores can be used to detect an association between a customer and a product, and to offer a returned item of that product to the customer. Examples of online stores include the online store 138 of FIGS. 1 and 3, and the online store 626 of FIG. 6.

Figure 8:
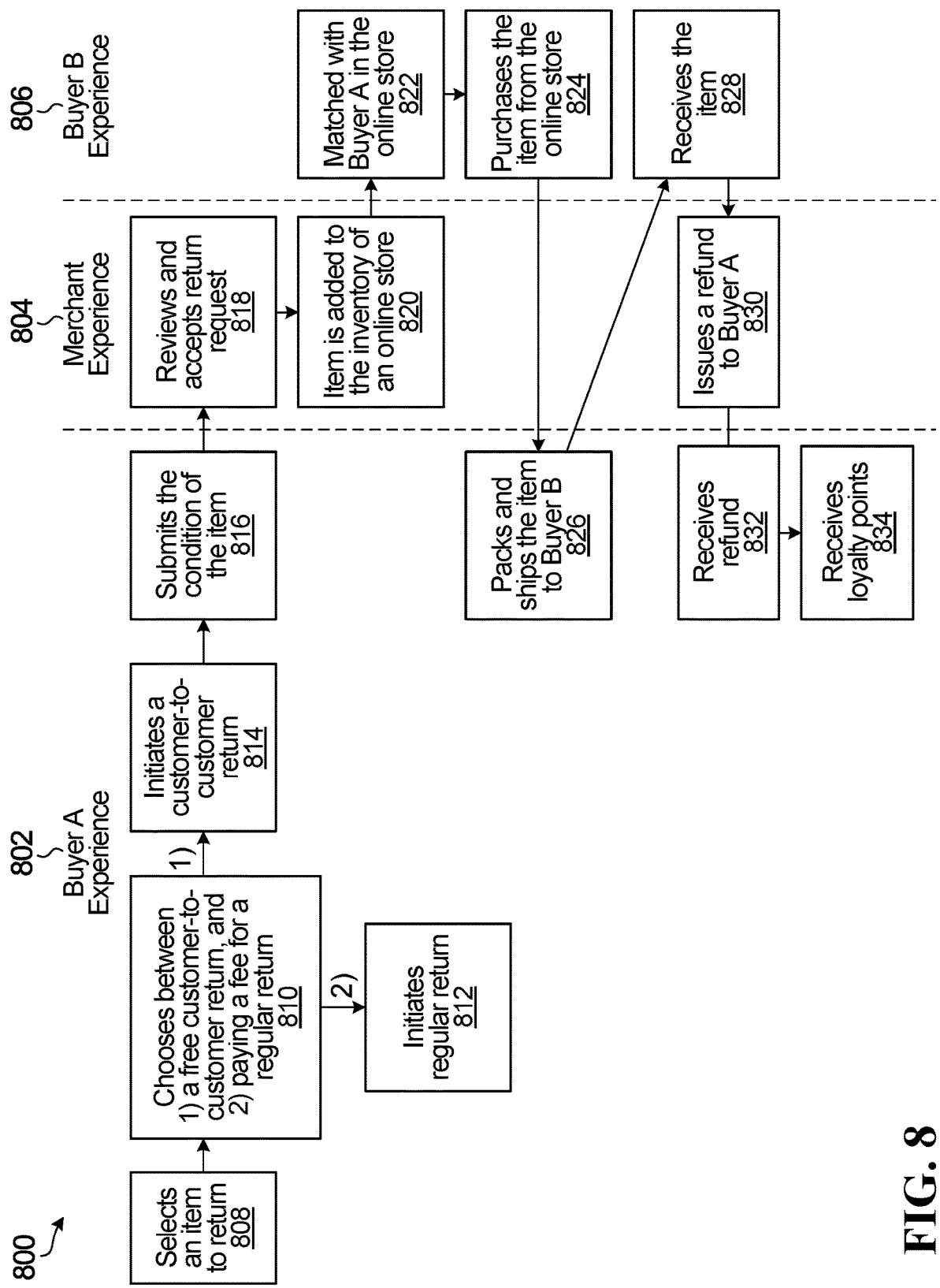
FIG. 8 is a flow diagram illustrating an example method for implementing a customer-to-customer return using an online store.

FIG. 8 is a flow diagram illustrating an example method 800 for implementing a customer-to-customer return using an online store. The online store is supported by an e-commerce platform. FIG. 8 is divided into Buyer A experience 802, merchant experience 804, and Buyer B experience 806. The Buyer A experience 802 includes a series of steps 808, 810, 812, 814, 816, 826, 832, 834 that are performed or experienced by a customer that intends to return an item of a product. The merchant experience 804 includes a series of steps 818, 820, 830 that are performed or experienced by a merchant that operates the online store, and that sold the item to Buyer A. The Buyer B experience 806 includes a series of steps 822, 824, 828 that are performed or experienced by another customer that intends to buy the product from the online store.

In step 808, Buyer A selects an item to return. This step is performed using a customer device that is in communication with the e-commerce platform. For example, Buyer A could use the customer device to login to their account on the e-commerce platform. From their account, Buyer A could be presented with an option to "Return an item", which directs Buyer A to a screen page for selecting an item to return. A screen page is a page than can be viewed on a user interface such as a display. Examples of screen pages include webpages and pages accessed through mobile applications.

Figure 9:
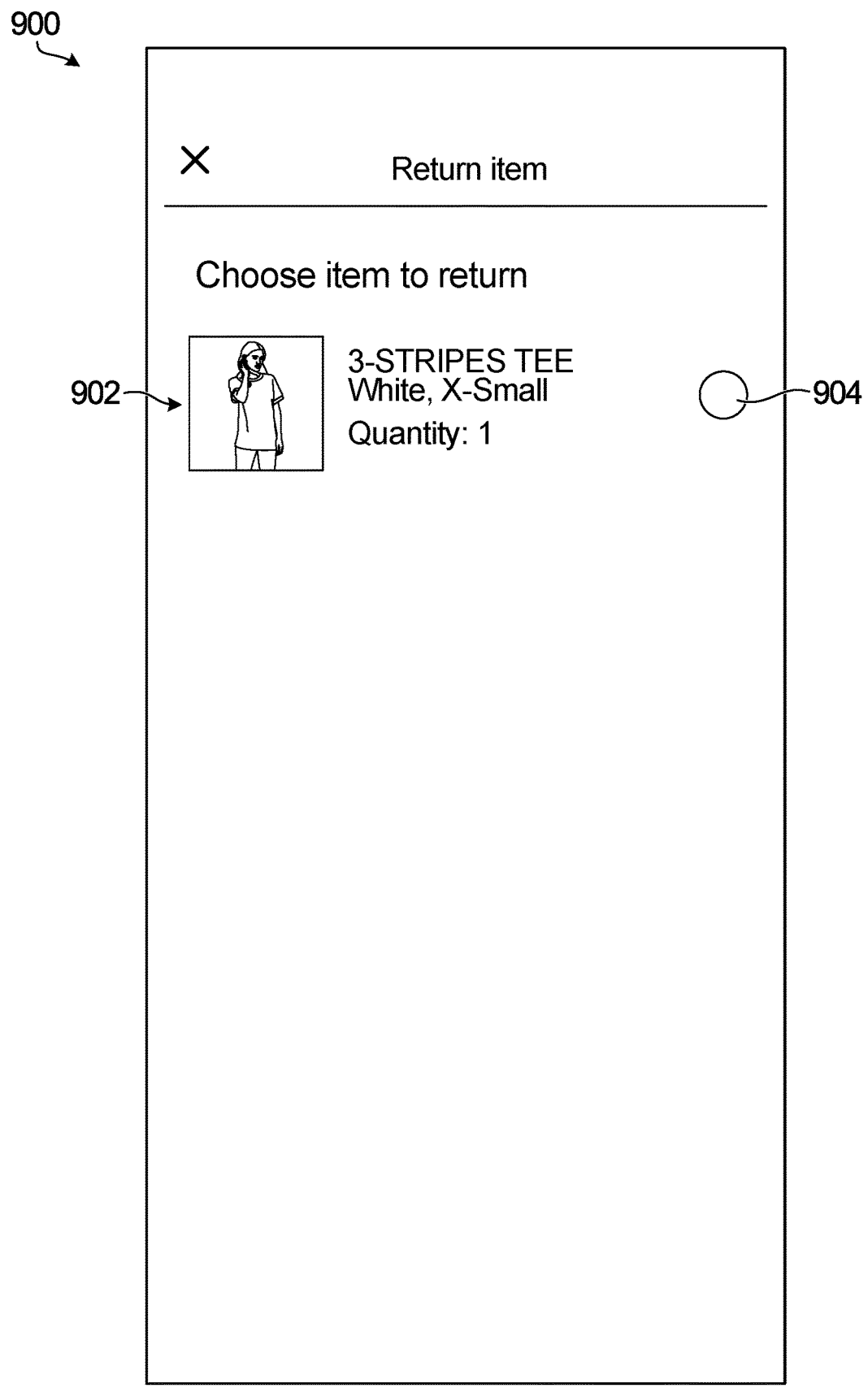
FIG. 9 is an example screen page for selecting an item to return.

FIG. 9 is an example screen page 900 for selecting an item to return. FIG. 9 presents Buyer A with the option to return a 3-Stripes Tee indicated at 902. The color ("White"), size ("X-small") and quantity ("1") of the 3-Stripes Tee are presented to Buyer A on the screen page 900. A button 904 can be selected by Buyer A to initiate the return of the 3-Stripes Tee.

FIG. 9 illustrates that Buyer A currently has one item that is available for return. This may be the case when Buyer A has only purchased one item using their e-commerce platform account. In general, a customer will have a number of items available for return that is less than or equal to the number of items the customer has purchased using their e-commerce platform account. Some merchants may not offer returns for certain products, free or otherwise, and therefore these products will not appear on the screen page 900. Merchants may also or instead have a time limit for returning their products that begins when the customer buys or receives an item. Before the time limit has expired the items would appear on the screen page 900, and after the time limit has expired the items would not appear on the screen page.

Figure 10:
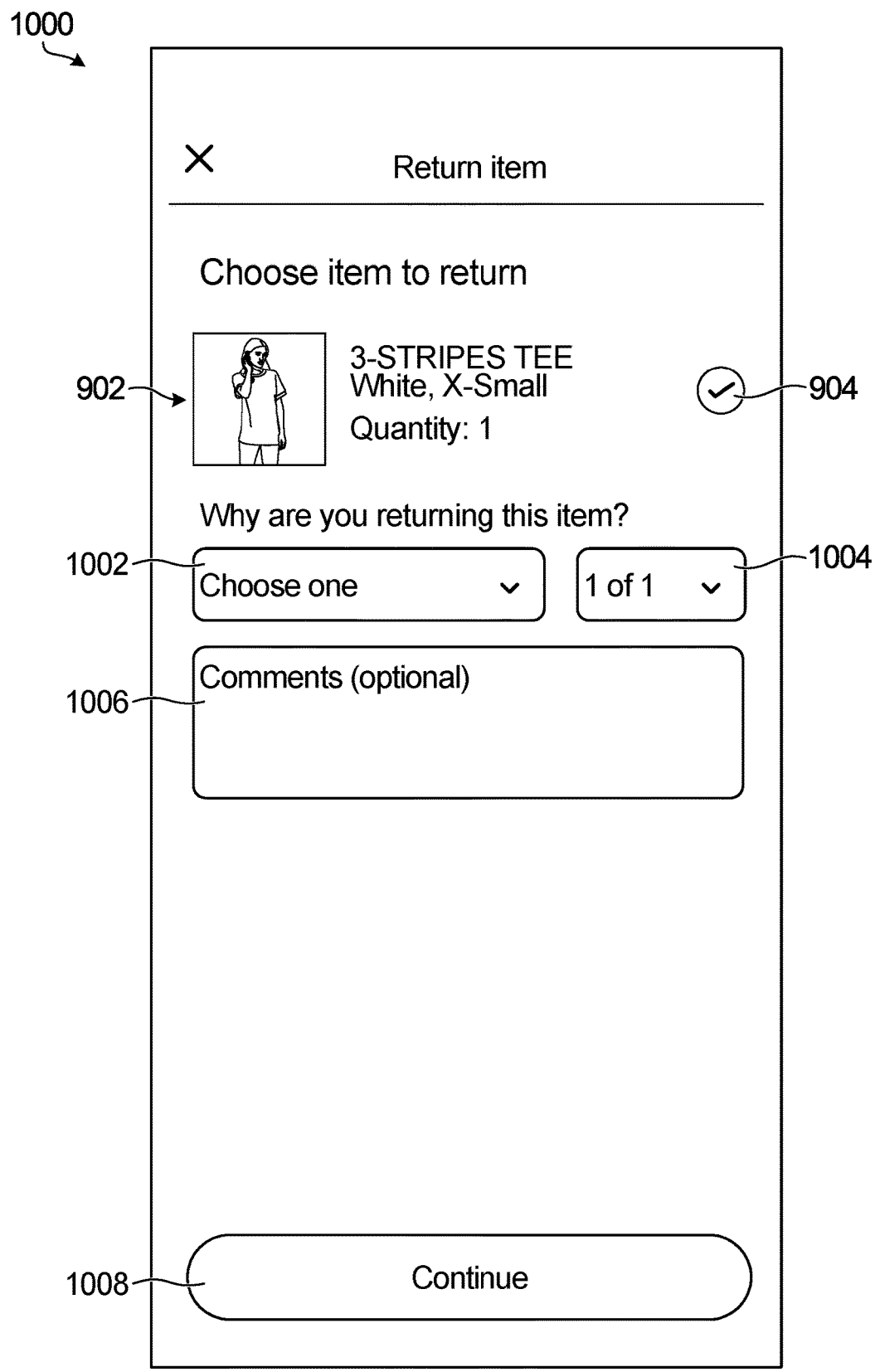
FIG. 10 is an example screen page for submitting a reason for returning an item.

When Buyer A selects the 3-Stripes Tee for return using the button 902, Buyer A is directed to another screen page for submitting a reason for the return. FIG. 10 is an example screen page 1000 for submitting a reason for returning an item. The screen page 1000 includes a dropdown menu 1002 that allows Buyer A to select a reason for returning the item. Non-limiting examples of reasons for returning an item include:

"The item is the wrong size";
"The item is damaged";
"I changed my mind";
"The item is not what I expected"
"The item is not what was advertised"; and
"Other"

The screen page 1000 includes another dropdown menu 1004 that allows Buyer A to select the number of items that will be returned (only 1 is possible in this example). A text box 1006 on the screen page 1000 provides Buyer A with an option to further explain the reason for returning the item. A button 1008 on the screen page 1000 will direct Buyer A to the next step of the return process when selected.

Referring again to FIG. 8, step 810 includes Buyer A choosing between 1) a free return using a customer-to-customer return, and 2) paying a nominal fee for a regular or conventional return. This step is performed using Buyer A's customer device. FIG. 11 is an example screen page 1100 for choosing between a regular or customer-to-customer return process. The screen page 1100 includes an option 1102 for selecting a free customer-to-customer return, and an option 1104 for a $5 regular return.

If Buyer A selects a regular return, the method 800 proceeds to step 812 and the e-commerce system initiates the regular return. The implementation of a regular return is not illustrated in detail in FIG. 8. If Buyer A instead selects a customer-to-customer return, the method 800 proceeds to step 814 and the e-commerce system initiates the customer-to-customer return.

Figure 12:
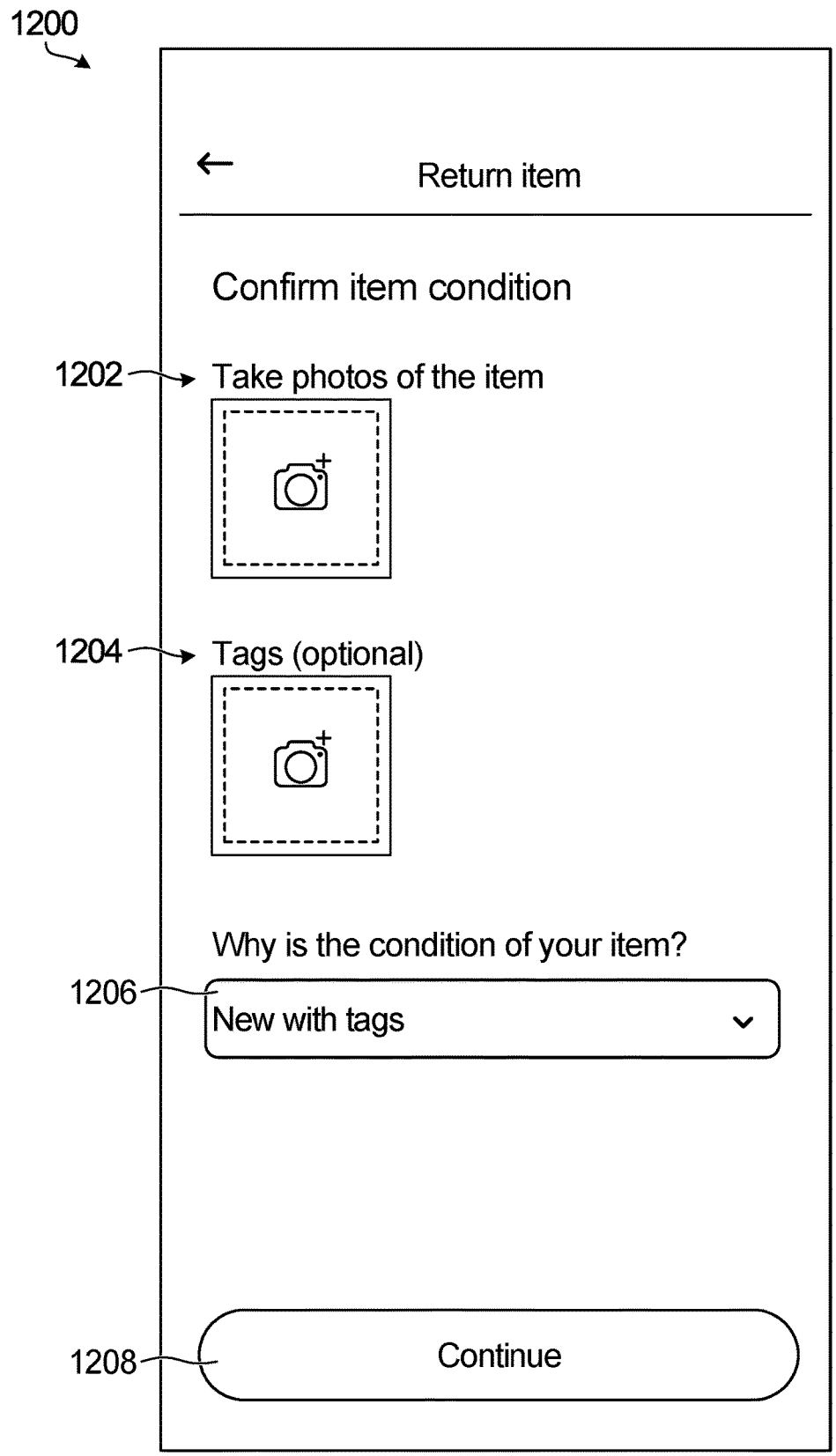
FIG. 12 is an example screen page for submitting the condition of an item.

After the initiation of the customer-to-customer return, the method 800 proceeds to step 816. In step 816, Buyer A submits the condition of their item using the customer device, which includes submitting a picture of the item. FIG. 12 is an example screen page 1200 for submitting the condition of an item. The screen page 1200 includes an option 1202 to submit a picture of the item and an option 1204 to submit a picture of the tags (if any) on the item. Selecting option 1202 or 1204 could interface with a camera in the customer device to allow Buyer A to take a picture of the item or tags. The customer device could also or instead allow Buyer A to select a picture of the item or tags from an image library stored in the customer device. In some embodiments, taking a picture of the item is required, while taking a picture of the tags is optional. The screen page 1200 further includes a dropdown menu 1206 to select the condition of the item. Non-limiting examples of such conditions include:

"New with tags";
"New without tags";
"Used only once";
"Lightly used"; and
"Heavily used".

When Buyer A has attached a photo of their item/tags and chosen the condition of the item, selecting a button 1208 on the screen page 1200 will direct Buyer A to a subsequent screen page for reviewing the return request. FIG. 13 is an example screen page 1300 for reviewing a return request. The details of Buyer A's return request are provided at 1302. If Buyer A is satisfied with these details, the return request can be confirmed using a button 1304 on the screen page 1300.

Figure 14:
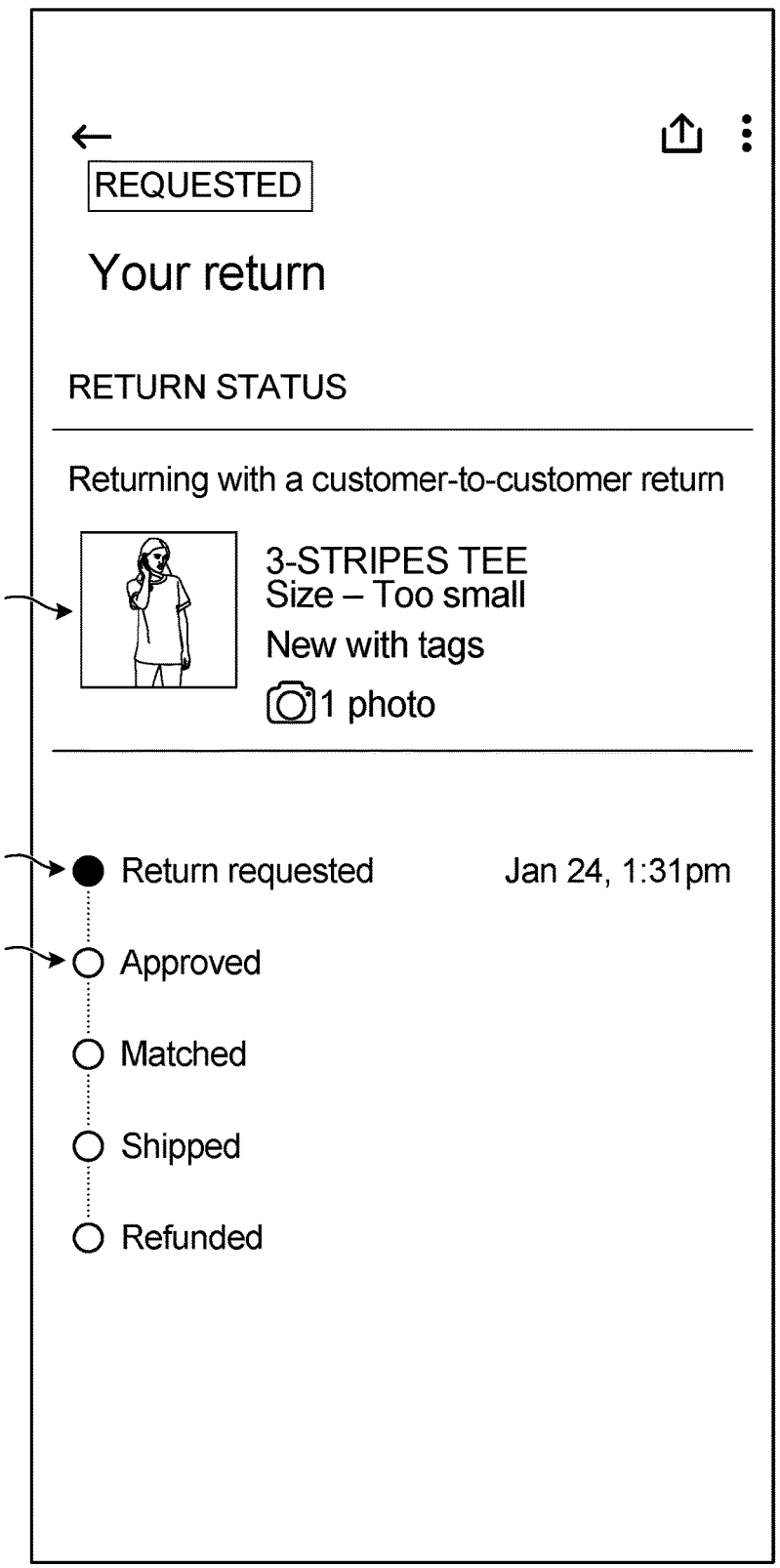
FIG. 14 is an example screen page for viewing the status of a return.

At any time following step 816 in the method 800, Buyer A might wish to learn the status of the return. Buyer A's account on the e-commerce platform could include an option to "View requested returns", which directs Buyer A to a list of their requested returns. Selecting one of these requested returns then directs Buyer A to a screen page that includes the status of that return. FIG. 14 is an example screen page 1400 for viewing the status of a return. The screen page 1400 includes the details of the return at 1402. At 1404, the screen page 1400 indicates that the return has been requested on January 24 at 1:31 pm. At 1406, the screen page 1400 indicates that the request has not yet been approved by the merchant.

From step 816, the method 800 proceeds to step 818 in the merchant experience 804. In step 818, the merchant reviews and accepts Buyer A's return request using a merchant device. The merchant can login to their account on the e-commerce platform to view their pending customer-to-customer return orders, which includes the return request from Buyer A. In some embodiments, the e-commerce platform could notify the merchant of the pending return request from Buyer A via a text or email message, for example.

FIG. 15 is an example screen page 1500 for viewing customer-to-customer return orders. The screen page 1500 includes a summary 1502 of the pending customer-to-customer return orders at various stages in the return process, and a notification 1504 indicating that a new customer-to-customer return request is awaiting approval. Selecting the pending return request from Buyer A directs the merchant to another screen page for reviewing the return request.

Figure 16A:
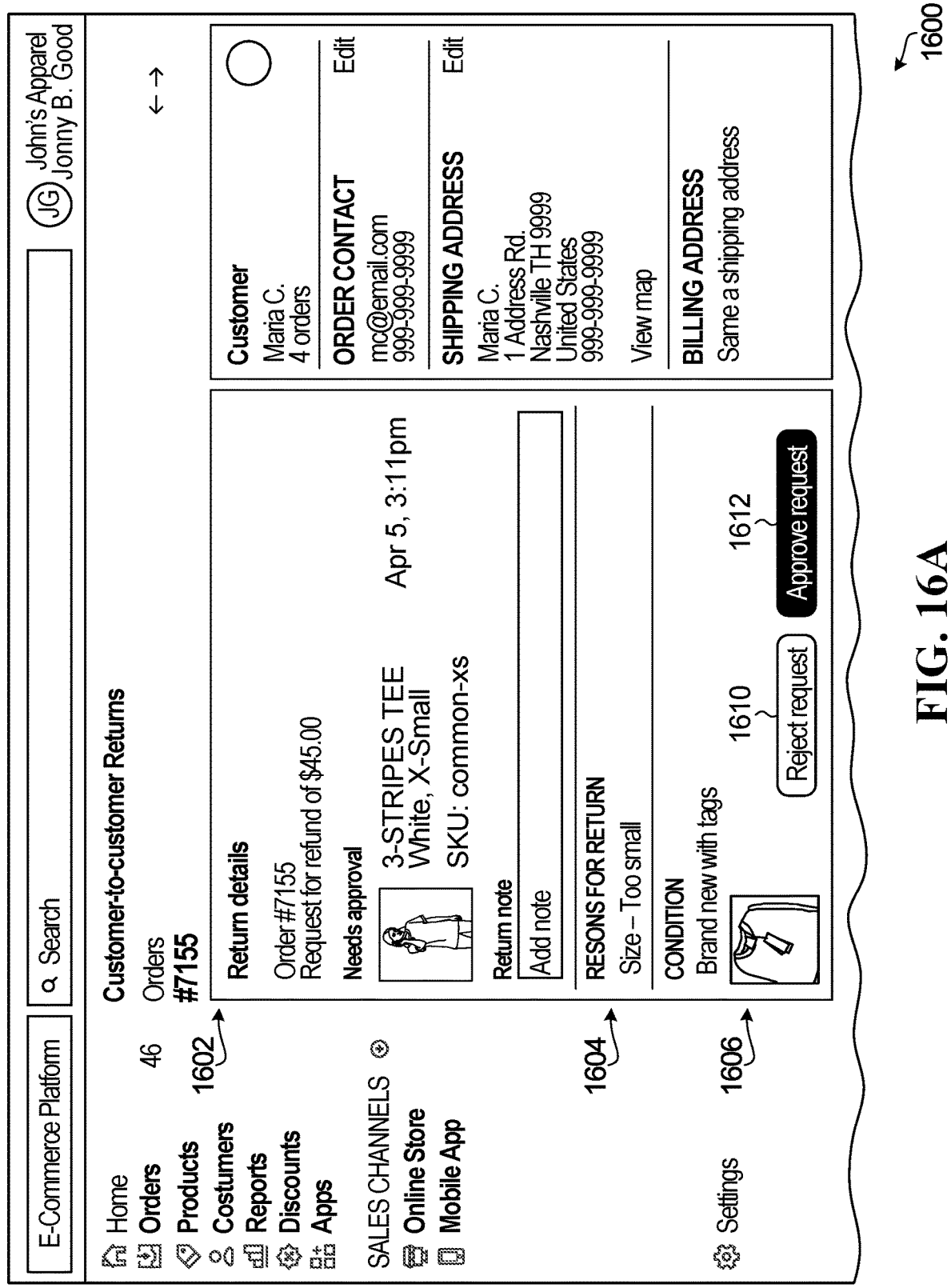
FIG. 16, consisting of FIGS. 16A and 16B, is an example screen page for reviewing and approving a return request.
Figure 16B:
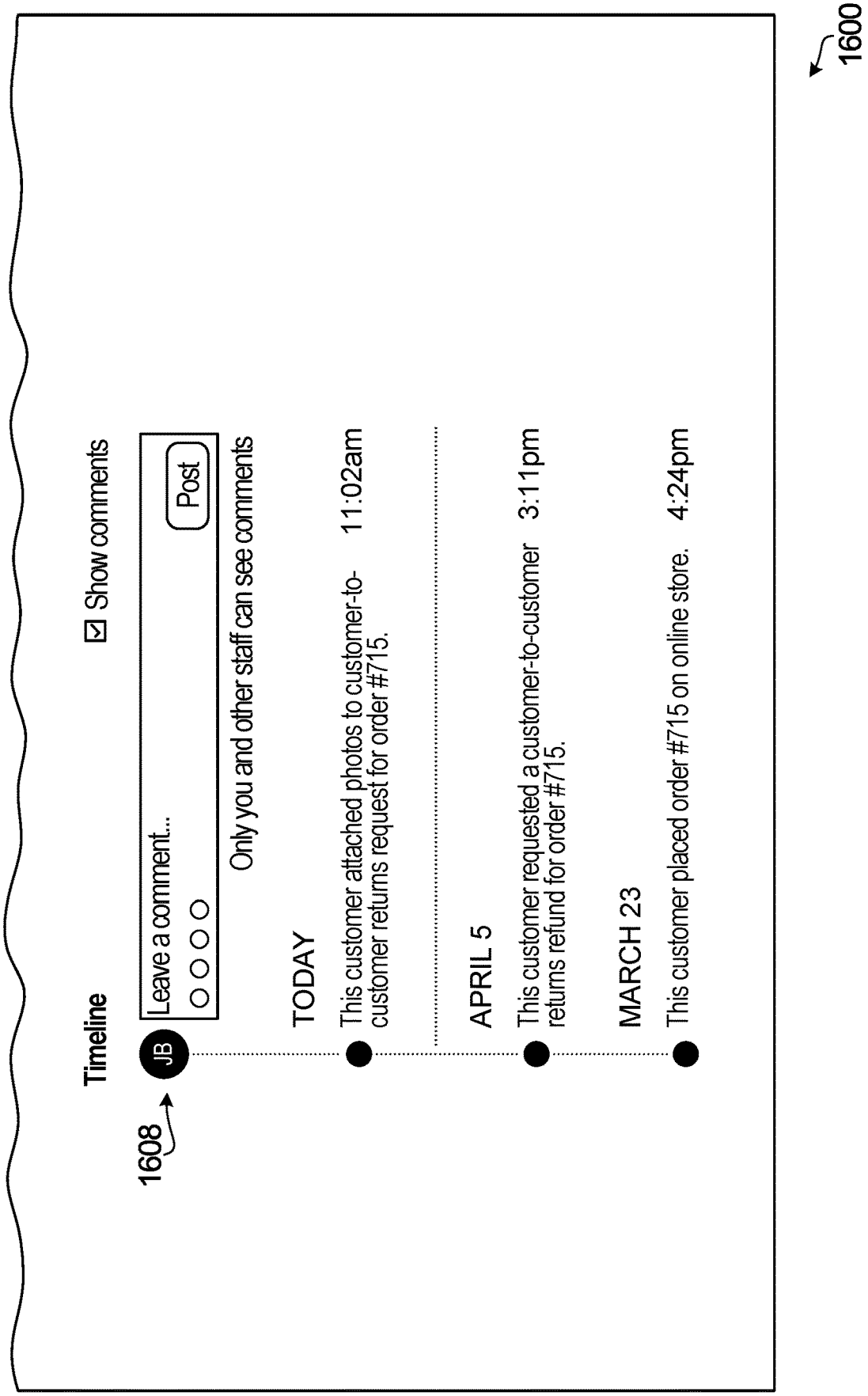

FIG. 16, consisting of FIGS. 16A and 16B, is an example screen page 1600 for reviewing and approving a return request. The screen page 1600 presents the merchant with the return request from Buyer A, and includes the details of the return at 1602, the reason for the return at 1604, the condition of the item at 1606, and the timeline for the item at 1608. The screen page 1600 also includes a button 1610 to reject the return request, and another button 1612 to approve the return request.

In some embodiments, the review and approval of return requests could be performed automatically without direct human input. For example, if Buyer A submits that the condition of an item is "lightly used" or "heavily used", the e-commerce platform could automatically reject the return request and not forward it to the merchant. Artificial intelligence could also or instead be implemented to help determine or confirm the condition of an item. For example, a neural network could be used to analyse a picture of an item and detect any defects in the item (for example, any damage to the item) that are inconsistent with the condition of the item submitted by the customer.

Referring again to FIG. 8, after the return request is accepted by the merchant, the method 800 proceeds to step 820. In step 820, Buyer A's item is added to the inventory of the merchant's online store in the e-commerce platform. For example, using the e-commerce platform 602 of FIG. 6, Buyer A's item could be added to the product returns record 632 in the online store 626.

In step 822, Buyer B is matched with Buyer A in the merchant's online store. Buyer B could be viewing the merchant's online store using a customer device that is logged-on to Buyer B's account on the e-commerce platform, or Buyer B could be viewing the online store anonymously. While Buyer B is viewing the online store, the e-commerce system could detect an association between Buyer B and the product that Buyer A has requested a return of. For example, Buyer B could perform a keyword search in the online store and find the product being returned by Buyer A. At this point, Buyer B might not know that there is a customer-to-customer return available for this product. Selecting the product in the online store then directs Buyer B to a screen page for the product. The act of selecting the product could be considered an association between the product and Buyer B by the e-commerce platform. The e-commerce platform then matches Buyer B to Buyer A in the online store using, for example, the process 700 of FIG. 7.

In some embodiments, the e-commerce system could consider the act of Buyer B simply viewing the merchant's online store to be an association between Buyer B and the product that Buyer A has requested a return of, without Buyer B having specifically demonstrated any interest in purchasing the product. In these embodiments, the process 700 of FIG. 7 could be performed for any customer that enters the merchant's online store.

Following the match between Buyer A and Buyer B, Buyer B is presented with the option of purchasing Buyer A's item in the merchant's online store. Step 824 includes Buyer B purchasing the product from the merchant's online store, and selecting a customer-to-customer return option.

Figure 17:
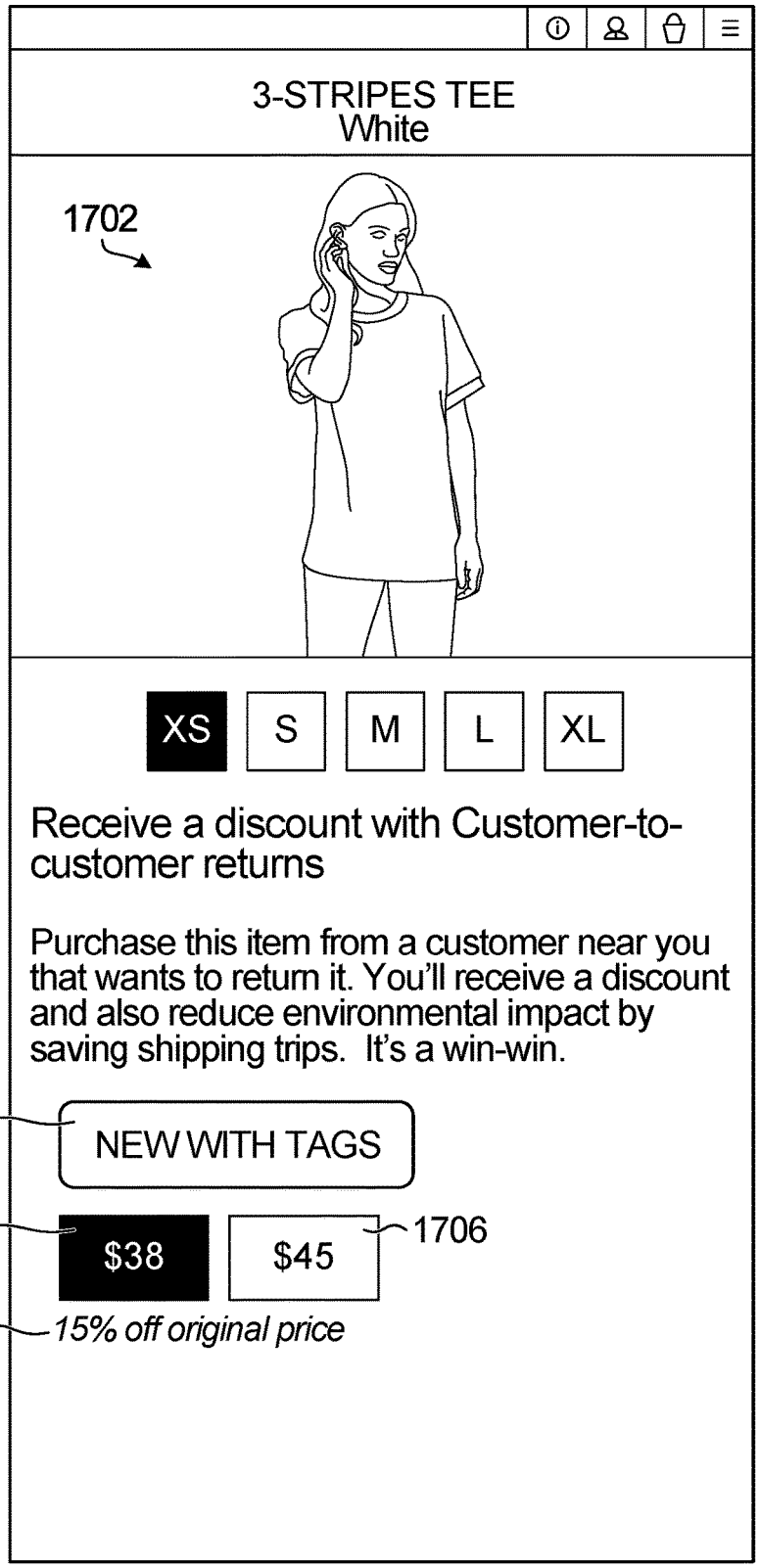
FIG. 17 is an example product screen page that includes a customer-to-customer return option.

FIG. 17 is an example product screen page 1700 that includes a customer-to-customer return option. The screen page 1700 is presented on Buyer B's customer device, and includes the details of the product at 1702, an option 1704 to purchase Buyer A's item using a customer-to-customer return, an option 1706 to purchase a new item from the merchant, a condition 1708 of Buyer A's item, and a discount 1710 associated with Buyer A's item. The details of the product at 1702 could include the picture of the item provided by Buyer A in step 816 and/or a generic picture of the product.

Figure 18:
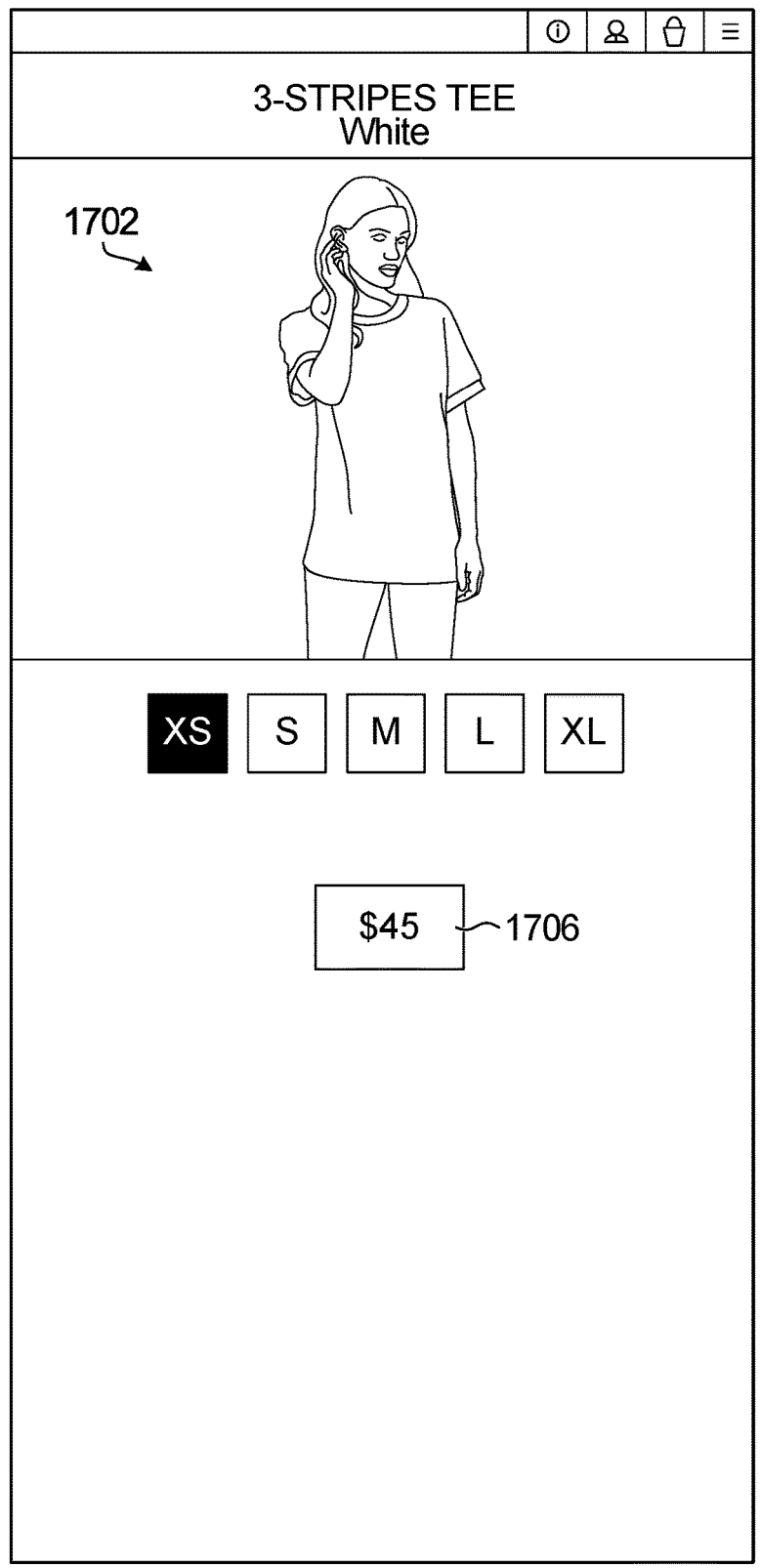
FIG. 18 is an example product screen page without a customer-to-customer return option.

It should be noted that the screen page 1700 is presented to Buyer B because the e-commerce platform has matched Buyer A and Buyer B. A screen page without a customer-to-customer return option would be presented to any customer that has not been matched with Buyer A (or any other customer that has requested a customer-to-customer return for that product). As such, a product screen page with a customer-to-customer return option would only be shown to a subset of customers that visit the merchant's online store. FIG. 18 is an example product screen page 1800 without a customer-to-customer return option. The screen page 1800 includes the details of the product at 1702 and the option 1706 to purchase a new item from the merchant, but does not include a customer-to-customer return option.

Figure 19:
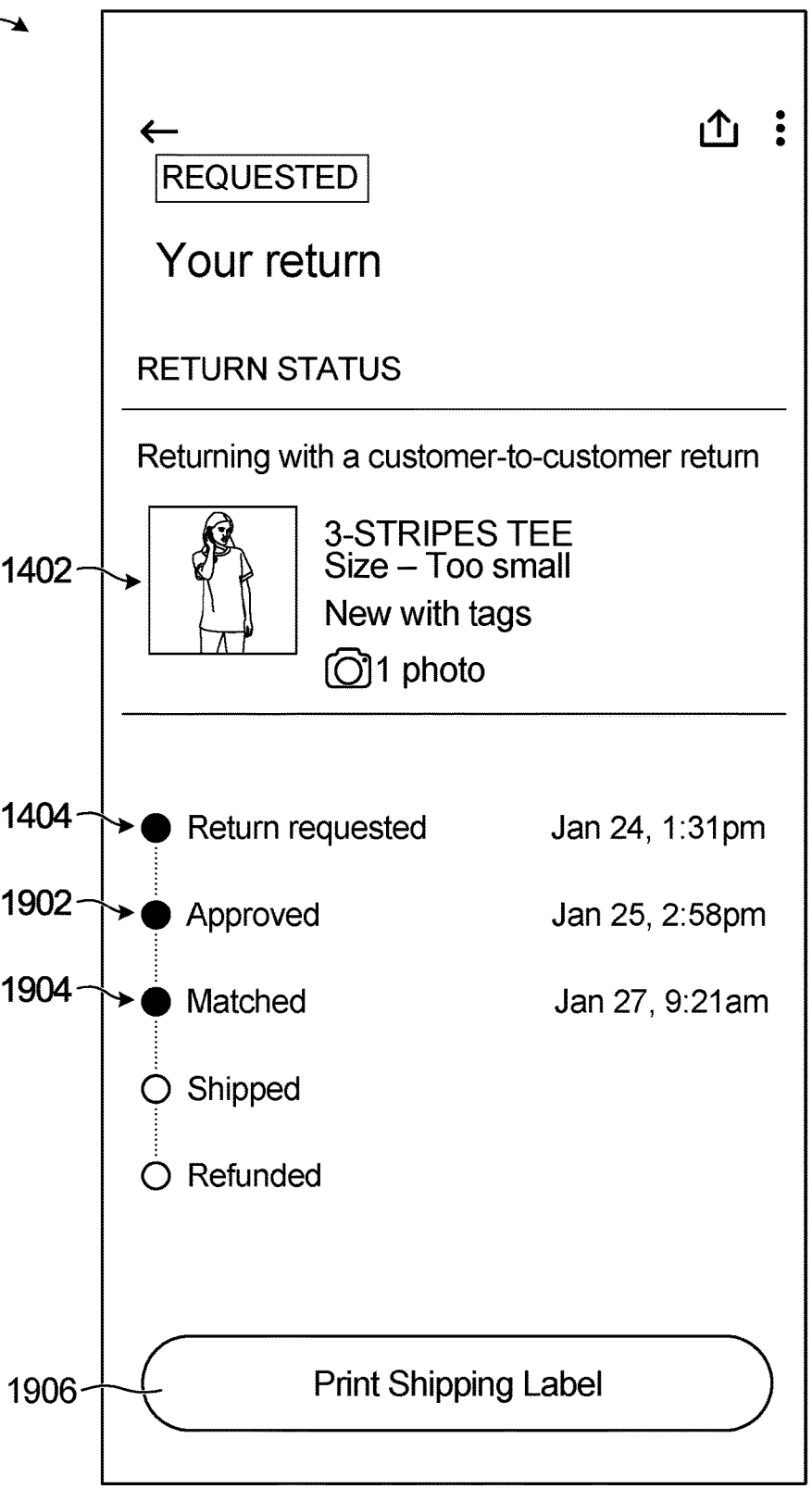
FIG. 19 is another example screen page for viewing the status of a return.

Following step 824 of FIG. 8, the method 800 proceeds to step 826. In step 826, Buyer A receives an indication that their item has been sold, and Buyer A packs and ships the item to Buyer B. In some embodiments, Buyer A could receive a text or email message on their customer device indicating that their item has been purchased. The email or text message could provide Buyer A with a shipping label to facilitate the shipment of the item to Buyer B. Alternatively, using their customer device to access their account on the e-commerce platform, Buyer A could view the return order and obtain the shipping label. FIG. 19 is another example screen page 1900 for viewing the status of a return. The screen page 1900 is similar to the screen page 1400 of FIG. 14, but includes an indication at 1902 that the return request has been accepted by the merchant, and an indication at 1904 that the item has been matched with another customer (i.e., Buyer B). The screen page 1906 further includes an option 1906 to print the shipping label to send the item to Buyer B.

In some embodiments, the shipping label provided to Buyer A by the e-commerce platform masks or hides the identity of Buyer B. This could be done in the interest of protecting Buyer B's privacy. For example, the shipping label could hash or encode the name and/or address of Buyer B. Machine-readable codes, such as barcodes, could be used to encode Buyer B's name and address on the shipping label. The encoded shipping label could be generated by a shipping provider that is able to decode the shipping label using a barcode reader, for example, to deliver the item to Buyer B.

At step 828 of FIG. 8, Buyer B receives the item. This step is recorded by the e-commerce platform. In some embodiments, that shipping provider that delivered the item to Buyer B sends a confirmation of the delivery to the e-commerce platform. In some embodiments, Buyer B is requested to confirm that the item has been received, and optionally confirm the condition of the item.

Once receipt of the item by Buyer B has been confirmed, the method 800 proceeds to step 830, where the e-commerce platform automatically issues a refund to Buyer A for the cost of the item. In step 832, Buyer A receives the refund. Buyer A also receives loyalty points in step 834 for their use of the customer-to-customer return process.

The order of steps 808, 810, 812, 814, 816, 820, 822, 824, 826, 828, 830, 832, 834 in FIG. 8 is shown by way of example, and could be varied in other implementations. Some steps could also or instead be omitted. For example, step 834 could be omitted in some implementations.

Marketplace Implementation of Customer-to-Customer Returns

Some aspects of the present disclosure relate to the implementation of customer-to-customer returns using a returns marketplace. Examples of returns marketplaces include the returns marketplace 302 of FIG. 3, and the returns marketplace 634 of FIG. 6. The returns marketplace can be used to detect an association between a customer and a product, and to offer a returned item of that product to the customer. The returned item could be an item that has been returned to a merchant and/or an item that a customer has indicated they intend to return, but have not yet shipped back to the merchant.

In a marketplace implementation of a customer-to-customer return, many of the steps from the online store implementation would still apply, but with one potential difference: in a marketplace implementation a customer might only be provided with the option to view or purchase a product upon a successful match with a customer that is returning an item of that product. In other words, the marketplace might only present returned items, and not present new items sold directly by the merchant.

Figure 20:
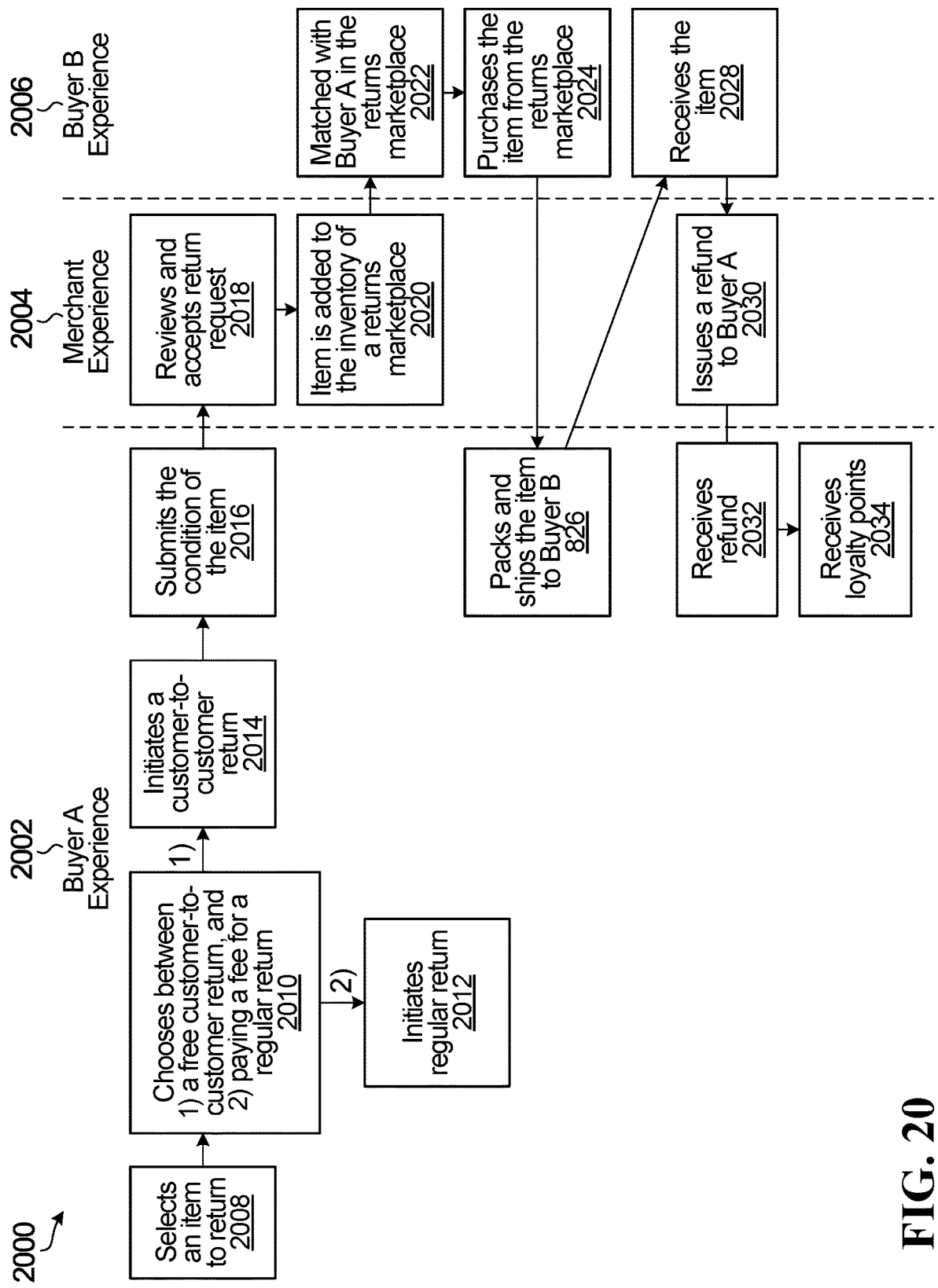
FIG. 20 is a flow diagram illustrating an example method for implementing a customer-to-customer return using a returns marketplace.

FIG. 20 is a flow diagram illustrating an example method 2000 for implementing a customer-to-customer return using a returns marketplace. The returns marketplace could be associated with a single merchant, or multiple merchants, and is supported by an e-commerce platform. FIG. 20 is divided into Buyer A experience 2002, merchant experience 2004, and Buyer B experience 2006. The Buyer A experience 2002 includes a series of steps 2008, 2010, 2012, 2014, 2016, 2026, 2032, 2034 that are performed or experienced by a customer that intends to return an item of a product. The merchant experience 2004 includes a series of steps 2018, 2020, 2030 that are performed or experienced by the merchant that sold and shipped the item to Buyer A. The Buyer B experience 2006 includes a series of steps 2022, 2024, 2028 that are performed or experienced by another customer that intends to buy the product.

The Buyer A experience 2002 could be substantially similar to the Buyer A experience 802 of FIG. 8. In other words, from Buyer A's perspective, it might not matter whether their item is listed for sale on an online store or on a returns marketplace, or both. As such, any or all of steps 2008, 2010, 2012, 2014, 2016, 2026, 2032, 2034 could be similar to steps 808, 810, 812, 814, 816, 826, 832, 834 of FIG. 8, respectively. The merchant experience 2004 could also have similarities with the merchant experience 804 of FIG. 8. For example, either or both of steps 2018, 2030 could be similar to steps 818, 830 of FIG. 8, respectively. In addition, step 2028 of the Buyer B experience 2006 could be similar to step 828 of the Buyer B experience 806 in FIG. 8.

In step 2020 of the method 2000, Buyer A's item is added to the inventory of a returns marketplace in the e-commerce platform. For example, using the e-commerce platform 602 of FIG. 6, Buyer A's item could be added to the product returns record 640 in the returns marketplace 634. In some embodiments, the returns marketplace is specific to the merchant. As such, the returns marketplace would only show items that were sold by that merchant. In other embodiments, the returns marketplace is shared by multiple merchants (or all of the merchants) on the e-commerce platform. The returns marketplace could therefore include items that are sold by different merchants.

Step 2022 includes Buyer B viewing the returns marketplace using a customer device. The customer device could be logged-on to Buyer B's account on the e-commerce platform, or Buyer B could be browsing anonymously. The e-commerce system detects an association between Buyer B and the product that Buyer A has requested a return of. For example, Buyer B could perform a search of the returns marketplace using one or more keyword(s), and the keyword(s) could match with Buyer A's item. The e-commerce platform then matches Buyer B to Buyer A in the returns marketplace using, for example, the process 700 of FIG. 7. Following the match, Buyer B is presented with the option of purchasing Buyer A's item in the returns marketplace.

Figure 21:
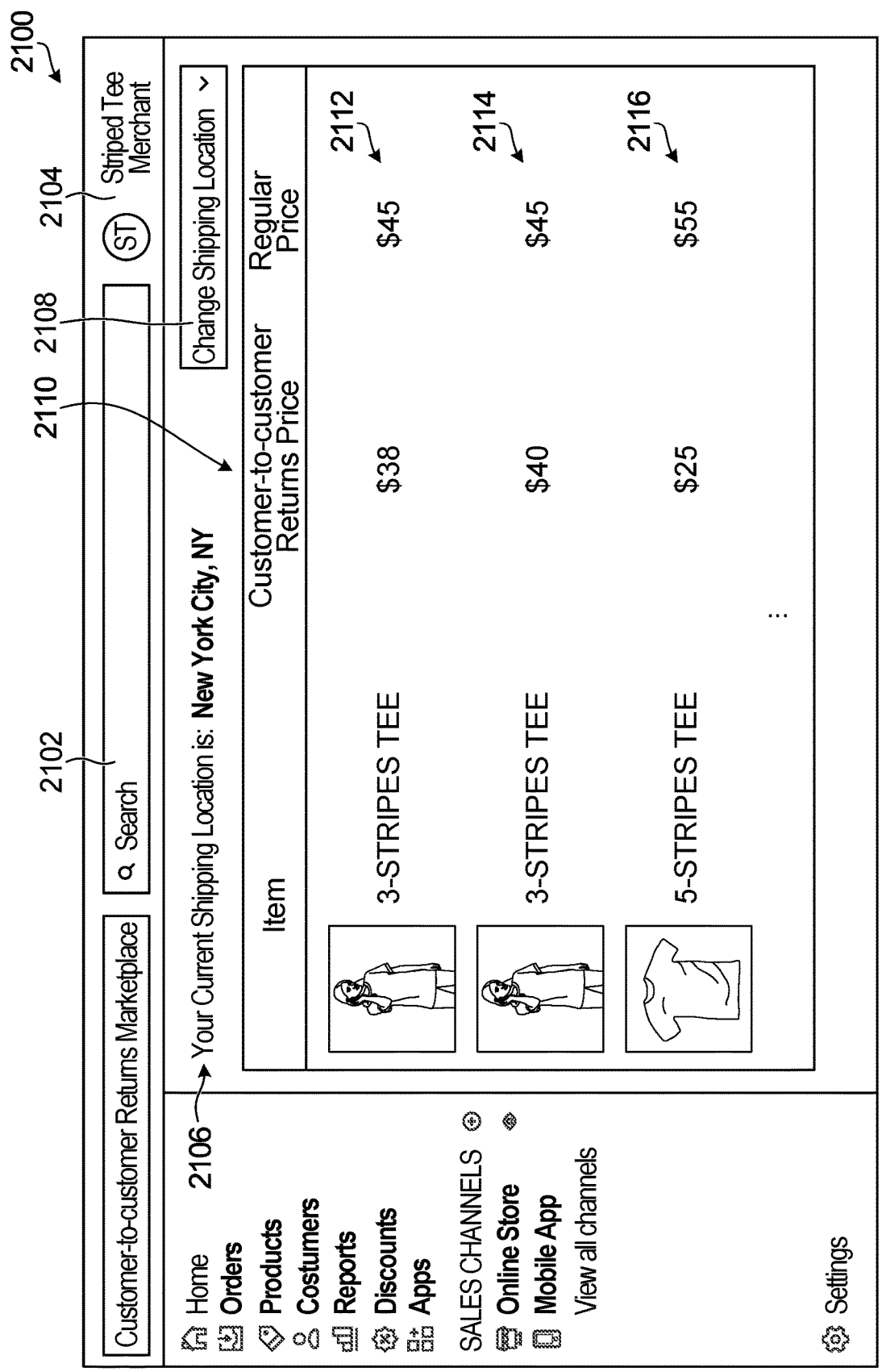
FIGS. 21 and 22 are example screen pages for a returns marketplace that is specific to one merchant.
Figure 22:
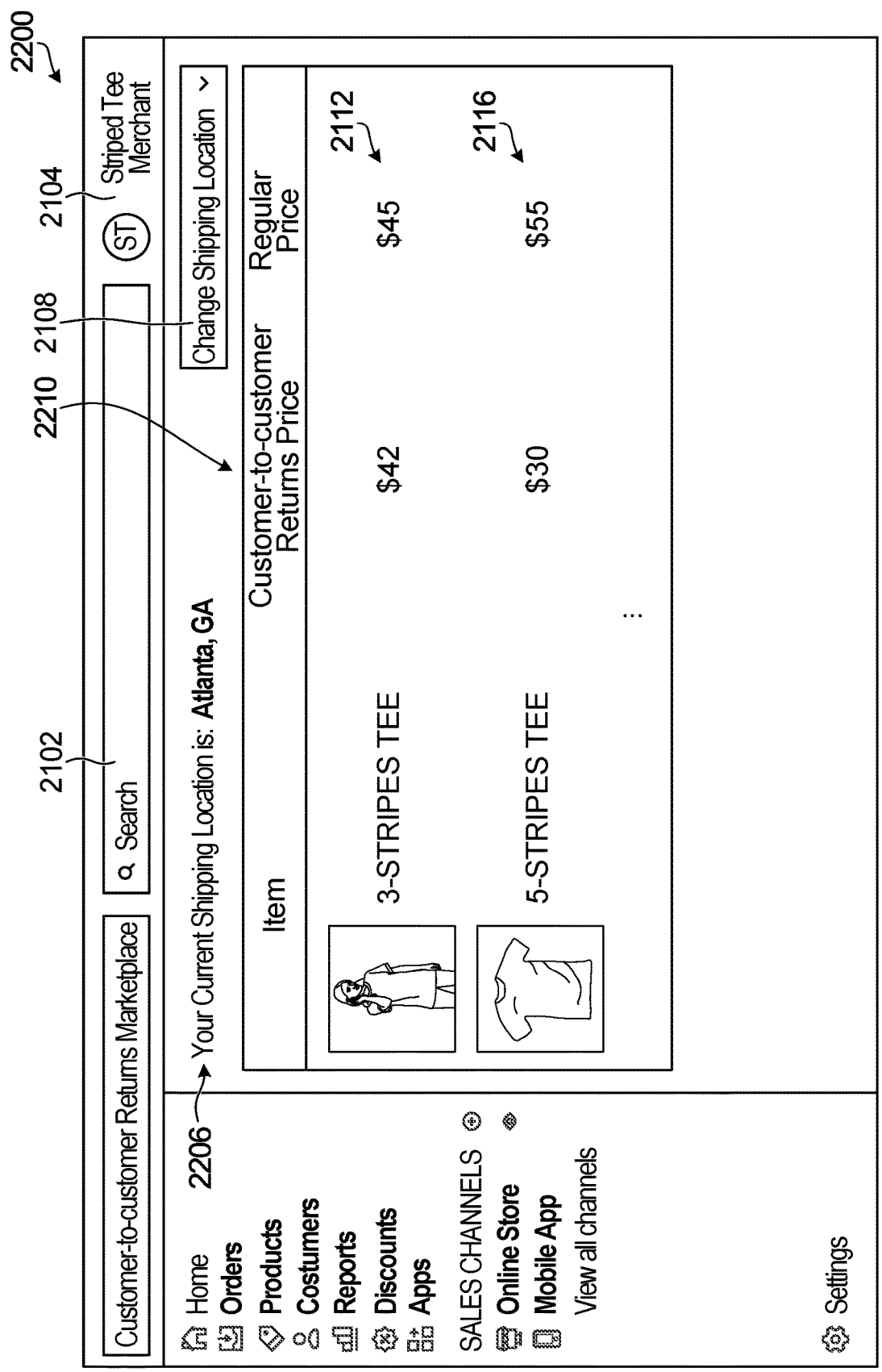

FIGS. 21 and 22 are example screen pages for a returns marketplace that is specific to one merchant (referred to as "Striped Tee Merchant"). FIG. 21 shows a screen page 2100 that is accessed by a customer device logged-on to Buyer B's account on the e-commerce platform. The screen page 2100 includes a search bar 2102 to search for items by keyword in the returns marketplace, an indication 2104 that the returns marketplace is specific to Striped Tee Merchant, an indication 2106 that the e-commerce platform believes Buyer B's shipping location is in New York City, an option 2108 to change the shipping location, and a list 2110 including multiple discounted items 2112, 2114, 2116. The item 2112 corresponds to the item that Buyer A is returning. For each of the items 2112, 2114, 2116, the list 2110 provides an image of the item, the name of the product, the customer-to-customer returns price of the item, and the regular price of the item. The image of the item could include the picture of the item provided by Buyer A in step 2016 and/or a generic picture of the product. The customer-to-customer returns price is equal to the regular price minus the discount applied to the item. For example, the discount applied to the item 2112 is $7 or approximately 15%.

The items 2112, 2114, 2116 could have been located by the returns marketplace when Buyer B searched for the keywords "striped tee", for example. However, before any of the items 2112, 2114, 2116 are presented to Buyer B, the e-commerce platform first matches Buyer B with each of the customers that are returning these items. The discount applied to each of the items 2112, 2114, 2116 is also dynamically calculated by the e-commerce platform before the items are presented to Buyer B. As discussed in detail above, the matches and discounts are determined based on Buyer B's shipping location. For example, items 2112, 2114 correspond to the same product (3-Stripes Tee), but the customer-to-customer returns price of the item 2112 is $2 less than the item 2114. This could be because the customer returning item 2112 (Buyer A) is closer to Buyer B in New York City than the customer returning item 2114.

FIG. 22 shows a returns marketplace screen page 2200 that is accessed by a customer device logged-on to another customer's account on the e-commerce platform. This customer is referred to as "Buyer C". Similar to the screen page 2100 of FIG. 21, the screen page 2200 includes the search bar 2102, indication 2104 that the returns marketplace is specific to Striped Tee Merchant, and option 2108 to change the shipping location. However, the screen page 2200 includes an indication 2206 that Buyer C's shipping location is in Atlanta, and a list 2210 including the items 2112, 2116. Therefore, Buyer C has also matched with the customers returning the items 2112, 2116. However, the customer-to-customer returns price for the items 2112, 2116 differs between the screen pages 2000, 2100 due to the different shipping locations of Buyer B and Buyer C. For example, the customer returning item 2112 (Buyer A) is closer to Buyer B in New York City than to Buyer C in Atlanta, and therefore Buyer B is offered a lower customer-to-customer returns price. Buyer C is not matched with the customer returning item 2114, and therefore the item 2114 is not included in the list 2210.

Figure 23:
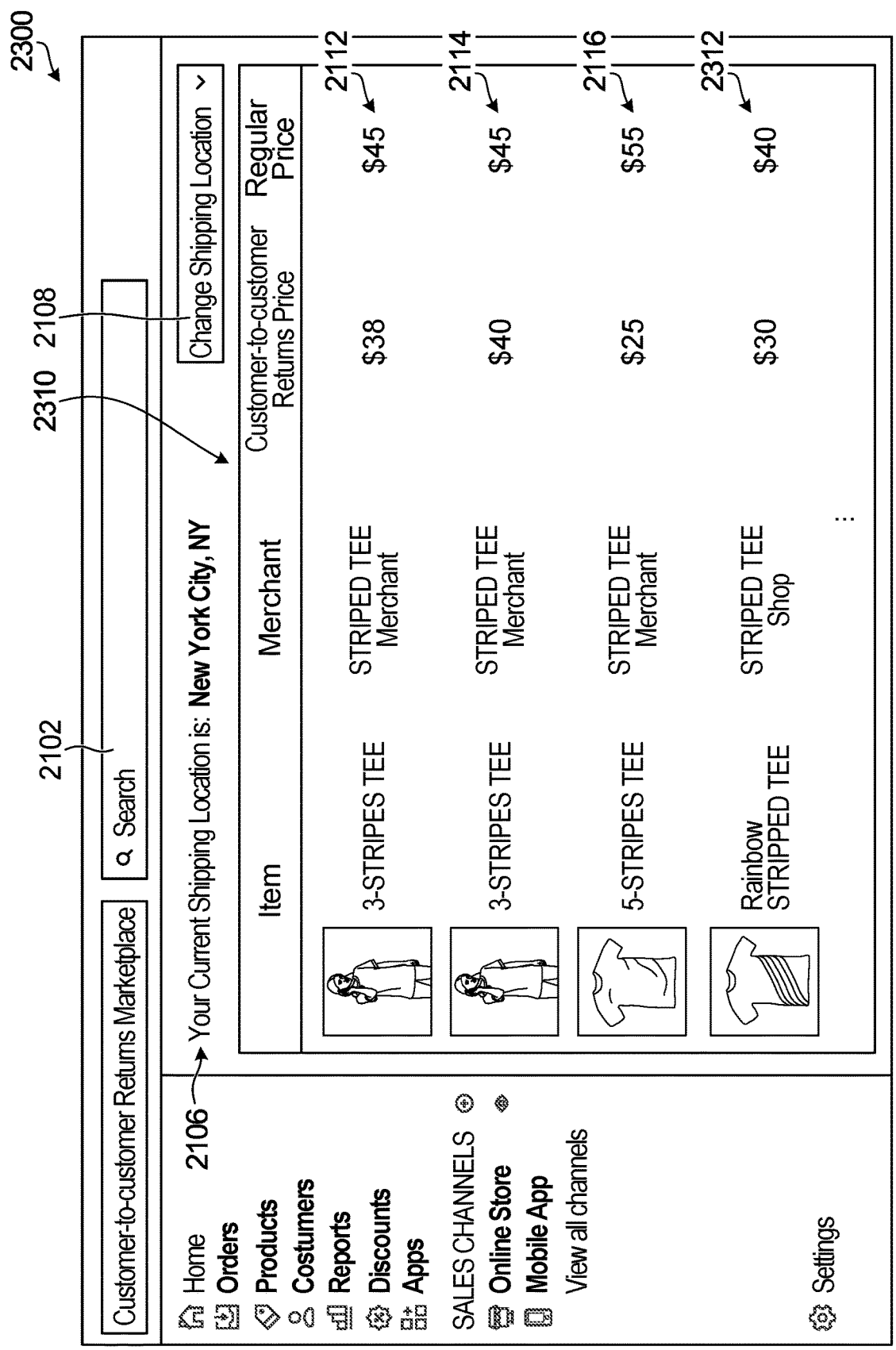
FIGS. 23 and 24 are example screen pages for a returns marketplace for multiple merchants.
Figure 24:
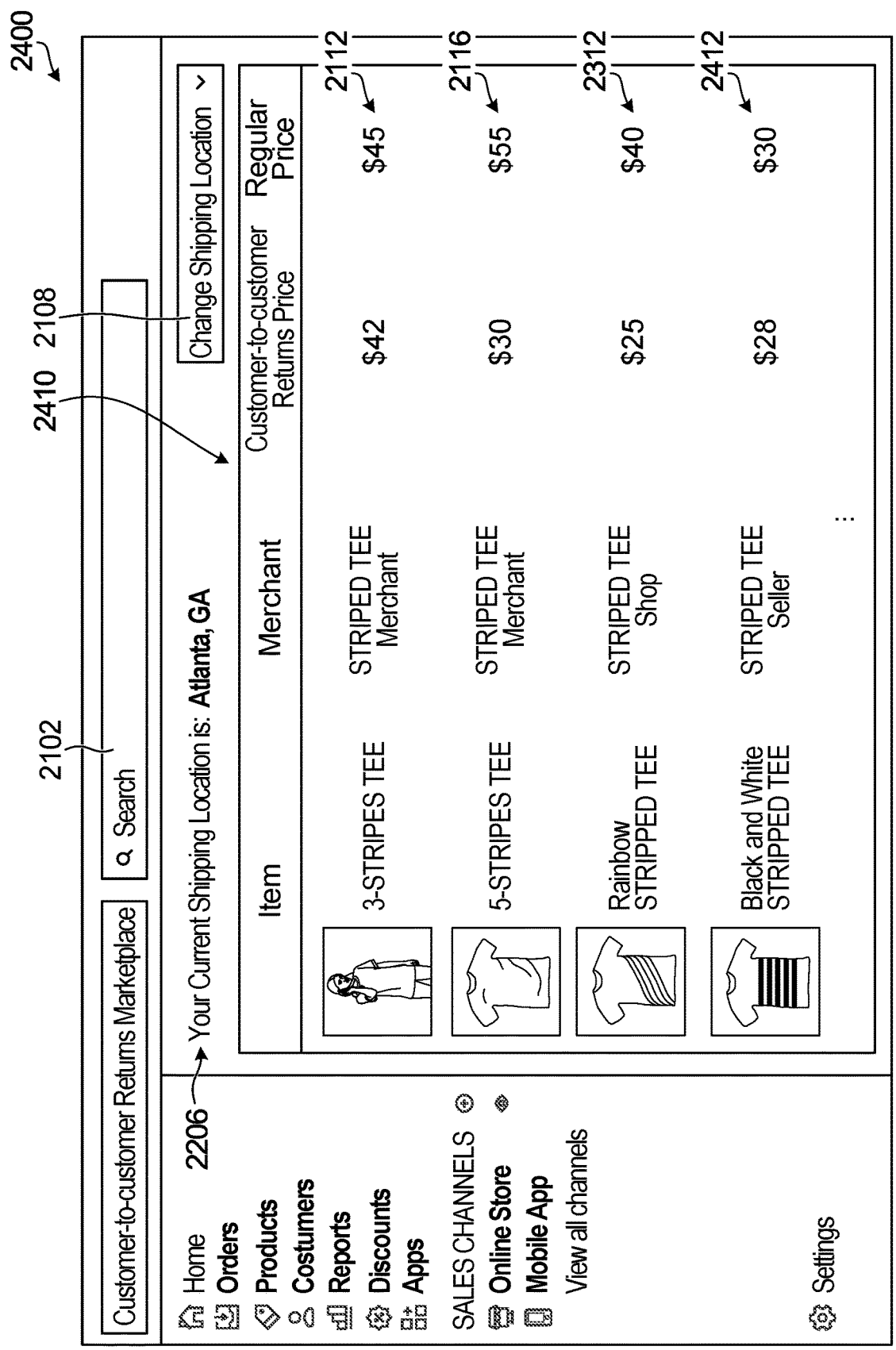

FIGS. 23 and 24 are example screen pages for a returns marketplace for multiple merchants. FIG. 23 shows a screen page 2300 that is accessed by a customer device logged-on to Buyer B's account on the e-commerce platform, and FIG. 24 shows a screen page 2400 that is accessed by a customer device logged-on to Buyer C's account on the e-commerce platform. FIGS. 23 and 24 generally correspond to FIGS. 21 and 22, respectively, but for a returns marketplace for multiple merchants rather than being specific to Striped Tee Merchant. As such, the screen pages 2300, 2400 do not include an indication that the returns marketplace is specific to any individual merchant.

The screen pages 2300, 2400 include respective lists 2310, 2410. The list 2310 includes discounted items 2112, 2114, 2116, 2312, and the list 2410 includes discounted items 2112, 2116, 2312, 2412. For each of the items, the lists 2310, 2410 provide an image of the item, the name of the item, the merchant that sells the item, the customer-to-customer returns price of the item, and the regular price of the item. The items 2112, 2114, 2116 correspond to products sold by Striped Tee Merchant, the item 2312 corresponds to a product sold by a merchant referred to as "Striped Tee Shop", and the item 2412 corresponds to a product sold by a merchant referred to as "Striped Tee Seller".

Due to their differing shipping locations, the customer-to-customer returns price for the item 2312 is different for Buyer B compared to Buyer C. In addition, Buyer B has not been matched with the customer returning the item 2412, and therefore this item is not offered to Buyer B.

FIGS. 21-24 illustrate that the items presented to a customer by a returns marketplace, and the customer-to-customer returns price of those items, are subject to change based on the shipping location of the customer.

The items listed in a returns marketplace might not all relate customer-to-customer returns. For example, if a customer returned an item to a merchant using a conventional return process, the merchant could choose to list that item for sale on the returns marketplace. However, to limit the cost to the merchant, the e-commerce platform might also perform actions to determine if shipping the item from the merchant to a particular customer is economical. In this sense, the e-commerce platform could determine if there is a match between the merchant and the customer interested in the item. For example, if the cost of shipping the item from the merchant to the customer is below a predetermined threshold, then the customer could be presented with the option of purchasing the item in the returns marketplace.

Referring again to the method 2000 of FIG. 20, step 2024 includes Buyer B purchasing the item from the returns marketplace. For example, Buyer B could select the item 2112 from either of the screen pages 2100, 2300 and proceed to purchase the item. Although the returns marketplace is primary directed towards the sale of items through customer-to-customer returns, the returns market place could also offer a customer the option of purchasing the item new. For example, when Buyer B selects the item 2112 from either of the screen pages 2100, 2300, Buyer B could be directed to a screen page that includes a link to the merchant's online store to buy the item new.

Following the purchase of the item, steps 2026, 2028, 2030, 2032 are performed to pack and ship the item to Buyer B, confirm receipt of the item by Buyer B, issue Buyer A a refund, and issue Buyer A loyalty points.

The order of steps 2008, 2010, 2012, 2014, 2016, 2020, 2022, 2024, 2026, 2028, 2030, 2032, 2034 in FIG. 20 is shown by way of example, and could be varied in other implementations. Some steps could also or instead be omitted. For example, step 2034 could be omitted in some implementations.

Although the online store implementation and the marketplace implementation of a customer-to-customer return are shown separately in FIGS. 8 and 20, these implementations could also be combined. For example, after a merchant reviews and accepts a return request, the item could be listed in both the merchant's online store and a returns marketplace. When Buyer B is matched with Buyer A, Buyer B could be shown the item in both the online store and the returns marketplace. This could increase the visibility of the item to potential buyers.

Customer-to-Customer Returns Implemented Using Orders for Returned Items

Some customers that intend to purchase a product may be willing to wait until a discounted item of the product becomes available. As outlined above, customer-to-customer returns can provide a customer with a discounted item of a product. However, the customer-to-customer return option might not always be available for a particular product, and a customer may have to wait for the product to become available through a customer-to-customer return. Repeatedly checking an online store or a returns marketplace for a particular product that is available through a customer-to-customer return can be onerous for the customer.

Some aspects of the present disclosure relate to customer-to-customer returns that are implemented using orders for returned items. As noted above, a returns management engine can be configured to receive and store an order for a returned item from Buyer B. In some embodiments, the order could include an in-search-of (ISO) list of desired products that Buyer B wishes to purchase at a discount using a customer-to-customer return. The order represents an association between Buyer B and the desired products. When a returns management engine receives an indication that Buyer A wishes to return an item that matches with a desired product in the order, then the returns management engine could determine if shipping Buyer A's item to Buyer B is economical (i.e., if there is a match between Buyer A and Buyer B). As discussed elsewhere herein, Buyer A might only be matched to Buyer B if the cost of a customer-to-customer return is less than the cost of a conventional return. The discount offered to Buyer B may vary based on the cost of the customer-to-customer return and/or the cost of the conventional return. If a match between Buyer A and Buyer B is determined, then the returns management engine could facilitate shipment of Buyer A's item to Buyer B.

An order could indicate that Buyer B intends to purchase multiple products, and that Buyer B will accept a returned item for each of the products. The multiple products could be fulfilled at the same time or at different times, be associated with the same merchant or multiple merchants, and be returned by one customer or multiple customers. For example, consider a situation in which Buyer B wishes to outfit an office with office furniture. Buyer B has 6 months to outfit the office, and wishes to do so at a discount. Buyer B could place an order including each product needed to outfit the office. The order could indicate that the Buyer B will accept returned items, a price Buyer B is willing to pay for each product (or a minimum discount Buyer B wants for each item), a desired condition for each product, and that the order is only valid for 6 months. Over the 6 month period, Buyer B's order could be fulfilled incrementally by customer-to-customer returns from multiple different customers.

It should be noted that while fulfilling an order for a returned item using a customer-to-customer return may be beneficial in some cases (for example, by reducing shipping costs), an order for a returned item could also be fulfilled using a conventional return. In an example, a customer could return an item to a merchant, who then ships the item to a customer that previously placed an order for that item.

In some embodiments, determining whether or not to implement a customer-to-customer return is based on the price Buyer B is willing to pay for a returned item. In an illustrative example, the cost to ship the item from Buyer A to Buyer B is $10. The total cost to ship the item from Buyer A to the merchant and a new item from the merchant to Buyer B is $25. Therefore, the merchant may save $15 by shipping directly from Buyer A to Buyer B, but merchant also needs to sell the item to Buyer B at a discount. If the product costs $100 new (plus shipping) and Buyer B indicates they are willing to pay $80 (including shipping) for a returned item, then the merchant stands to gain $100-$25=$75 by implementing a conventional return for Buyer Y's item and selling a new item to Buyer B, and $80-$10=$70 by implementing a customer-to-customer return. Therefore, the customer-to-customer return option could be less profitable for the merchant, and the merchant and/or a returns management engine might decide not to enable a customer-to-customer return from Buyer A to Buyer B. Alternatively, the merchant may decide to enable a customer-to-customer return from Buyer A to Buyer B to ensure that the Buyer's A item is resold, even if it is at a loss, in which case the returns management engine might not factor in the shipping cost for returning the item to the merchant (or the cost of repackaging and selling that item as new to another customer).

In some embodiments, an order for a returned item does not indicate a price Buyer B is willing to pay for the item. Buyer B could be matched with Buyer A based on a calculated benefit of a customer-to-customer return from Buyer A to Buyer B, and then Buyer B is offered a discounted price based on the merchant's savings. The discount offered to Buyer B could be selected in real-time based on what seems to be a "win-win" for the merchant and Buyer B. If Buyer B rejects the offer, then another discount may be determined for, and offered to, another interested customer.

In some embodiments, Buyer B must enable the customer-to-customer return after a match with buyer A is confirmed. Buyer B may review a reported condition of the purchased item and/or an image of the purchased item. Buyer B may also be provided with the price of the purchased item and/or a discount associated with the purchased item. Buyer B can then accept or refuse the customer-to-customer return.

In some embodiments, there are multiple buyers wanting to purchase an item of a particular product through a customer-to-customer return. For example, an e-commerce platform could receive multiple orders, where each order indicates that a respective customer intends to purchase a desired product, and that the respective customer will accept a returned item of the desired product. The multiple orders are stored, and when an item of the desired product becomes available for purchase through a customer-to-customer return, the e-commerce platform determines which potential buyer will be sold the item or which potential buyer will first be offered the item. Determining which potential buyer will be sold or first offered the item could be based on the shipping cost to each buyer, the price each buyer is willing to pay, or some combination that maximizes the merchant's profit or is a good "win-win" for the merchant and the selected buyer.

Figure 25:
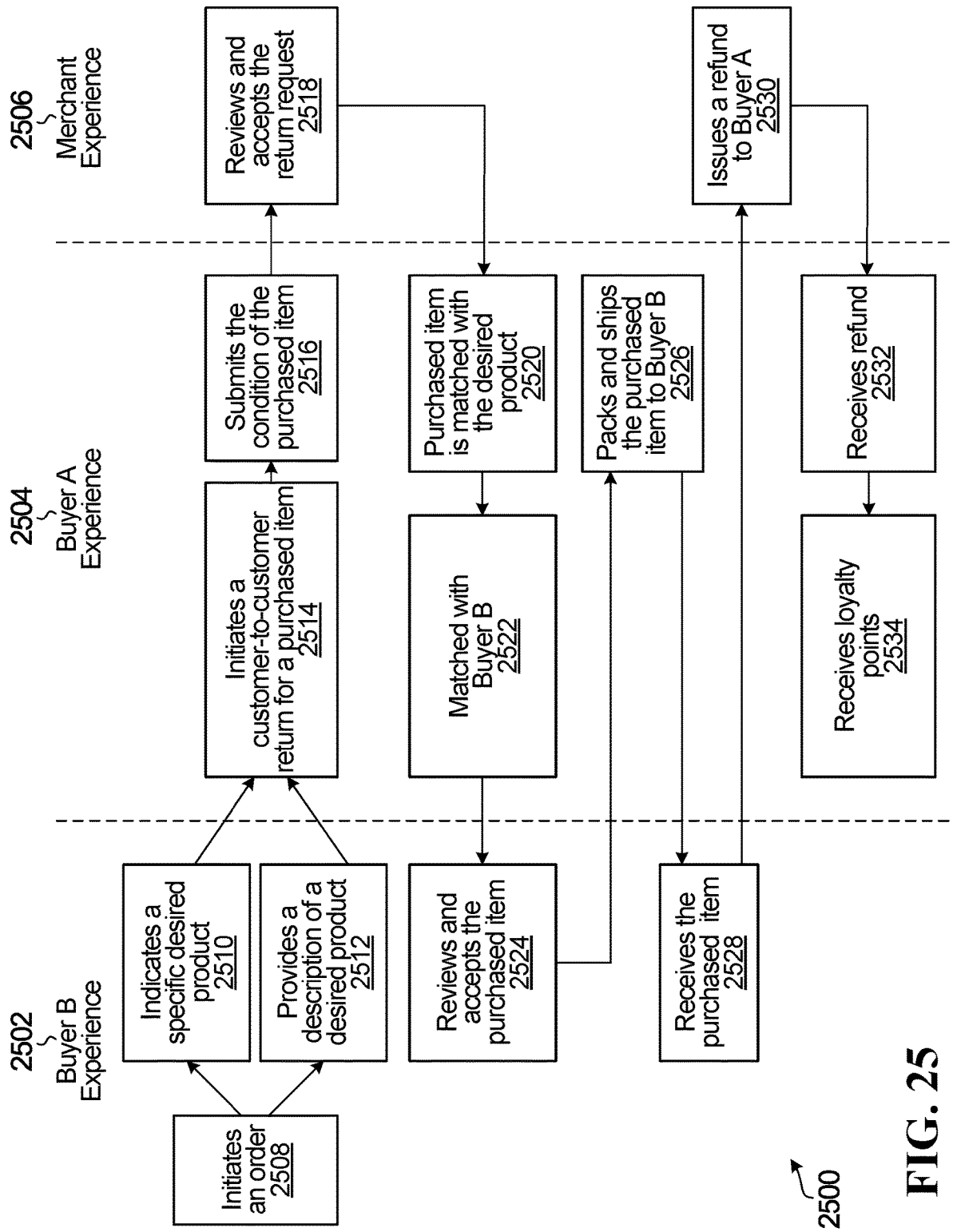
FIG. 25 is a flow diagram illustrating an example method for implementing a customer-to-customer return using an order for one or more returned products.

FIG. 25 is a flow diagram illustrating an example method 2500 for implementing a customer-to-customer return using an order for one or more returned products. FIG. 25 is divided into Buyer B experience 2502, Buyer A experience 2504, and merchant experience 2506. The Buyer B experience 2502 includes a series of steps 2508, 2510, 2512, 2524, 2528 that are performed or experienced by a customer that intends to purchase a returned item of a desired product. The Buyer A experience 2504 includes a series of steps 2514, 2516, 2520, 2522, 2526, 2532, 2534 that are performed or experienced by another customer that intends to return an item corresponding to the desired product. The merchant experience 2506 includes a series of steps 2518, 2530 that are performed or experienced by the merchant that sold and shipped the item to Buyer A.

In step 2508, Buyer B initiates an order for the desired product, and indicates that a returned item of the desired product will be accepted. Initiating an order for a product could be performed using any of a variety of applications provided by an e-commerce platform, including a customer's account page, an online store, and a returns marketplace, for example. These applications could include an option that allows Buyer B place an order for a desired product and indicate that a returned item of the desired product will be accepted. In some implementations, Buyer B initiates an order for a desired product using an application that provides a catalogue of any or all products sold on an e-commerce platform. This catalogue could also be considered an aggregate of the products sold on the e-commerce platform. Buyer B could search the catalogue of products and select those that he/she wishes to place an order for.

In an example, Buyer B logs into their account on the e-commerce platform, and is provided with an option to initiate an order for returned items. Selecting this option directs Buyer B to a screen page to select between indicating a specific product and indicating a product type. If Buyer B knows the exact product that he/she is interested in purchasing, then Buyer B could choose to indicate a specific product. In this case, Buyer B proceeds to step 2510 of the method 2500, where Buyer B indicates a specific desired product. Alternatively, if Buyer B is interested in purchasing a certain type of product, and will accept any product that matches that type of product, then Buyer B could choose to provide a product type. In this case, Buyer B proceeds to step 2512, where Buyer B provides a description of a desired product. This description could include a product type and/or other details regarding the desired product.

Figure 26:
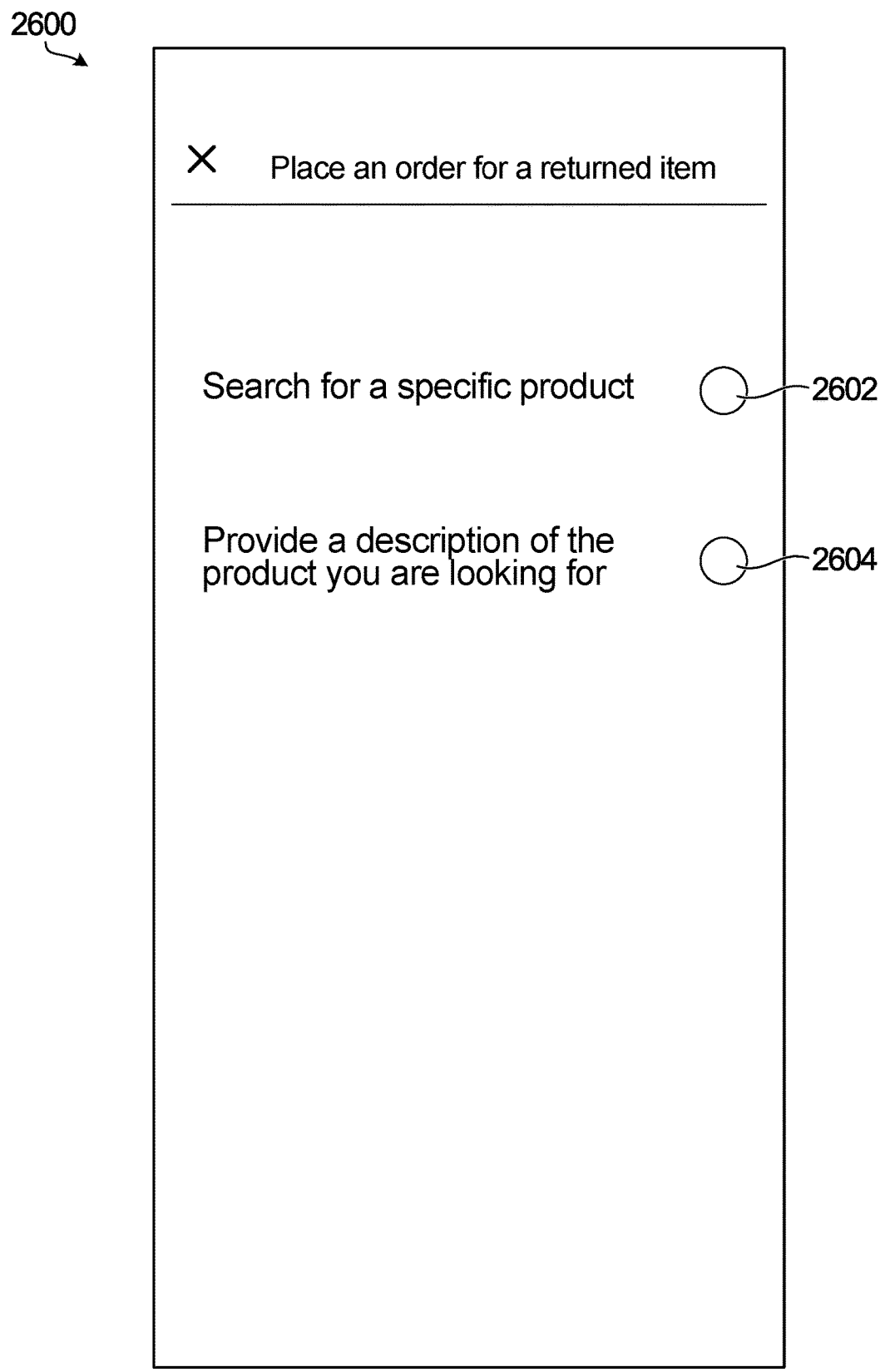
FIG. 26 is an example screen page presented to a customer after initiating an order for a returned item.

FIG. 26 is an example screen page 2600 that is presented to Buyer B after initiating an order for a returned item (for example, after performing step 2508 of FIG. 25). The screen page 2600 includes an option 2602 to search for a specific product, and another option 2604 to provide a description of a product.

Figure 27:
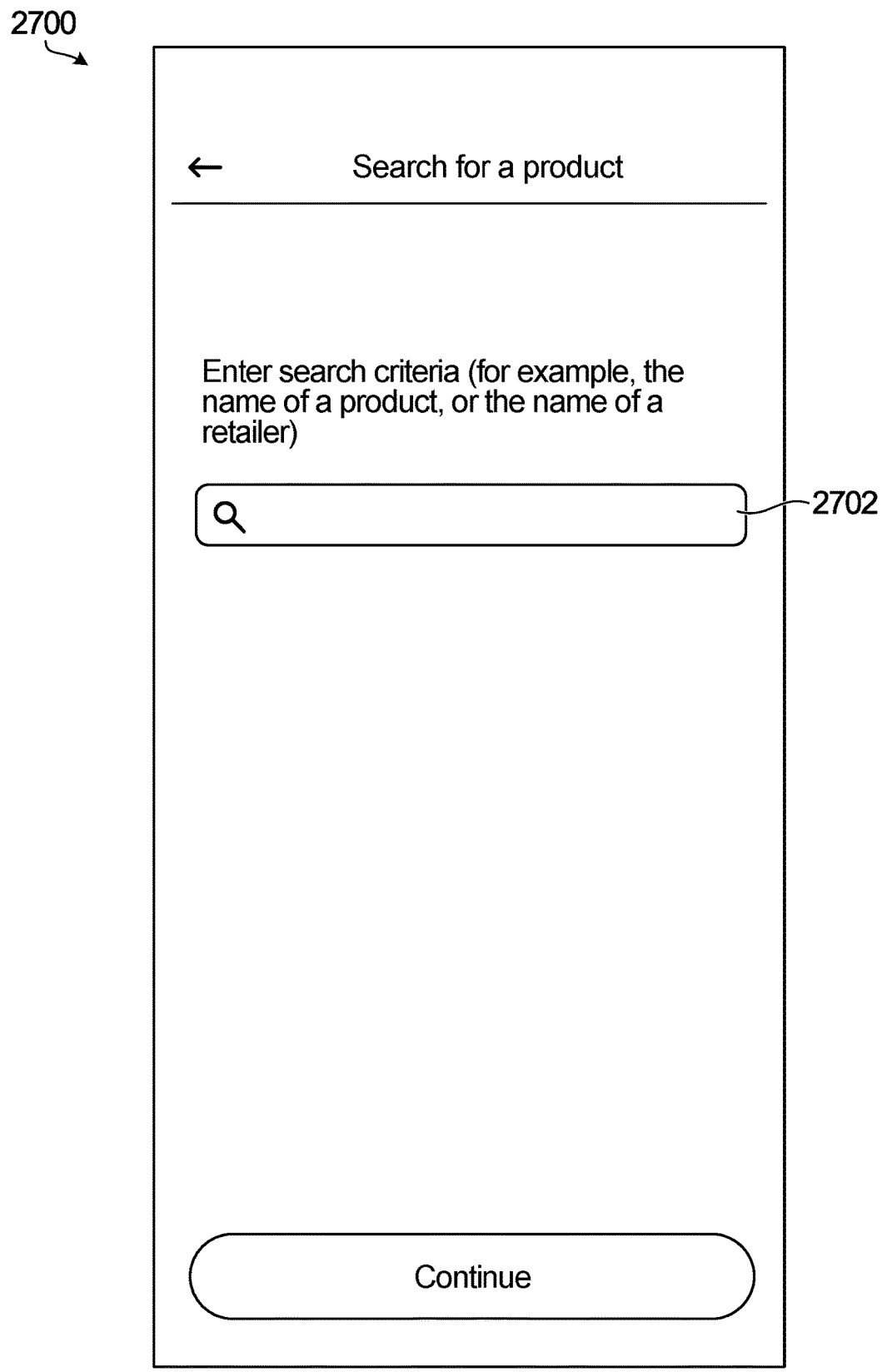
FIG. 27 is an example screen page for searching for a desired product to include in an order for a returned item.

Selecting option 2602 on the screen page 2600 directs Buyer B to another screen page that enables a product search. FIG. 27 is an example screen page 2700 for searching for a desired product to include in an order. The screen page 2700 includes a search bar 2702. Entering search parameters into the search bar 2702 initiates a search of products and/or merchants associated with an e-commerce platform. In an example, a product name could be entered into the search bar 2702, and one or more products that match that name could be provided as a result. In another example, a model number or another identifier of a product could be entered into the search bar 2702, and one or more products that match that identifier could be provided as a result. In a further example, the name of a merchant could be entered into the search bar 2702, and one or more products that are sold by that merchant could be provided as a result. Multiple searches could be performed and/or refined until a specific product is found.

Selecting option 2604 on the screen page 2600 directs Buyer B to a screen page that allows Buyer B to provide a description of a product. FIG. 28 is an example screen page 2800 for providing a description of a desired product. The screen page 2800 includes a dropdown menu 2802 to allow Buyer B to select a type of product. In some implementations, the dropdown menu 2802 includes multiple levels to allow a user to more easily locate a product type. For example, a first level could include general categories such as: clothing, household appliances, automotive, furniture, sports, and toys. Selecting one of these categories could direct Buyer B to a second level of the dropdown menu 2802. For example, if clothing is selected, the second level could include subcategories such as: women's shirts, men's shirt, women's pants, and men's pants. Any number of levels could be provided in the dropdown menu 2802 to achieve a desired range of specificity. Buyer B may use some or all of the levels to specify their desired product.

The screen page 2800 also includes a text box 2804 that allows a user to manually enter a description of a desired product. These may be details that were not provided as options in the drown menu 2802. For example, if the dropdown menu 2802 does not allow for the selection of a product's color, then a user may specify a desired color in the text box 2804. In some implementations, the description entered into the text box 2804 is stored by the e-commerce platform with the order. In some implementations, the description entered into the text box 2804 is subject to text analysis to extract useful data from the description, which is then stored by the e-commerce platform. This text analysis could sort the information included in the description into a more easily storable and searchable data set. The text analysis could also or instead identify important information or requirements in the description of the product. For example, if a user specifies a desired color in the text box 2804, a text analysis algorithm could identify the color as being important information and store this color with the information related to the order. The text analysis algorithm could also help construe subjective terminology used in the product description. For example, if a product description conveys that a customer is interested in purchasing a "nice warm coat", the text analysis algorithm could construe this description as "nice=priced above a certain price threshold", and "warm coat=a winter coat". The construed description could then be stored with the order by the e-commerce platform. Artificial intelligence could be implemented to help perform the text analysis.

Figure 29:
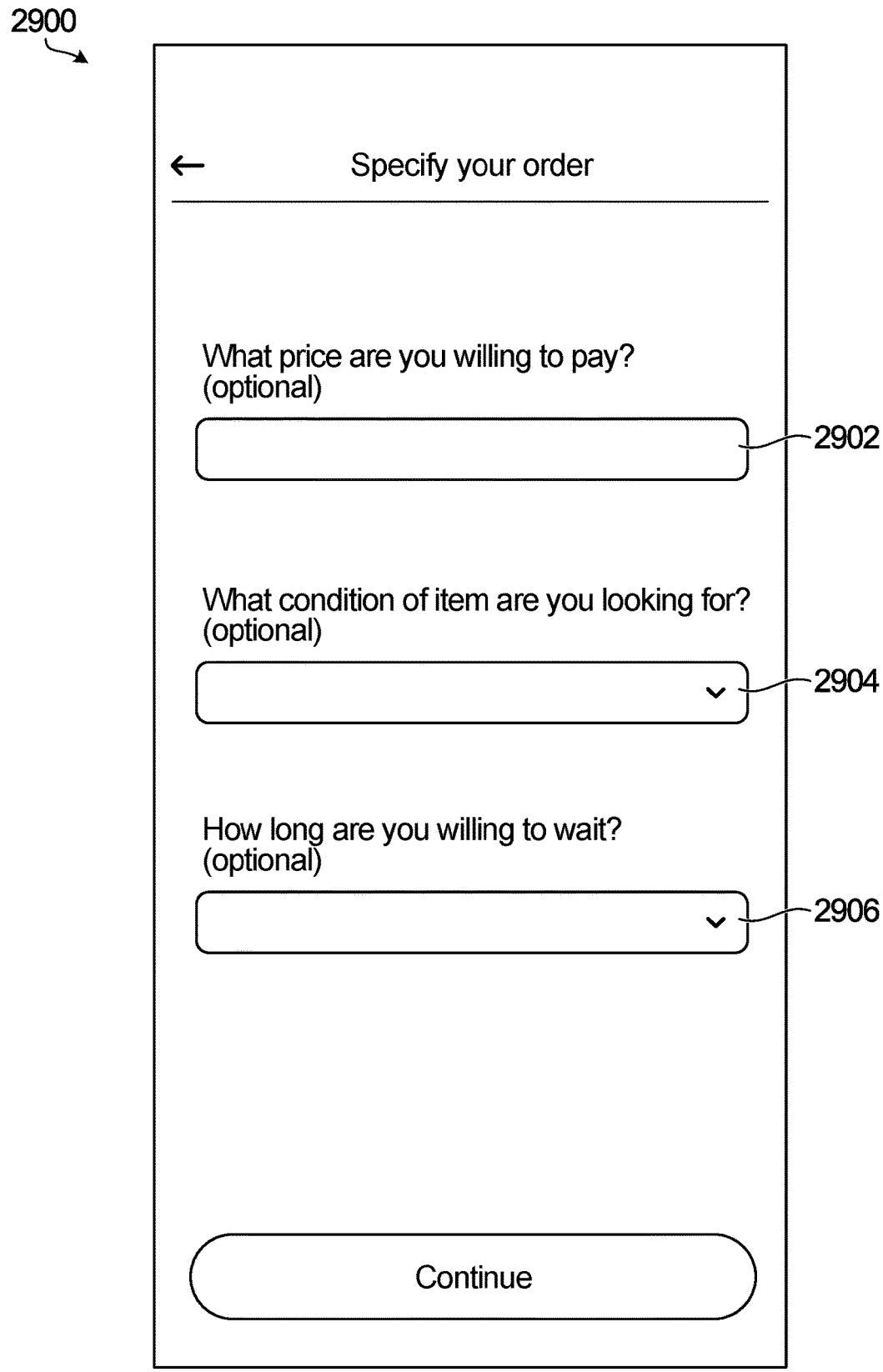
FIG. 29 is an example screen page for placing constraints on a desired product.

After indicating a specific desired product in step 2510 or providing a description of the desired product in step 2512, Buyer B could be presented with options to specify his/her order. In some implementations, specifying an order includes placing one or more constraints on a desired product in the order. FIG. 29 is an example screen page 2900 for placing constraints on a desired product. The screen page 2900 includes a box 2902 for optionally entering a price that Buyer B intends or is willing to pay for the desired product. The screen page 2900 also includes a dropdown menu 2904 for optionally selecting a desired condition for the desired product. Non-limiting examples of conditions that could be selected in the dropdown menu 2904 are provided elsewhere herein. The screen page 2900 further includes a dropdown menu 2906 for selecting a length of time that Buyer B is willing to wait for the desired product. This length of time could impose a time limit on the order. Other examples of constraints that could be specified using the screen page 2900 are described elsewhere herein.

Figure 30:
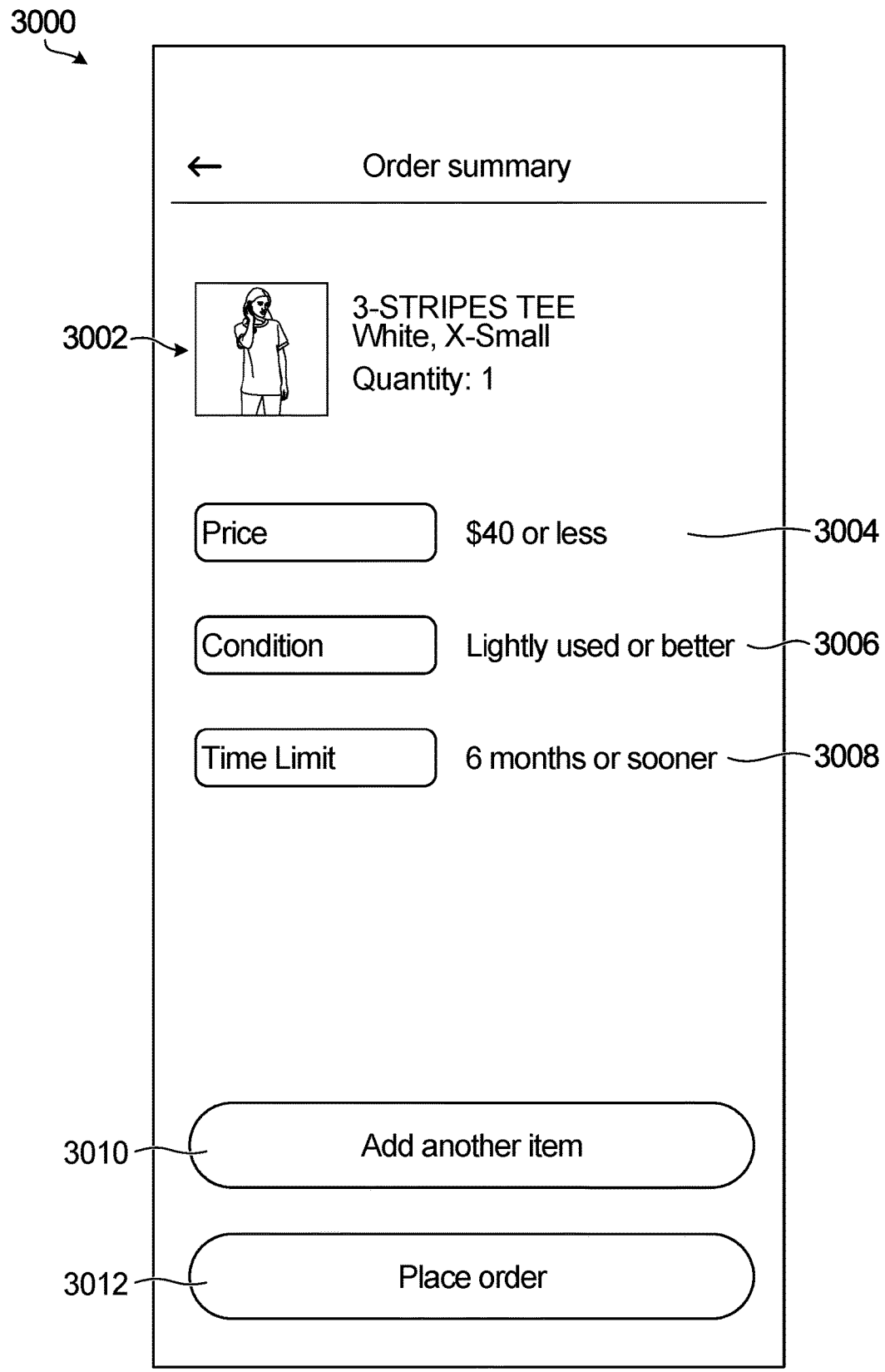
FIG. 30 is an example screen page including an order summary for a specific desired product.

Following the screen page 2900, Buyer B could be presented with a summary of their order. FIG. 30 is an example screen page 3000 including an order summary for a specific desired product. The screen page 3000 includes an indication 3002 of the specific desired product. This product could have been selected using the search bar 2702 in the screen page 2700, for example. The screen page 3000 also includes multiple constraints 3004, 3006, 3008 that have been placed on the order. These constraints could have been placed using the screen page 2900, for example. The screen page 3000 further includes an option 3010 to add another item to the order. Upon selection of the option 3010, Buyer B could be directed back to the screen page 2600 to begin the selection of another item. The screen page 3000 also includes an option 3012 to place the order. In some implementations, selecting option 3012 directs Buyer B to a screen page where Buyer B can prepay for the order. However, prepayment may be optional, and Buyer B could instead choose to pay for the desired product at a later date. Details regarding payments for items can be found elsewhere herein.

Figure 31:
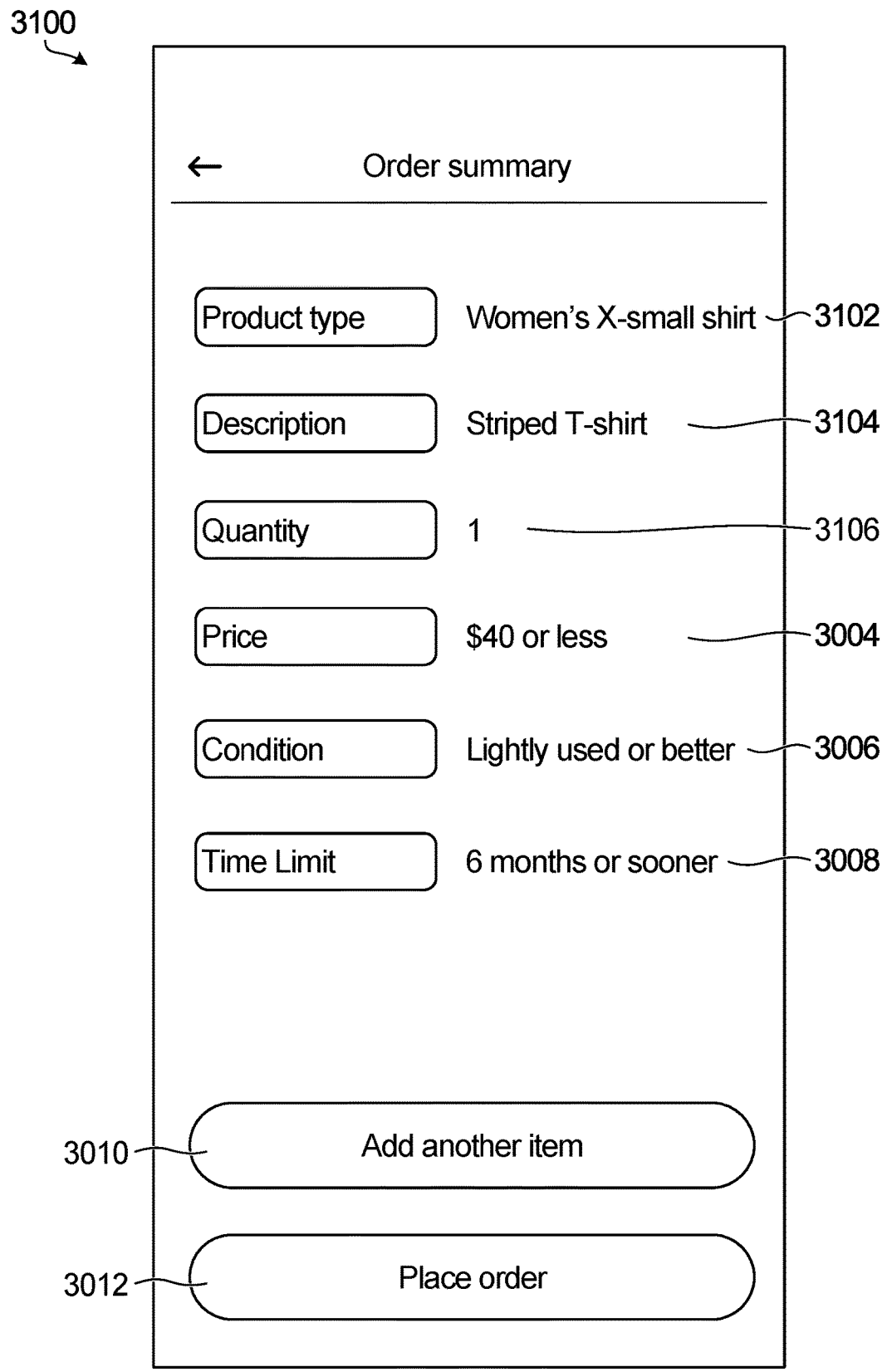
FIG. 31 is an example screen page including an order summary for a desired product type.

FIG. 31 is an example screen page 3100 including an order summary for a desired product type. The screen page 3100 includes an indication 3102 of the selected product type, an indication 3104 of the description provided, and an indication 3106 of the desired quantity of items. The indications 3102, 3104, 3106 could be based on information provided by Buyer B using the screen page 2800, for example. The screen page further includes the constraints 3004, 3006, 3008 and the options 3010, 3012 of FIG. 30.

Figure 32:
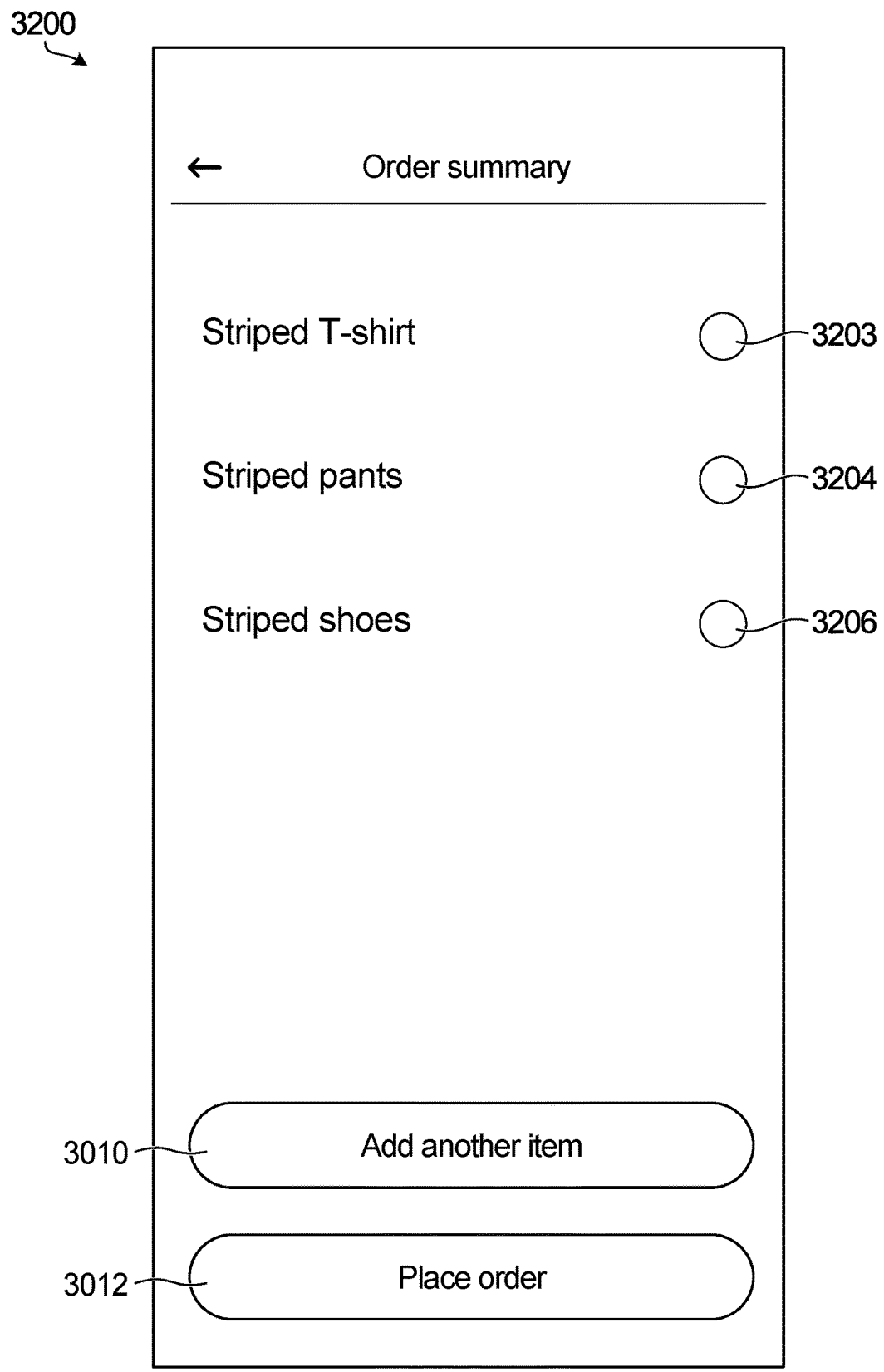
FIG. 32 is an example screen page including an order summary for multiple desired products.

In some implementations, Buyer B generates an order that includes multiple desired products. These multiple products could be presented to Buyer B in an order summary. FIG. 32 is an example screen page 3200 including an order summary for multiple products 3202, 3204, 3206. Any of the multiple products 3202, 3204, 3206 could be selected by Buyer B, in which case Buyer B is directed to another screen page that outlines the product in more detail. For example, selecting the product 3202 for the "Striped T-shirt" could direct Buyer B to either of the screen pages 3000, 3100. Selecting the product 3202 could also or instead provide Buyer B with an option to remove the product from the order.

The example provided above relates to Buyer B initiating an order for returned items using their account on the e-commerce platform. However, an order for returned items could also be initiated using other applications. For example, a returns marketplace could provide Buyer B with an option to place an order for a returned item. Selecting this option in the returns marketplace could then direct Buyer B to the screen page 2600 of FIG. 26. In some implementations, Buyer B could perform a product search using a returns marketplace, but is unable to find a suitable product that is available through a customer-to-customer return. The returns marketplace could then provide Buyer B with the option of converting their search into an order that is stored by the e-commerce platform.

In some implementations, Buyer B could search and locate a desired product using an online store. The online store could then provide Buyer B with a screen page including an option to purchase a new item, and another option to place an order for a returned item. The option to place an order for the returned item might only be offered to a Buyer B if Buyer B has not matched with any customers that intend to return an item of that product. By way of example, the screen page 1800 of FIG. 18 could be modified to include an option to place an order for a returned item of the 3-Stripes Tee.

Following step 2510 or step 2512 of the method 2500, the e-commerce platform stores information related to the order. The information indicates: (i) the identity of Buyer B, and (ii) the desired product. For example, using the e-commerce platform 602 of FIG. 6, Buyer B's item could be added to the order record 690. At step 2514, Buyer A initiates a customer-to-customer return for a purchased item. Step 2514 could be substantially similar to any or all of steps 808, 810, 814 of FIG. 8. For example, step 2514 could include Buyer A selecting an item to return, and choosing to implement a customer-to-customer return.

At step 2516, Buyer A submits a condition of the purchased item, and at step 2518, the merchant reviews and accepts the return request. Steps 2516, 2518 are optional, and could be substantially similar to steps 816, 818 of FIG. 8, for example.

At step 2520, Buyer A's purchased item is matched with Buyer B's desired product. In other words, the purchased item is determined to correspond to the desired product. Step 2520 could be performed in any of a number of different ways.

In some implementations, step 2520 is performed automatically by a returns management engine. For example, the returns management engine could search an order record for an order that includes the product being returned by Buyer A. In the case that Buyer B's order is for a specific desired product, the returns management engine might only need to compare a name or identifier of Buyer B's desired product to the name or identifier of the product being returned by Buyer A.

In the alternate case that Buyer B's order is for a product type, then the returns management engine could determine if Buyer A's item corresponds to that product type. In one example, the returns management engine determines the product type(s) associated with Buyer A's item, and searches the order record for orders including that product type. In another example, when Buyer B's order for a product type is placed, the returns management engine determines and stores a list of products sold on the e-commerce platform that correspond to the product type. Buyer A's item can then be compared to this list of specific products. If Buyer A's item matches a product in the list, then Buyer A's item corresponds to the product type identified in Buyer B's order. If Buyer A's item does not match a product in the list, then Buyer A's item does not correspond to the product type identified in Buyer B's order.

As noted above, in addition to a product type, Buyer B's order could also include a description of the desired product. When a description is included, the returns management engine might perform extra steps to determine if Buyer A's item corresponds to Buyer B's desired product. For example, the returns management engine could compare Buyer A's item to any important information that has been extracted from the description. If Buyer A's item does not match with this information, then the returns management engine could determine that the item does not correspond to Buyer B's desired product.

In some implementations, step 2520 is performed at least in part by Buyer A or the merchant. For example, the returns management engine could determine that Buyer A's item corresponds to the product type identified in Buyer B's order. The returns management engine could then transmit a message to Buyer A or the merchant, requesting that Buyer A or the merchant verify that Buyer A's item corresponds to a product description provided by Buyer B. A match between Buyer A's item and Buyer B's desired product could be dependent on Buyer A or the merchant confirming that the item matches with the product description.

In step 2522, Buyer A is matched with Buyer B. Therefore, a customer-to-customer return from Buyer A to Buyer B is enabled. In some implementations, the e-commerce platform matches Buyer A to Buyer B using at least a portion of the process 700 of FIG. 7. However, some steps in the process 700 may be omitted in some cases. For example, any or all of steps 706, 708, 712 could be omitted.

In some implementations, step 2522 includes determining a cost associated with shipping the purchased item from the Buyer A to Buyer B. Based on the cost, the e-commerce platform could determine to enable a customer-to-customer return from the Buyer A to the Buyer B. For example, if the cost is less than a predetermined threshold, the Buyer A could be matched with Buyer B. The predetermined threshold may be determined based on a price Buyer B has indicated he/she is willing to pay for the desired product.

In some implementations, step 2522 includes determining to enable a customer-to-customer return based on a comparison of the desired product condition indicated in Buyer B's order, and the condition of the purchased item submitted by Buyer A in step 2516. If Buyer A's item is in a condition that Buyer B would find unacceptable, then Buyer A would not be matched with Buyer B.

In some implementations, it is determined at step 2520 that Buyer A's item corresponds to the desired product in the order placed by Buyer B and to a desired product in an order placed by another customer ("Buyer C"). In this case, step 2522 could include comparing the cost of shipping the item from Buyer A to Buyer B, to the cost of shipping item from Buyer A to Buyer C. If the cost of shipping the item to Buyer B is cheaper, then the method 2500 could proceed to step 2524. For example, the cost of shipping the item from Buyer A to Buyer B might be quantified as the cost of shipping the item a distance of 1000 km, and the cost of shipping item from Buyer A to Buyer C might be quantified as the cost of shipping the item a distance of 1500 km. In this example, in order to save shipping costs for the merchant, the item would be offered to Buyer B. Alternatively, the item could be offered or shipped to the customer that first placed their order.

In some cases, step 2522 might determine not to enable shipping Buyer A's item to Buyer B. For example, the cost of shipping the item from Buyer A to Buyer B could be above a predetermined threshold. In these implementations, the method 2500 ends. Steps 2514, 2516, 2518, 2520, 2522 could be performed again when another customer initiates a customer-to-customer return for a purchased item.

In step 2524, Buyer B reviews and accepts Buyer A's item. For example, content could be transmitted for display on a customer device associated with Buyer B, where the content includes an option to buy Buyer A's item. The content could also include details of Buyer A's item, including the specific product and the condition of the item, for example. If Buyer B approves of Buyer A's item, Buyer B could send a message from their customer device to the e-commerce platform indicating that he/she intends to buy the Buyer A's item. A customer-to-customer return is then initiated between Buyer A and Buyer B.

Figure 33:
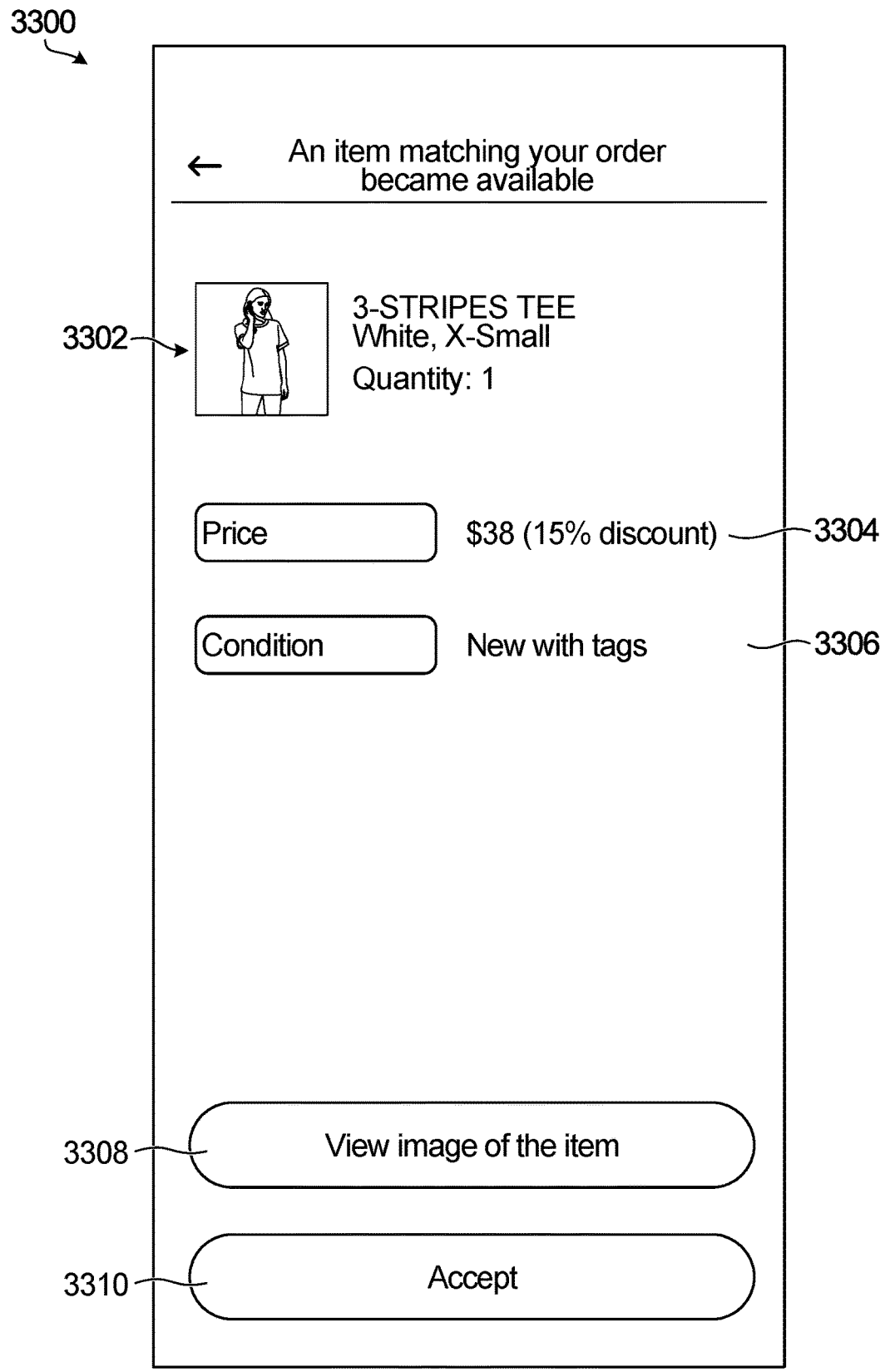
FIG. 33 is an example screen page allowing a customer to review and accept a returned item.

FIG. 33 is an example screen page 3300 allowing Buyer B to review and accept a returned item (or soon to be returned item). The screen page 3300 includes an indication 3302 of the returned item, including the product, color, size and quantity associated with the returned item. The screen page 3300 also includes an indication 3304 of the price the returned item, and indication 3306 of the condition of the returned item. In some implementations, the price of the returned item is based on the cost of shipping the item from Buyer A to Buyer B. An option 3308 allows a user to view an image of the returned item. This image could have been captured and provided by Buyer A in step 2516, for example. Buyer B can accept the returned item by selecting the button 3310. This could direct Buyer B to a screen page to pay for returned item, if Buyer B had not already done so when placing the order.

It should be noted that step 2524 is optional. In some embodiments, a returns management engine might automatically initiate a customer-to-customer return following step 2522.

In step 2526 the e-commerce platform transmits, to a customer device associated with Buyer A, information for shipping the item from Buyer A to the Buyer B. This information could include, for example, a shipping label for shipping the item from Buyer A to Buyer B. Using the information, Buyer A packs and ships the item to Buyer B. In some implementations, step 2526 is substantially similar to step 826 of FIG. 8.

The remaining steps of the method 2500 could be substantially similar to the online store implementation of customer-to-customer returns and/or the returns marketplace implementation of customer-to-customer returns. For example, any or all of steps 2528, 2530, 2532, 2534 could be similar to steps 828, 830, 832, 834 of FIG. 8, respectively.

In some implementations, Buyer B is a charitable organization accepting donations of returned or second hand products. Buyer B places an order for one or more products in steps 2508, 2510, 2512. The order indicates that Buyer B will not pay for the products, but will instead provide charitable tax receipts. Optionally, in step 2514, Buyer A might indicate that he/she is willing to donate the item, and will accept a charitable tax receipt as compensation for the item. Step 2530 includes the merchant issuing a charitable tax receipt for the market value of the item to Buyer A. Buyer A receives the tax receipt in step 2532.

Although the method 2500 is described in the context of a single item being sold to Buyer B through a customer-to-customer return, it should be noted that multiple customer-to-customer returns might be used to sell multiple items to Buyer B. For example, in steps 2510, 2512 Buyer B might generate an order for multiple desired products. The order indicates that Buyer B will accept a returned item for each of the desired products. Steps 2514, 2516, 2518, 2520, 2522, 2524, 2526, 2528, 2530, 2532, 2534 could be repeated for each of the desired products. However, the Buyer A experience 2504 might correspond to a different customer and the merchant experience 2506 might correspond to a different merchant for each of the desired products.

Additional Examples

Figure 34:
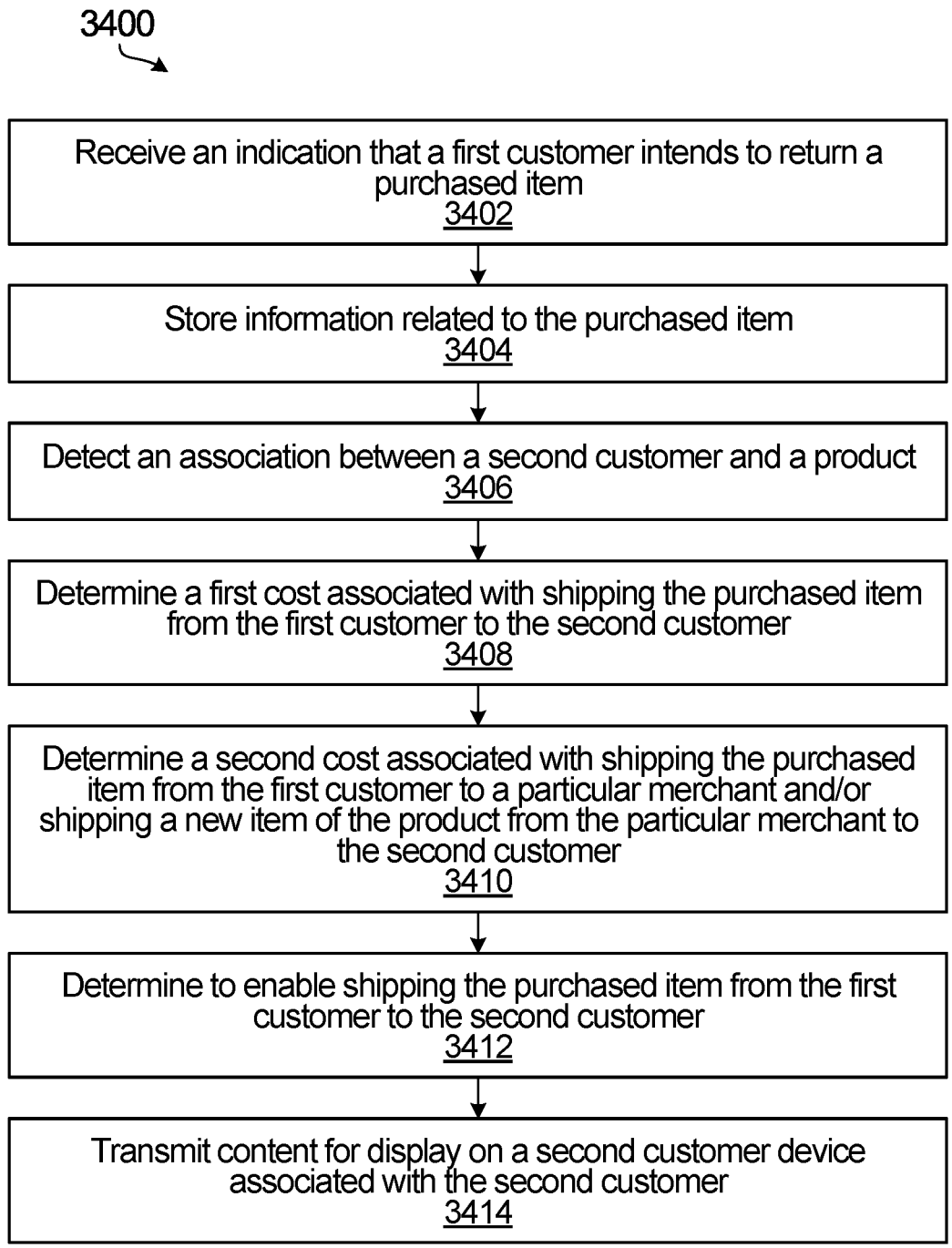
FIGS. 34 to 36 are flow diagrams illustrating example computer-implemented methods performed by a system.

FIG. 34 is a flow diagram illustrating an example computer-implemented method 3400 performed by a system. For the sake of example, the method 3400 will be described as being performed by the e-commerce platform 602 of FIG. 6.

In step 3402, the processor 606 receives an indication that a first customer intends to return a purchased item. The indication is received from a first customer device that is associated with the first customer. The first customer device could be the customer device 670a, for example, and the indication may be received via the network 650 and the network interface 642. In some embodiments, step 3402 includes the processor 606 transmitting content for display on the first customer device, and then receiving a message from the first customer device that includes the indication that the first customer intends to return the purchased item. The content includes an option to return the purchased item. Examples of such content for display on the first customer device are illustrated in the screen pages 900, 1000, 1100, 1200, 1300 of FIGS. 9-13. In some embodiments, the processor 606 receives the message from the first customer device upon the first customer selecting the option to return the purchased item.

In step 3404, the memory 608 stores information related to the purchased item. The information includes an indication that: (i) the purchased item belongs to the first customer, and (ii) the purchased item is an item of a product that is associated with a particular merchant on the e-commerce platform 602. The particular merchant may be a particular user or person, a particular company, and/or a particular online store, for example. Optionally, the information could also (or instead) be stored in the product returns record 632 in the memory 630.

In some embodiments, the processor 606 transmits additional content for display on a merchant device that is associated with the particular merchant. The merchant device could be the device 660, for example. The additional content includes an option to permit shipping the purchased item from the first customer to another customer. The additional content could also include a condition of the purchased item, where the condition of the purchased item is received by the processor 606 from the first customer device. Optionally, the condition of the purchased item includes an image of the purchased item that could have been taken by the first customer device. Examples of this additional content for display on the merchant device are illustrated in the screen pages 1500 and 1600 of FIGS. 15 and 16.

In step 3406, the processor 606 detects, from a second customer device that is associated with a second customer, an association between the second customer and a product.

The product corresponds to the purchased item that the first customer intends to return. The second customer device could be the customer device 670*b*, for example. It should be noted that the second customer is a user of the e-commerce platform 602, but not necessarily one who actually has or will make a purchase of the purchased item or any other item sold on the e-commerce platform. In some embodiments, the processor 606 receives an indication that the second customer has navigated to an online store (for example, the online store 626) associated with the particular merchant, and optionally receives an indication that the second customer has navigated to a page of the online store associated with the product (for example, the screen pages 1700 and 1800 of FIGS. 17 and 18). Optionally, the page of the online store could offer the product for sale. The association between the second customer and the product that is detected at step 3406 could include the indication that the second customer has navigated to an online store associated with the particular merchant and/or the indication that the second customer has navigated to a page of the online store that offers the product for sale.

In step 3408, the processor 606 determines a first cost associated with shipping the purchased item from the first customer to the second customer. An example of determining the first cost is discussed in further detail above with reference to step 710 of FIG. 7.

In step 3410, the processor 606 determines a second cost associated with at least one of: (i) shipping the purchased item from the first customer to the particular merchant, and (ii) shipping a new item of the product from the particular merchant to the second customer. In some embodiments, the second cost is further associated with repackaging and/or inspecting the purchased item. An example of determining the second cost is discussed in further detail above with reference to steps 706, 708 of FIG. 7.

The new item of the product is an item that is shipped from the merchant to a customer. The new item may be new in the sense that it has never been previously purchased, but this might not always be the case. The new item could instead be a returned item being resold by the particular merchant, and could even be the purchased item after being returned to the particular merchant by the first customer.

Shipping the purchased item from the first customer to the second customer could include shipping the purchased item from a shipping location that is associated with the first customer to a shipping location that is associated with a second customer. Similar comments apply to shipping the purchased item from the first customer to the particular merchant, and shipping the new item from the particular merchant to the second customer. In some embodiments, the first cost is based on the record of customer shipping locations 624, and the second cost is based on the record of customer shipping locations 624 and the record of merchant shipping locations 618. The memories 616, 624 store the record of customer shipping locations 618 and the record of customer shipping locations 624, respectively. The record of customer shipping locations 624 includes a shipping location of the first customer and/or a shipping location of the second customer. The record of merchant shipping locations 618 includes a shipping location of the particular merchant.

In step 3412, the processor 606 determines to enable shipping the purchased item from the first customer to the second customer. For example, the processor 606 could determine that a match between the first customer and the second customer is in the best interest of the particular merchant. Step 3412 is based on a comparison between the first cost determined at step 3408 and the second cost determined at step 3410. In some embodiments, the comparison between the first cost and the second cost includes a comparison between a predetermined threshold and a result of subtracting the first cost from the second cost.

In some embodiments, the first cost includes a first distance (for example, a distance in kilometers) between the first customer and the second customer. The second cost includes a second distance between the first customer and the particular merchant, and a third distance between the particular merchant and the second customer. The comparison between the first cost and the second cost then includes a comparison between the first distance and a sum of the second distance and the third distance.

In some embodiments, the processor 606 receives a first price for shipping the purchased item from the first customer to the second customer, a second price for shipping the purchased item from the first customer to the particular merchant, and a third price for shipping the new item of the product from the particular merchant to the second customer. The first price, second price and third price could be received from one or more of the shipping provider(s) 652, and/or from the shipping cost information record 612, for example. The first price, second price and third price could be in terms of a currency such as dollars. The first cost determined at step 3408 includes the first price, and the second cost determined at step 3410 includes the second price and the third price. In step 3412, the comparison between the first cost and the second cost includes a comparison between the first price and a sum of the second price and the third price.

In step 3414, the processor 606 transmits content for display on the second customer device. The content includes an offer for a sale of the purchased item to the second customer, and optionally an offer for a sale of the new item of the product to the second customer. An example of such content is illustrated in the screen page 1700 of FIG. 17.

In some embodiments, the processor 606 also receives a request to buy the purchased item from the second customer device. For example, the second customer could use the second customer device to accept the offer for the sale of the purchased item. The processor 606 could then transmit additional content for display on the first customer device, where the additional content includes a shipping label for shipping the item from the first customer to the second customer. For example, with reference to the screen page 1900 of FIG. 19, the first customer could select the option 1906 to print the shipping label. The first customer could package the item, apply the shipping label to the package, and then ship the package to the second customer.

Although the method 3400 refers only to a first and second customer, the method applies more generally to any number of customers. For example, steps 3406, 3408, 3410, 3412, 3414 could be repeated for a third customer. The processor 606 can detect, from a third customer device that is associated with the third customer, an association between the third customer and the product. Following the detection, the processor can determine a third cost associated with shipping the purchased item from the first customer to the third customer, and also determine a fourth cost associated with at least one of: (i) shipping the purchased item from the first customer to the particular merchant, and (ii) shipping the new item of the product from the particular merchant to the third customer. Based on a comparison between the third cost and the fourth cost, the processor 606 can determine not to enable shipping the purchased item from the first customer to the third customer. For example, the processor 606 could determine that a match between the first customer and the third customer would not be in the best interest of the particular merchant. This could be the case when the third cost is greater than the fourth cost, or when a result of subtracting the third cost from the fourth cost is less than a pre-determined threshold, for example. The processor 606 then transmits additional content for display on the third customer device, where the additional content includes an offer for a sale of the new item of the product to the third customer, but does not include an offer for a sale of the purchased item to the third customer. An example of such additional content is illustrated in the screen page 1800 of FIG. 18.

Any of the steps 3406, 3408, 3410, 3412, 3414 could be performed simultaneously for the second customer and the third customer. For example, the second customer could view the content on the second customer device at the same time that the third customer is viewing the additional content on the third customer device. The purchased item from the first customer would be offered for sale to the second customer, but not to the third customer.

Figure 35:
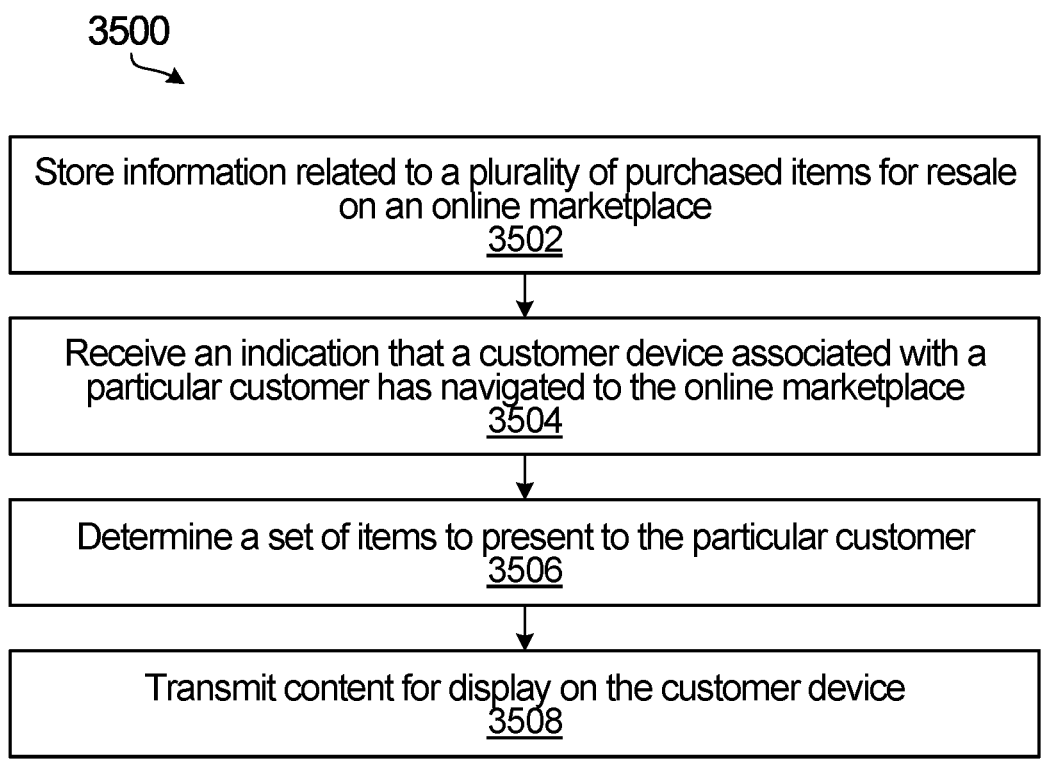

FIG. 35 is a flow diagram illustrating an example computer-implemented method 3500 performed by a system. For the sake of example, the method 3500 will be described as being performed by the e-commerce platform 602 of FIG. 6.

In step 3502, the memory 608 stores information related to a plurality of purchased items for resale on the online marketplace 634. Optionally, the information could also (or instead) be stored in the product returns record 640 in the memory 638. For each purchased item of the plurality of purchased items, the information indicates: (i) a respective customer to which the purchased item belongs, and (ii) a respective merchant that sold the purchased item to the respective customer. The online marketplace 634 could be specific to a single merchant that sold each of the plurality of purchased items, in which case the "respective merchant" is the same single merchant. Alternatively, the online marketplace 634 could be used by multiple merchants, and therefore multiple merchants could have sold the plurality of purchased items.

Optionally, for each purchased item of the plurality of purchased items, the processor 606 could receive an indication that the respective customer to which the purchased item belongs intends to return the purchased item. This indication could be received before step 3502. In some embodiments, for each purchased item of the plurality of purchased items, the processor 606 transmits content for display on a customer device that is associated with the respective customer to which the purchased item belongs. The processor 606 then receives a message from the customer device that includes the indication that the respective customer to which the purchased item belongs intends to return the purchased item. The content for display on the customer device includes an option to return the purchased item. Examples of the content that may be displayed on the customer device are illustrated in the screen pages 900, 1000, 1100, 1200, 1300 of FIGS. 9-13. In some embodiments, the processor 606 could receive the message from the customer device upon the customer selecting the option to return the purchased item.

In further embodiments, for each purchased item of the plurality of purchased items, the processor 606 transmits additional content for display on a merchant device that is associated with the respective merchant that sold the purchased item. The additional content includes an option to permit shipping the purchased item from the respective customer to which the purchased item belongs to another customer. The processor 606 may also receive, from the customer device, a condition of the purchased item, and the additional content could include this condition of the purchased item. Optionally, the condition of the purchased item includes an image of the purchased item. Examples of the additional content for display on the merchant device are illustrated in the screen pages 1500 and 1600 of FIGS. 15 and 16.

In step 3504, the processor 606 receives an indication that a customer device associated with a particular customer has navigated to the online marketplace. The indication may be received in any of a variety of ways. In some embodiments, the processor receives, from the customer device associated with the particular customer, login credentials that are associated with an account of the particular customer on the online marketplace. The indication that the customer device has navigated to the online marketplace could include the login credentials. The particular customer is a user of the e-commerce platform, but not necessarily one who actually has or will make a purchase of the purchased item or any other item sold on the e-commerce platform.

In some embodiments, indication that the customer device has navigated to the online marketplace includes a request from the customer device for a page, such as a webpage or a page on a mobile application, that is associated with the online marketplace. The request for the page could come from an internet browser on the customer device, or from a mobile application that is running on the customer device.

In step 3506, the processor 606 determines a set of items to present to the particular customer. The set of items includes at least one of the plurality of purchased items and fewer than all of the plurality of purchased items. The set of items could include items that are being returned using a customer-to-customer return process (for example, a returned item that is still in the possession of the respective customer to which the returned item belongs), and items that have already been returned using a conventional return process (for example, a returned item that is currently in the possession of, and being resold by, the respective merchant that sold the purchased item). An example of a set of items is the items 2112, 2114, 2116 illustrated in FIG. 21. Another example of a set of items is the items 2112, 2114, 2116, 2312 illustrated in FIG. 23.

For each purchased item of at least some of the plurality of purchased items, step 3506 includes determining, by the processor 606, a first cost associated with shipping the purchased item from the respective customer to which the purchased item belongs to the particular customer. For each purchased item of the at least some of the plurality of purchased items, step 3506 further includes determining a second cost associated with at least one of: (i) shipping the purchased item from the respective customer to which the purchased item belongs to the respective merchant that sold the purchased item, and (ii) shipping a new item from the respective merchant that sold the purchased item to the particular customer. In some embodiments, the second cost is further associated with repackaging and/or inspecting the purchased item.

Shipping the purchased item from the respective customer to which the purchased item belongs to the particular customer could include shipping the purchased item from a shipping location that is associated with the respective customer to which the purchased item belongs to a shipping location that is associated with a particular customer. Similar comments apply to shipping the purchased item from the respective customer to which the purchased item belongs to the respective merchant that sold the purchased item, and shipping the new item from the respective merchant that sold the purchased item to the particular customer. In some embodiments, the first cost is based on the record of customer shipping locations 624, and the second cost is based on the record of customer shipping locations 624 and the record of merchant shipping locations 618. The record of customer shipping locations 624 includes a shipping location of the respective customer to which the purchased item belongs and/or a shipping location of the particular customer. The record of merchant shipping locations 618 includes a shipping location of the respective merchant that sold the purchased item.

With continued reference to step 3506, the processor 606 determines, based on a comparison between the first cost and the second cost, whether to include the purchased item in the set of items. Optionally, the comparison between the first cost and the second cost includes a comparison between a predetermined threshold and a result of subtracting the first cost from the second cost. Determining whether to include the purchased item in the set of items could also depend on other factors. In some embodiments, the processor 606 receives, from the customer device associated with the particular customer, parameters for a search of the online marketplace 634. For each purchased item of the at least some of the plurality of purchased items, the processor 606 determines whether or not the purchased item matches the parameters of the search and, based on whether or not the purchased item matches the parameters of the search, determines whether to include the purchased item in the set of items. Parameters for a search of the online marketplace 634 could include keywords. In one example, the processor 606 receives the keyword "shirt" for a search of the online marketplace 634, and only includes items in the set of items that relate to a "shirt". Other items, such as phone cases, would not be included in the set of items in this example. Parameters for a search of the online marketplace 634 could also include dropdown menus that filter items based on size, condition, price and color, for example.

In some embodiments, the first cost includes a first distance (for example, a distance in kilometers) between the respective customer to which the purchased item belongs and the particular customer. The second cost includes a second distance between the respective customer to which the purchased item belongs and the respective merchant that sold the purchased item, and a third distance between the respective merchant that sold the purchased item and the particular customer. The comparison between the first cost and the second cost then includes a comparison between the first distance and a sum of the second distance and the third distance.

In some embodiments, the processor 606 receives a first price for shipping the purchased item from the respective customer to which the purchased item belongs to the particular customer, a second price for shipping the purchased item from the respective customer to which the purchased item belongs to the respective merchant that sold the purchased item, and a third price for shipping the new item of the product from the respective merchant that sold the purchased item to the particular customer. The first price, second price and third price could be received from one or more of the shipping provider(s) 652, and/or from the shipping cost information record 612, for example. The first price, second price and third price could be in terms of a currency such as dollars. The first cost includes the first price, the second cost includes the second price and the third price, and the comparison between the first cost and the second cost includes a comparison between the first price and a sum of the second price and the third price.

In step 3508, the processor 606 transmits content for display on the customer device. The content includes, for each purchased item of the set of items, a respective offer for a sale of the purchased item to the particular customer. Optionally, the content could include the price (original price and/or discounted price) of the item, but this might not always be the case. The content could also be a list of the items that does not include any prices. The particular customer could select one of the items in the list to retrieve an associated page for the item, which describes the item, its condition, and the price (original and/or discounted). Other examples of the content transmitted at step 3508 are illustrated in the screen pages 2100, 2300 of FIGS. 21 and 23.

The sets of items that are determined in step 3506 can vary for different customers. In some embodiments, the customer device could be considered a first customer device, the particular customer could be considered a first customer, the set of items could be considered a first set of items, the content could be considered first content, and the processor 606 receives an indication that a second customer device associated with a second customer has navigated to the online marketplace 634. Next, the processor determines a second set of items to present to the second customer, where the second set of items is different from the first set of items. The second set of items could be determined in a similar manner to the first set of items, however the actual items and/or the cost of the items could differ because a shipping location of the first customer is different from a shipping location of the second customer. In one example, the first set of items could be the items 2112, 2114, 2116, 2312 illustrated in FIG. 23, and the second set of items could the items 2112, 2116, 2312, 2412 illustrated in FIG. 24. The processor 606 then transmits second content for display on the second customer device. The second content includes, for each purchased item of the second set of items, a respective offer for a sale of the purchased item to the second customer. Examples of the second content are illustrated in the screen pages 2200, 2400 of FIGS. 22 and 24. The second customer could view the second content on the second customer device at the same time that the first customer is viewing the first content on the first customer device.

Figure 36:
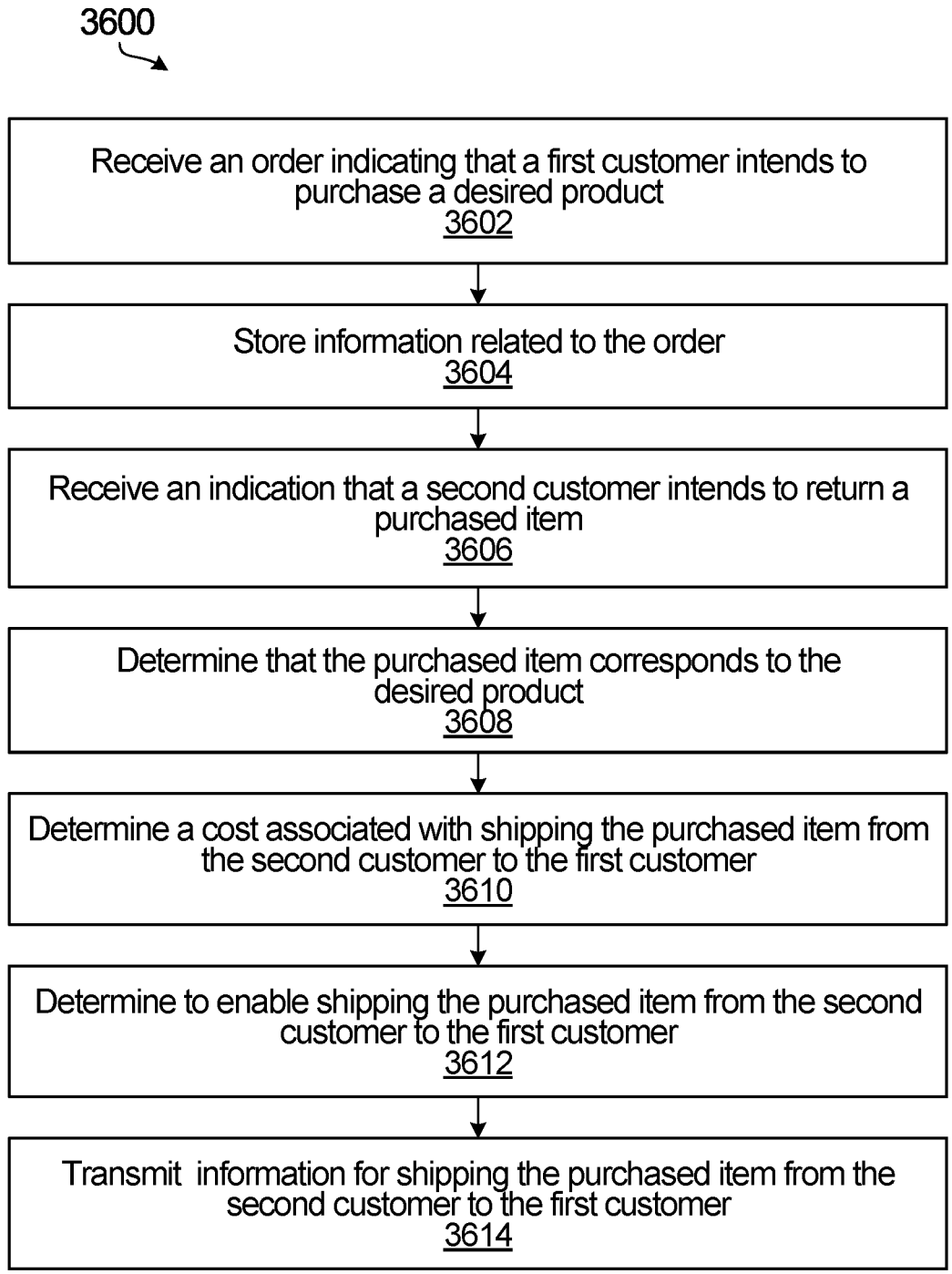

FIG. 36 is a flow diagram illustrating an example computer-implemented method 3600 performed by a system. For the sake of example, the method 3600 will be described as being performed by the e-commerce platform 602 of FIG. 6.

In step 3602, the processor 606 receives an order from a first customer device that is associated with a first customer. The first customer device could be the customer device 670b, and the order may be received via the network 650 and the network interface 642. The order indicates that: (i) the first customer intends to purchase a desired product, and (ii) the first customer will accept a returned item of the desired product. Optionally, the order further indicates a price that the first customer intends to pay for the desired product, and/or a desired condition of the desired product, and/or any other constraint that the first customer may place on the desired product. In some implementations, the processor 606 transmits content for display on the first customer device that enables the first customer to place the order. Examples of such content are illustrated in the screen pages 2600, 2700, 2800, 2900, 3000, 3100, 3200 of FIGS. 26 to 32.

The desired product that is indicated in the order could be a specific product or a product type. The indication that the first customer will accept a returned item of the desired product could be provided in any of a variety of different ways. In one example, the first customer places an order that is specific to returned items. In another example, the first customer places an order for a desired product, and checks a box indicating that the first customer will accept a returned item or a new item.

In step 3604, the memory 608 stores first information related to the order, the first information indicating: (i) the first customer, and (ii) the desired product. The first information could be stored in the returns record 690, for example. Optionally, the first information further indicates the price that the first customer intends to pay for the desired product, and/or the desired condition for the desired product and/or any other constraint that the first customer has placed on the desired product.

In step 3606, the processor 606 receives, from a second customer device that is associated with a second customer, an indication that the second customer intends to return a purchased item. The second customer device could be the customer device 670a, and the indication may be received via the network 650 and the network interface 642. In some implementations, step 3606 is similar to step 3402 of FIG. 34.

In some embodiments, the processor 606 also receives an indication of a particular condition of the purchased item from the first customer device. The particular condition could include a description of the condition of the purchased item and/or an image of the purchased item, for example.

The purchased item could be associated with a merchant on the e-commerce platform 602. For example, the second customer may have originally purchased the purchased item from the merchant. In some embodiments, the processor 606 transmits content for display on a merchant device that is associated with the merchant. The merchant device could be the device 660, for example. The content includes an option to permit shipping the purchased item from the second customer to another customer. The content could also include the condition of the purchased item. Examples of content for display on the merchant device are illustrated in the screen pages 1500 and 1600 of FIGS. 15 and 16.

In step 3608, the processor 606 determines that the purchased item corresponds to the desired product. In some embodiments, the desired product is a specific product identified by a product name and/or another identifier. The processor 606 can use the product name and/or another identifier of the purchased item to determine that the purchased item corresponds to the desired product.

In some embodiments, the desired product is or includes a product type. In these embodiments, the processor 606 may determine a plurality of products, sold on the e-commerce platform 602, that correspond to the product type. The first information stored in the memory 608 indicates the plurality of products, and the processor determines that the purchased item corresponds to one of the plurality of products. Alternatively, the processor 606 may determine one or more product type(s) that correspond to the purchased item, and search the order record 690 for orders that include these product type(s). The processor 606 could then determine that the product type(s) of the purchased item correspond to the desired product type.

In step 3610, the processor 606 determines a cost associated with shipping the purchased item from the second customer to the first customer. An example of determining this cost is discussed in detail above with reference to step 710 of FIG. 7. Another example of determining this cost is discussed in detail above with reference to step 3408 of FIG. 34.

In step 3612, the processor 606 determines, based on the cost determined in step 3610, to enable shipping the purchased item from the second customer to the first customer. For example, the processor 606 could determine that a match between the second customer and the first customer is in the best interest of the particular merchant that originally sold the purchased item to the second customer. In some embodiments, the determination may be based on a comparison between the cost and a predetermined threshold. Optionally, the predetermined threshold is based on the price that the first customer intends to pay for the purchased item. If it is determined that the merchant will make a profit from shipping the purchased item from the second customer to the first customer, then shipping can be enabled.

In some embodiments, the cost determined in step 3610 is a first cost, and the processor 606 further determines a second cost that is associated with at least one of: (i) shipping the purchased item from the second customer to the merchant, and (ii) shipping a new item of the desired product from the merchant to the first customer. An example of determining the second cost is discussed in further detail above with reference to steps 706, 708 of FIG. 7. Another example of determining the second cost is discussed in further detail above with reference to step 3410 of FIG. 34. In these embodiments, the processor 606 determines, based on a comparison of the first cost and the second cost, to enable shipping the purchased item from the second customer to the first customer. The comparison between the first cost and the second cost could include a comparison between a predetermined threshold and a result of subtracting the first cost from the second cost. As discussed elsewhere herein, the first cost and second cost could be expressed as distances or prices, for example.

In some embodiments, the processor 606 receives an indication of a particular condition of the purchased item, and step 3612 is further based on a comparison of the desired condition and the particular condition. If the particular condition of the purchased item does not meet or exceed the desired condition, then the processor 606 would not enable shipping the purchased item from the second customer to the first customer.

In some embodiments, the processor 606 transmits content for display on the first customer device. An example of such content is the screen page 3300 of FIG. 33. The content includes an option to buy the purchased item. The content could also include the condition of the purchased item. Furthermore, the content could include a price of the purchased item. This price could be a fixed price that is the same for every customer matched with the second customer, or the price could be actively calculated for the first customer. For example, the price could be determined based on the cost of shipping the purchased item from the second customer to the first customer, as determined in step 3610. In the case that the first customer selects the option to buy the purchased item, then the processor 606 receives, from the first customer device, a message indicating that the first customer intends to buy the purchased item.

In step 3614, the processor 606 transmits, to the second customer device, second information for shipping the purchased item from the second customer to the first customer. The second information could include a shipping address of the first customer, for example. Optionally, the second information comprises a shipping label for shipping the purchased item from the second customer to the first customer. For example, the second information could be provided in the screen page 1900 of FIG. 19. The second customer could package the item, apply the shipping label to the package, and then ship the package to the first customer.

In some embodiments, the order received in step 3602 indicates a plurality of desired products. In these embodiments, the desired product is a first desired product, the purchased item is a first purchased item, and the cost is a first cost. The order further indicates that: (i) the first customer intends to purchase the plurality of desired products, the plurality of desired products including the first desired product and a second desired product, and (ii) the first customer will accept a returned item for each of the plurality of desired products. The first information, stored in step 3604, further indicates the plurality of desired products. Steps 3606, 3608, 3610, 3612, 3614 can then be repeated for the second desired product. For example, the processor 606 can receive, from a third customer device that is associated with a third customer, an indication that the third customer intends to return a second purchased item. In some implementations, the third customer is different from the second customer, but this might not always be the case. The processor 606 then determines that the second purchased item corresponds to the second desired product; determines a second cost associated with shipping the second purchased item from the third customer to the first customer; and determines, based on the second cost, to enable shipping the purchased item from the third customer to the first customer. The processor transmits, to the third customer device, third information for shipping the second purchased item from the third customer to the first customer.

In some embodiments, a third customer might intend to return an item that corresponds to the desired product, but the first customer and the third customer are not matched. For example, the purchased item could be a first purchased item, and the cost could be a first cost. The processor 606 receives, from a third customer device that is associated with the third customer, an indication that the third customer intends to return a second purchased item. The indication from the third customer device may be received before the indication from the second customer device. The processor 606 determines that the second purchased item corresponds to the desired product; determines a second cost associated with shipping the second purchased item from the third customer to the first customer; and determines, based on the second cost, not to enable shipping the second purchased item from the third customer to the first customer. The processor might determine not to enable shipping the second purchased item from the third customer to the first customer because the cost of shipping is greater than the profit that the merchant can make by reselling the second purchased item to the first customer, for example. In some embodiments, the second cost may be compared to the same predetermined threshold discussed above in relation to step 3612, and it may be determined based on the comparison not to enable shipping the second purchased item from the third customer to the first customer.

In some embodiments, the memory 608 stores multiple orders for respective desired products, where at least two of these desired products correspond to the second customer's purchased item. In these embodiments, the order is a first order, the desired product is a first desired product, and the price is a first price. The processor 606 receives a second order from a third customer device that is associated with a third customer, the second order indicating that: (i) the third customer intends to purchase a second desired product, and (ii) the third customer will accept a returned item of the second desired product. The memory 608 stores third information related to the second order, the third information indicating: (i) the third customer, and (ii) the second desired product. The processor 606 then determines that the purchased item also corresponds to the second desired product, and determines a second cost associated with shipping the purchased item from the second customer to the third customer. Determining to enable shipping the purchased item from the second customer to the first customer in step 3612 is then based on a comparison of the first cost and the second cost. For example, the first cost could be less than the second cost, and therefore it is more profitable for the merchant to ship the purchased item to the first customer. However, there may be other reasons that the processor 606 determines to enable shipping the purchased item from the second customer to the first customer. For example, the first order could indicate that the first customer is willing to pay a larger price for the purchased item than the third customer, or the condition of the purchased item might not meet a desired condition stipulated in the third customer's order. Alternatively, the first customer could have placed the first order before the third customer placed the second order, and therefore the first customer is given priority.

CONCLUSION

Although the present invention has been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

The invention claimed is:

1. A computer-implemented method comprising:
   receiving, by a computing system from a second customer device that is associated with a second customer, an indication that the second customer intends to return a purchased item;
   determining, by the computing system, that the purchased item corresponds to a desired product that is desired by a first customer;
   determining, by the computing system, a cost associated with shipping the purchased item from the second customer to the first customer;
   determining, by the computing system based on the cost, to enable shipping the purchased item from the second customer to the first customer;
   obtaining a shipping label for shipping the purchased item from the second customer to the first customer, wherein the shipping label encodes both a name and an address of the first customer in a machine-readable code to mask personal information of the first customer from the second customer; and
   transmitting, by the computing system to the second customer device, the shipping label for shipping the purchased item from the second customer to the first customer.

2. The computer-implemented method of claim 1, wherein:
   the purchased item is associated with a merchant;
   the cost is a first cost; and
   determining to enable shipping the purchased item from the second customer to the first customer comprises:
   determining a second cost that is associated with at least one of: (i) shipping the purchased item from the second customer to the merchant, and (ii) shipping a new item of the desired product from the merchant to the first customer, and
   determining, based on a comparison of the first cost and the second cost, to enable shipping the purchased item from the second customer to the first customer.

3. The computer-implemented method of claim 1, further comprising:
   transmitting, by the computing system, content for display on a first customer device associated with the first customer, the content comprising an option to buy the purchased item; and
   receiving, by the computing system from the first customer device, a message indicating that the first customer intends to buy the purchased item.

4. The computer-implemented method of claim 3, further comprising:
   receiving, by the computing system from the second customer device, a condition of the purchased item, wherein the content comprises the condition of the purchased item.

5. The computer-implemented method of claim 3, further comprising:
   determining, by the computing system based on the cost, a price of the purchased item, wherein the content comprises the price of the purchased item.

6. The computer-implemented method of claim 1, wherein the purchased item is a first purchased item, the cost is a first cost, and the method further comprises:
   receiving, by the computing system from a third customer device that is associated with a third customer, an indication that the third customer intends to return a second purchased item;
   determining, by the computing system, that the second purchased item corresponds to the desired product;
   determining, by the computing system, a second cost associated with shipping the second purchased item from the third customer to the first customer; and
   determining, by the computing system based on the second cost, not to enable shipping the second purchased item from the third customer to the first customer.

7. The computer-implemented method of claim 1, wherein determining to enable shipping the purchased item from the second customer to the first customer is based on a comparison between the cost and a predetermined threshold.

8. The computer-implemented method of claim 1, wherein prior to receiving the indication that the second customer intends to return the purchased item, the method comprises receiving, by the computing system, an order from a first customer device that is associated with the first customer, the order indicating that: (i) the first customer intends to purchase the desired product, and (ii) the first customer will accept a returned item of the desired product; and wherein the method further comprises communicating with a device associated with an external shipping provider to facilitate shipping the purchased item from the second customer to the first customer.

9. A system comprising: and
   a memory to store an indication of a desired product that is desired by a first customer;
   a processor to:
   receive, from a second customer device that is associated with a second customer, an indication that the second customer intends to return a purchased item;
   determine that the purchased item corresponds to the desired product;
   determine a cost associated with shipping the purchased item from the second customer to the first customer;
   determine, based on the cost, to enable shipping the purchased item from the second customer to the first customer;
   obtain a shipping label for shipping the purchased item from the second customer to the first customer, wherein the shipping label encodes both a name and an address of the first customer in a machine-readable code to mask personal information of the first customer from the second customer; and
   transmit, to the second customer device, the shipping label for shipping the purchased item from the second customer to the first customer.

10. The system of claim 9, wherein:
    the purchased item is associated with a merchant;
    the cost is a first cost; and
    the processor is further to:
    determine a second cost that is associated with at least one of: (i) shipping the purchased item from the second customer to the merchant, and (ii) shipping a new item of the desired product from the merchant to the first customer, and determine, based on a comparison of the first cost and the second cost, to enable shipping the purchased item from the second customer to the first customer.

11. The system of claim 9, wherein the processor is further to:
transmit content for display on a first customer device associated with the first customer, the content comprising an option to buy the purchased item; and
receive, from the first customer device, a message indicating that the first customer intends to buy the purchased item.

12. The system of claim 11, wherein the processor is further to:
receive, from the second customer device, a condition of the purchased item, wherein the content comprises the condition of the purchased item.

13. The system of claim 11, wherein the processor is further to:
determine, based on the cost, a price of the purchased item, wherein the content comprises the price of the purchased item.

14. The system of claim 9, wherein the purchased item is a first purchased item, the cost is a first cost, and the processor is further to:
receive, from a third customer device that is associated with a third customer, an indication that the third customer intends to return a second purchased item;
determine that the second purchased item corresponds to the desired product;
determine a second cost associated with shipping the second purchased item from the third customer to the first customer; and
determine, based on the second cost, not to enable shipping the second purchased item from the third customer to the first customer.

15. The system of claim 9, wherein prior to receiving the indication that the second customer intends to return the purchased item, the processor is to receive an order from a first customer device that is associated with the first customer, the order indicating that: (i) the first customer intends to purchase the desired product, and (ii) the first customer will accept a returned item of the desired product; and wherein the processor is further to communicate with a device associated with an external shipping provider to facilitate shipping the purchased item from the second customer to the first customer.

16. A non-transitory computer readable medium having stored thereon computer executable instructions that, when executed, cause a computing system to perform operations comprising:
receiving, from a second customer device that is associated with a second customer, an indication that the second customer intends to return a purchased item;
determining that the purchased item corresponds to a desired product that is desired by a first customer;
determining a cost associated with shipping the purchased item from the second customer to the first customer;
determining, based on the cost, to enable shipping the purchased item from the second customer to the first customer;
obtaining a shipping label for shipping the purchased item from the second customer to the first customer, wherein the shipping label encodes both a name and an address of the first customer in a machine-readable code to mask personal information of the first customer from the second customer; and
transmitting, to the second customer device, the shipping label for shipping the purchased item from the second customer to the first customer.

17. The non-transitory computer readable medium of claim 16, wherein:
the purchased item is associated with a merchant;
the cost is a first cost; and
determining to enable shipping the purchased item from the second customer to the first customer comprises:
determining a second cost that is associated with at least one of: (i) shipping the purchased item from the second customer to the merchant, and (ii) shipping a new item of the desired product from the merchant to the first customer, and
determining, based on a comparison of the first cost and the second cost, to enable shipping the purchased item from the second customer to the first customer.

18. The non-transitory computer readable medium of claim 16, wherein the instructions, when executed, further cause the computing system to perform operations comprising:
transmitting, by the computing system, content for display on a first customer device associated with the first customer, the content comprising an option to buy the purchased item; and
receiving, by the computing system from the first customer device, a message indicating that the first customer intends to buy the purchased item.

19. The non-transitory computer readable medium of claim 18, wherein the instructions, when executed, further cause the computing system to perform operations comprising:
receiving, by the computing system from the second customer device, a condition of the purchased item, wherein the content comprises the condition of the purchased item.

20. The non-transitory computer readable medium of claim 18, wherein the instructions, when executed, further cause the computing system to perform operations comprising:
determining, by the computing system based on the cost, a price of the purchased item, wherein the content comprises the price of the purchased item.

* * * * *

UNITED STATES PATENT AND TRADEMARK OFFICE
CERTIFICATE OF CORRECTION

| | |
|---|---|
| PATENT NO. | : 11,810,060 B2 |
| APPLICATION NO. | : 17/700574 |
| DATED | : November 7, 2023 |
| INVENTOR(S) | : Anthony Nicholas Kentris |

It is certified that error appears in the above-identified patent and that said Letters Patent is hereby corrected as shown below:

In the Claims

At Column 62, Lines 36 to 38, Claim 9, "A system comprising: and a memory to store an indication of a desired product that is desired by a first customer;" should be - A system comprising: a memory to store an indication of a desired product that is desired by a first customer; and -

Signed and Sealed this
Sixth Day of February, 2024

Katherine Kelly Vidal
*Director of the United States Patent and Trademark Office*